United States Patent
Pon et al.

[11] Patent Number: 5,963,601
[45] Date of Patent: Oct. 5, 1999

[54] VARIABLE SUPPRESSION OF MULTIPATH SIGNAL EFFECTS

[75] Inventors: Rayman Pon; Kreg Martin, both of Cupertino; Dominic Farmer, Milpitas, all of Calif.

[73] Assignee: Trimble Navigation Limited, Sunnyvale, Calif.

[21] Appl. No.: 08/650,338

[22] Filed: May 20, 1996

[51] Int. Cl.[6] .............................. H03D 1/04; H04K 1/00
[52] U.S. Cl. .......................................... 375/346; 375/200
[58] Field of Search .................................. 375/200, 346, 375/285, 340, 316

[56] References Cited

U.S. PATENT DOCUMENTS

| | | | |
|---|---|---|---|
| 4,007,330 | 2/1977 | Winters | 178/88 |
| 4,168,529 | 9/1979 | Tomlinson | 375/367 |
| 4,203,070 | 5/1980 | Bowles et al. | 375/317 |
| 4,203,071 | 5/1980 | Bowles et al. | 375/343 |
| 4,550,414 | 10/1985 | Guignon et al. | 375/207 |
| 4,608,569 | 8/1986 | Dickey et al. | 342/384 |
| 4,660,164 | 4/1987 | Liebowitz | 364/728.03 |
| 4,829,543 | 5/1989 | Borth et al. | 375/83 |
| 4,862,478 | 8/1989 | McIntosh | 375/200 |
| 5,091,918 | 2/1992 | Wales | 375/229 |
| 5,101,416 | 3/1992 | Fenton et al. | 375/206 |
| 5,164,959 | 11/1992 | Cai et al. | 375/200 |
| 5,282,228 | 1/1994 | Scott et al. | 375/344 |
| 5,347,536 | 9/1994 | Meehan | 375/210 |
| 5,390,207 | 2/1995 | Fenton et al. | 375/209 |
| 5,402,450 | 3/1995 | Lennen | 375/343 |
| 5,414,729 | 5/1995 | Fenton et al. | 375/209 |
| 5,444,451 | 8/1995 | Johnson et al. | 342/453 |
| 5,481,503 | 1/1996 | Kuhn et al. | 367/100 |
| 5,488,662 | 1/1996 | Fox et al. | 342/132 |
| 5,493,588 | 2/1996 | Lennen | 375/343 |
| 5,495,499 | 2/1996 | Fenton et al. | 370/479 |

OTHER PUBLICATIONS

R.E. Ziemer & R.L. Peterson, *Digital Communications and Spread Spectrum Systems*, MacMillan Publ. Co., New York, 1985, pp. 419–447.

Alfred Leick, *GPS Satellite Surveying*, John Wiley & Sons, New York, 2cd Edition, 1995, and Ziemer and Peterson, op.cit.

W.M. Bowles, "Correlation Tracking", Charles Stark Draper Laboratory, May 1980.

*Primary Examiner*—Tesfaldet Bocure
*Attorney, Agent, or Firm*—John Schippen; Wagner, Murabito & Hao

[57] ABSTRACT

Method and apparatus for formation of an autocorrelation difference function of an incoming digital signal that reduces the effects of presence of a multipath signal or of noise in an incoming digital composite signal. An incoming digital composite signal, including direct and multipath signals, is received that has a bit value transition interval of length $\Delta\tau_{chip}$. Two or three consecutive bit values $b_{n-2}$, $b_{n-1}$ and $b_n$ of the direct (ideal) signal are examined. If a test condition for these bit values is satisfied, a first non-uniform weighting function w1(t) is used to compute the contribution of a time interval $I_n = \{t' | t_{n-1} + \Delta < t' \leq t_n + \Delta\}$, where $\Delta$ is a selected time value satisfying $0 \leq \Delta < \Delta\tau_{chip}$, to first and second autocorrelation functions AC#($\tau$;E) and AC#($\tau$;L) with respective selected first and second time shifts $\tau = t_E$ and $\tau = t_L$ ($> t_E$). If the test condition is not satisfied, a second weighting function w1^(t) is used to compute the contribution of the time interval $I_n$ to AC#($\tau$;E) and AC#($\tau$;L). An autocorrelation difference function $\Delta AC\#(\tau) = AC\#(\tau;E) - AC\#(\tau;L)$ is formed in which the effects of noise or of multipath signals is suppressed, relative these effects in a conventionally computed autocorrelation difference function $\Delta AC(\tau) = AC(\tau;E) - AC(\tau;L)$.

55 Claims, 24 Drawing Sheets

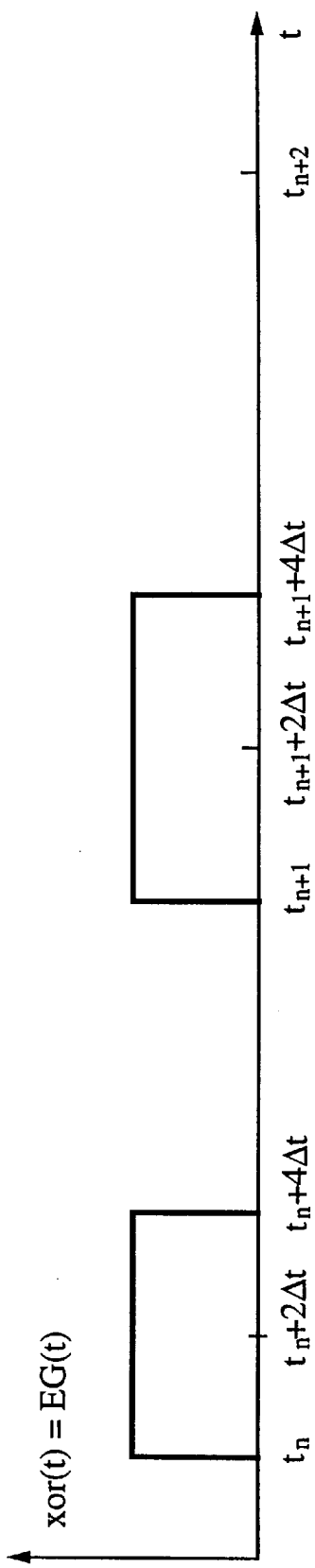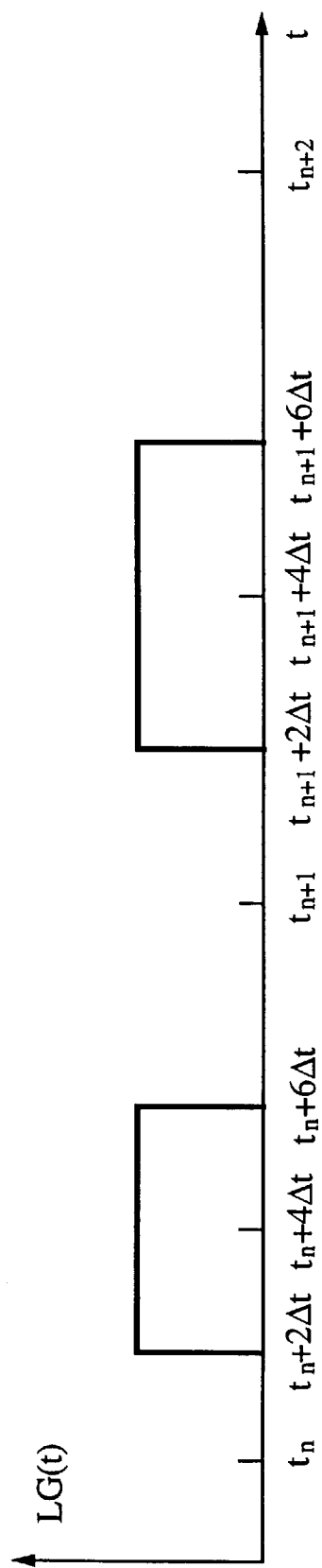

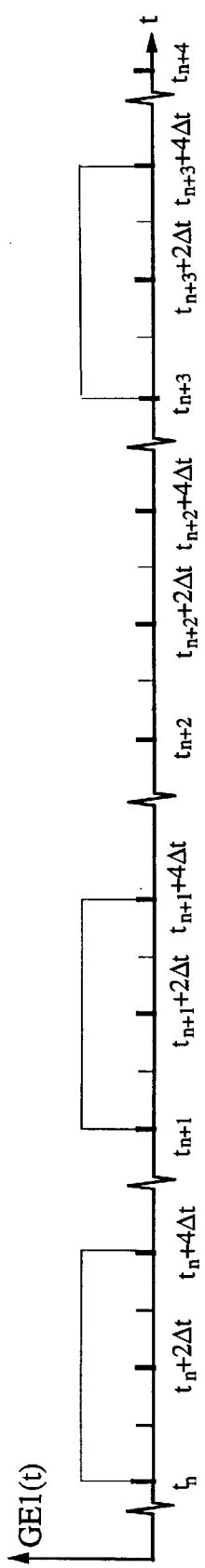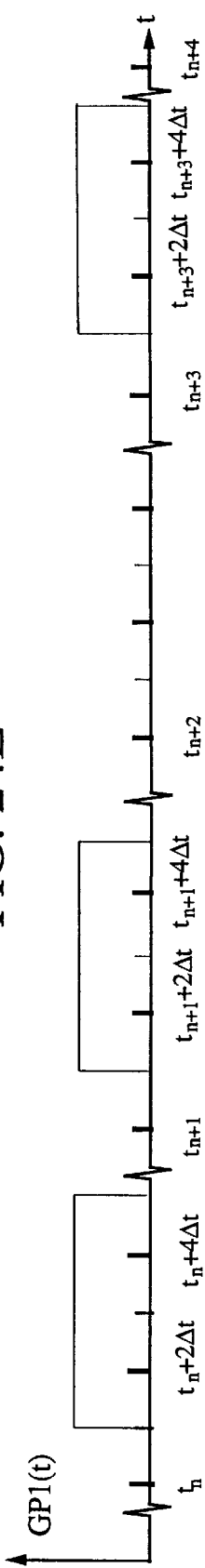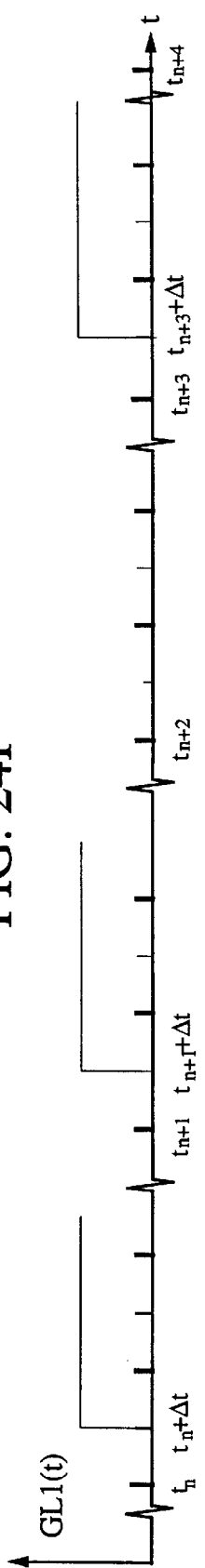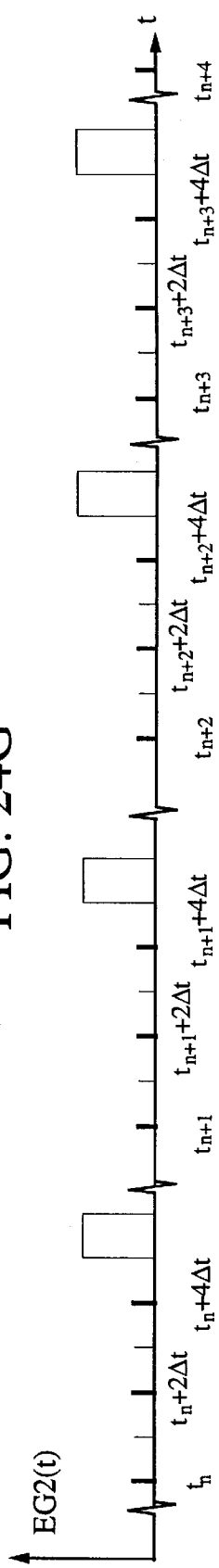
FIG. 24E
FIG. 24F
FIG. 24G
FIG. 24H

VARIABLE SUPPRESSION OF MULTIPATH SIGNAL EFFECTS

FIELD OF THE INVENTION

This invention relates to a method for minimizing the deleterious effects of multipath on incoming digital spread spectrum signals that are encountered in signal receivers, using analysis of transitions of consecutive bit values in the incoming signal.

BACKGROUND OF THE INVENTION

The effects of multipath are well known in communications systems. Multipath is the term used to define the secondary signals that are locally induced reflections of a primary signal that enter the receiver in question a fraction of a second later than the direct path signal, and because of the relatively short delay between the original signal and the secondary signal, induce a type of destructive interference that results in some type of impairment to the desired signal. In analog FM band automobile receivers, the effects of multipath create an annoying flutter that causes a loss of intelligibility. In television signals, the impairment is called a "ghost" image. A similar impairment occurs in other forms of analog communication. In digital systems, whether for speech or for data transmission for other purposes, multipath basically adds noise to the desired signal, resulting in either outright errors or at least, much noisier data. In spread spectrum receivers, the effects of multipath are generally found in the correlators used to achieve signal timing synchronization. In GPS or GLONASS receivers, which seek to determine location based on triangulation of range distances determined from time delay measurements made from an orbiting constellation of satellites, the effect of multipath is to induce comparatively large instantaneous errors in the time of arrival measurements which translate into large errors in the indicated positions. Removal of these errors is the subject of most of the work done by previous workers in this field. Previous researchers have sought to deal with the effects of multipath by attempting to estimate the magnitude of the error introduced, and to subtract this error or to otherwise compensate for its effects.

The methods employed to acquire and demodulate data from spread spectrum transmissions is well known in the art. See R. E. Ziemer and R. L. Peterson, *Digital Communications and Spread Spectrum Systems*, Macmillan Publ Co., New York, 1985, pp. 419–447 for a discussion of acquisition and demodulation of spread spectrum signals. A spread spectrum GPS receiver must obtain both code and carrier synchronization in order to demodulate the desired data successfully. Issues associated with tracking and accurately demodulating a spread spectrum signal, once the signal is acquired, are discussed in many references on GPS, such as Alfred Leick, *GPS Satellite Surveying*, John Wiley & Sons, New York, Second Edition, 1995, and Ziemer and Peterson, op cit.

A GPS signal contains a 50 bit/second navigation message and a unique spreading code (C/A) of length 1.023 kilobits, which is transmitted at a frequency of about 1.023 Mbits/sec. Signal acquisition requires that phase lock first occur with the radio frequency carrier and that the reference or local replica signal be synchronized with the spreading code. In signal synchronization, a local replica of the particular satellite code is synchronized in time with the incoming satellite signal code.

Once the Doppler error in the downlink signal from the satellite is appropriately compensated for and signal synchronization is obtained, the navigation message in the 50 bit/second modulation that forms the composite GPS signal (direct plus multipath) can be demodulated. This navigation message contains data on the satellite ephemerides and time pulses that indicate when the transmission originated from the satellite. By measuring the difference between the local clock time and the indicated satellite time of transmission, the time delay, and thus the instantaneous distance from GPS receiver to satellite, can be obtained by multiplying this time delay by the speed of light in the ambient medium.

Signal synchronization is performed using a signal correlator. The correlator constantly compares the incoming signal with a local replica of the desired signal; a microprocessor adjusts a time shift $\tau$ of the local replica signal until satisfactory agreement is obtained. Because the incoming signal and the local replica signal are substantially identical, a measure of the degree of agreement of these two signals is often referred to as an autocorrelation function. A variety of autocorrelation functions $AC(\tau)$ are shown in various texts, and an example is shown in FIG. 1A. An autocorrelation function $AC(\tau)$ can be described according to one of the equations $$AC(\tau) = \int_0^T s(t')S_d(t' + \tau)dt' \qquad (1A)$$

or $$AC(\tau) = \sum_{k=1}^{K} s(t_k)S_d(t_k + \tau), \qquad (1B)$$

depending upon whether integration or summation of sampled values over a suitable contribution time interval is used to compute the composite signal autocorrelation function. The length T of the contribution time interval used to compute the autocorrelation function in Eq. (1A) or (1B) is often chosen to be N times the chip length $\Delta\tau_{chip}$, where N is a large positive number.

Tracking the composite satellite signal requires maintaining signal synchronization. The peak of the autocorrelation function is rounded, not pointed, due to finite bandwidth effects, so that locating a true peak is difficult. Receiver designers have, therefore, resorted to an "early-minus-late" correlation tracking method, as discussed by W. M. Bowles in "Correlation Tracking," Charles Stark Draper Laboratory, May 1980, by Fenton et al in U.S. Pat. No. 5,101,416, and by Lennen in U.S. Pat. Nos. 5,402,450 and 5,493,588. In the early-minus-late tracking method, a first correlator measures an equivalent autocorrelation function when the local replica signal is shifted to an "early" time $t_E$ relative to the position ($\tau=t_P$) of an ideal or punctual replica, and a second correlator measures a second equivalent autocorrelation function when the local replica signal is shifted to a "late" time $t_L$. Early and late replicas of the punctual autocorrelation function $AC(\tau;P)$ are illustrated in FIG. 1B. By subtracting the late autocorrelation function from the early autocorrelation function, a correlation tracking function or autocorrelation difference function $\Delta AC(\tau)$ with a zero crossing, corresponding to the autocorrelation function peak can be developed, if the separations of the early and late time shifts from the punctual time shift are chosen to be equal. A representative early-minus-late tracking function $\Delta AC(\tau)$ is shown in FIG. 1C.

If the tracking or time shift variable $\tau$ for the autocorrelation difference function $\Delta AC(\tau)$ lies to the left (to the right) of the zero crossing point, the system uses the presence of positive (negative) values of $\Delta AC(\tau)$ to increase (decrease)

the value of τ and drive the system toward the zero crossing point for ΔAC(τ). The zero-crossing point is thus easily measured and tracked, and the equivalent peak value and peak location for the autocorrelation function is easily determined. At the zero-crossing point on this doublet-like tracking function, maximum correlation occurs between the incoming signal and the local replica signal. The zero-crossing point represents the best estimate of time shift τ for signal synchronization. The internal clock time corresponding to the zero crossing point is a good estimate for time of arrival of an incoming signal at the receiver.

Superposition of an equivalent autocorrelation function for the multipath signal (reduced in magnitude and delayed in time) onto the autocorrelation function AC(τ) for the desired satellite code signal is a useful model for analyzing the effects of presence of multipath signals, as noted in the Fenton et al patent and in the Lennen patent, op. cit. Superposition of any additional signal onto the desired incoming signal, during the time period when signal correlation occurs, will distort the desired autocorrelation function AC(τ;direct) and produce an altered autocorrelation function AC(τ;composite) for the composite signal (direct plus multipath). An autocorrelation function for an uncorrupted or "pure" direct signal is shown along with a representative, attenuated and time delayed, multipath autocorrelation function with positive relative polarity, compared to the direct signal, in FIG. 2A. The autocorrelation for the composite, corrupted incoming signal is obtained by summing the two autocorrelation functions and is compared with the uncorrupted autocorrelation function in FIG. 2B. FIGS. 2C and 2D are similar graphs, showing the autocorrelation function for a multipath signal with negative relative polarity, compared to the direct signal. Any such distortion produces errors in the indicated zero-crossing point on the early-minus-late correlation tracking function. These errors in indicated punctual time shift produce errors in the pseudorange measurements, and will in turn produce an error in the final computed estimate of location coordinates for the receiver.

Another useful and equivalent model for analyzing the effects of presence of a multipath signal computes the autocorrelation functions AC(τ;x;direct) and AC(τ;x;multipath) (x=E, L) for the pure direct signal and the pure multipath signal, forms the differences ΔAC(τ;direct) and ΔAC(τ;multipath) and adds these two difference functions to obtain the autocorrelation difference function ΔAC (τ;composite) for the composite signal.

Representative autocorrelation difference functions for a direct incoming signal and a composite incoming signal are shown in FIG. 3B and 3D for positive relative multipath polarity and negative relative multipath polarity, respectively, compared to the direct signal. The tracking error due to presence of the multipath signal, obtained from the difference in zero crossing points for the direct signal and for the composite signal, is easily seen from these figures.

Previous work in the area of multipath amelioration has focussed on two approaches: 1) estimating the effects and compensating for multipath-induced errors, and 2) attempting to limit the effects of the estimated multipath errors. In the Lennen patents, op. cit., both approaches are described. The estimation methods seek to model the distortions to the instantaneous autocorrelation function and to create a correction term to subtract from the indicated punctual time. Estimation methods are worthwhile but can never obtain perfection, wherein all multipath effects are removed, because the multipath signals are constantly varying and corrections can only be done after the fact.

A multipath limitation method, such as described in the Lennen patent, op. cit., operates the early-minus-late correlation tracking loop with a shorter delay between the early signal and late signal correlators than previous methods had employed. This limitation method reduces the effects of the presence of multipath substantially. In FIGS. 1B and 1C, the autocorrelation function AC(τ) and the corresponding tracking function ΔAC(τ) are shown for the case where the early-minus-late time delay is approximately 0.15 times the width $\Delta\tau_{chip}$ of a digital signal bit or chip.

Several workers have analyzed correlation functions and/ or have used pseudorandom signal sequences in attempting to estimate or suppress the effects of the presence of multipath signals. Examples of these are Winters in U.S. Pat. No. 4,007,330, Tomlinson in U.S. Pat. No. 4,168,529, Bowles et al in U.S. Pat. Nos. 4,203,070 and 4,203,071, Guignon et al in U.S. Pat. No. 4,550,414, Dickey et al in U.S. Pat. No. 4,608,569, Liebowitz in U.S. Pat. No. 4,660, 164, Borth et al in U.S. Pat. No. 4,829,543, McIntosh in U.S. Pat. No. 4,862,478, Wales in U.S. Pat. No. 5,091,918, Fenton et al in U.S. Pat. Nos. 5,101,416, 5,390,207, 5,414, 729 and 5,495,499, Cai et al in U.S. Pat. No. 5,164,959, Scott et al in U.S. Pat. No. 5,282,228, Meehan in U.S. Pat. No. 5,347,536, Lennen in U.S. Pat. Nos. 5,402,450 and 5,493,588, Johnson et al in U.S. Pat. No. 5,444,451, Kuhn et al in U.S. Pat. No. 5,481,503, and Fox et al in U.S. Pat. No. 5,488,662.

In previous methods for multipath amelioration, samples are taken of the incoming direct (desired) signal plus the incoming multipath signal(s) over the entire width of the chip, using a uniform sampling rate and without assigning any variable weighting to the samples. Further, little or no account is taken of the effect of bit value transitions for consecutive bits for the incoming digital signal. What is needed here is an approach that obtains correlation information from portions of a chip width where the effects of presence of multipath signals are suppressed, by examining bit value transitions for consecutive bits for the incoming digital signal and by use of this information to choose a (non-uniform) weighting function for formation of a modified autocorrelation function for the incoming digital signal. Preferably, the approach should be adaptable to allow suppression of a controllable amount of multipath signal contributions to the autocorrelation function and should continue to provide tracking indicators that indicate the direction of time shift required to achieve signal synchronization as the unit operates.

SUMMARY OF THE INVENTION

These needs are met by the invention, which provides a method that dynamically changes the shape of a non-uniform weighting function w(t;q), used to form an autocorrelation function for an incoming digital signal, based on the relative values, $b_{n-2}$, $b_{n-1}$ and $b_n$, of two or three consecutive bits in a replica $S_d(t)$ of a digital bit sequence representing the incoming digital direct signal, with multipath and noise absent. Here q represents one or more parameters used to define the weighting function w(t;q). A weighting function is chosen from among a population of two or more such weighting functions to suppress or de-emphasize the contributions of a multipath signal to an early-minus-late autocorrelation difference function ΔAC (τ;q)=AC(τ;E;q)−AC(τ;L;q) in a selected region of the time shift variable τ. In a first embodiment, the weighting function chosen to form the autocorrelation functions AC(τ;x;q) (x=E, L) and the difference function ΔAC(τ;q) will vary with the relationship between two consecutive bit values $b_{n-1}$ and $b_n$. If a bit value transition occurs so that $b_{n-1} \neq b_n$, a first weighting function is used to form the autocorrelation difference function. If no bit value transition occurs so that $b_{n-1} = b_n$, a second weighting function is used that suppresses the corresponding contribution of this region of the time domain to the autocorrelation difference function $\Delta AC(\tau;q)$. Using this approach, the noise contribution is suppressed relative to the signal contribution so that the signal-to-noise ratio (SNR) is enhanced.

In a second embodiment, the relationship between three consecutive bit values $b_{n-2}$, $b_{n-1}$ and $b_n$ is examined. If $b_{n-2} = b_{n-1} \neq b_n$, a first weighting function is used that enhances the contribution of the direct signal and/or reduces the contribution of a multipath signal that may be present in the composite signal; and if $b_{n-2} \neq b_{n-1}$, or if $b_{n-1} = b_n$, or if both of these conditions occur, a second weighting function is chosen that suppresses the contribution of this portion of the time domain to the autocorrelation difference function $\Delta AC(\tau;q)$. With this approach, the contribution of a multipath signal to the autocorrelation difference function is suppressed. The choice of weighting function thus varies dynamically as the bit values of two consecutive bit values, or three consecutive bit values, change.

In a third embodiment, if a bit value transition occurs so that $b_{n-1} \neq b_n$, a first weighting function is used to form the autocorrelation difference function; and if no bit value transition occurs so that $b_{-1} = b_n$, a second weighting function, related to the first weighting function but with changed periodicity, is used to form the autocorrelation difference function.

In a fourth embodiment, if $b_{n-2} = b_{n-1} \neq b_n$, a first weighting function is used to form the autocorrelation difference function; and if $b_{n-2} \neq b_{n-1}$ and/or $b_{n-1} = b_n$, a second weighting function, related to the first weighting function but with changed periodicity, is used to form the autocorrelation difference function.

The invention begins with the realization, utilized in a companion patent application, U.S. Ser. No. 08/650,631, by the title, "Suppression of Mulitpath Signal Effects", filed on May 20, 1996 and assigned to the same assignee, that the useful information to be obtained from the incoming digital composite signal is available primarily in digital signal bit value transition regions, where the bit value for the incoming digital direct signal $S_d(t)$ changes state. Contributions from samples that contain no useful information, but that do contain multipath signal effects that produce erroneous distortions in the corresponding autocorrelation function and in the resulting correlation tracking function, are ignored or suppressed. By ignoring or suppressing the contribution of samples taken in regions where no transition in a signal bit value can occur, the receiver can suppress the effects of multipath signals. The portion of a chip width where the autocorrelation difference function $\Delta AC(\tau;q)$ is substantially zero is much larger than in any of the previous methods for ameliorating the presence of multipath signals. Previous methods produced wider regions of non-zero $\Delta AC(\tau;q)$ for the desired signal. The invention, which may be characterized as non-uniform weighting of the sampling function used to create $AC(\tau;x;q)$, provides a method for substantially eliminating the possibility for experiencing multipath effects in correlation tracking.

A tracking point or zero-crossing point $\tau = t_P$ associated with the difference $\Delta AC(\tau)$ of the autocorrelation functions $AC(\tau;E)$ and $AC(\tau;L)$ is determinable as before, but with reduced contributions from the direct signal and from the multipath signal in a selected central region that does not include the tracking point $\tau = t_P$. This central region does not include any time shift values t for which the instantaneous value of a reference or local replica digital direct signal $S_d(t+\tau)$ can make a signal bit value transition (from 0 to 1, or from 1 to 0) relative to the instantaneous value of an incoming digital composite signal s(t). Thus, little or no qualitative information is lost by de-emphasizing the contribution of this central region to a corresponding autocorrelation function. However, much of the important information arising from presence of the multipath signal is also present in this central region, and this multipath information is suppressed or de-emphasized by suppressing the contribution of this central region to the autocorrelation function. Location of the "true" tracking point for the direct signal (absent multipath) is unchanged or is changed only minimally by this approach; the contribution of the multipath signal in the selected central region is reduced to substantially zero.

The invention in the related patent application, Ser. No. 08/650,631, suppresses the contribution of a central region to the computed autocorrelation function $AC(\tau;x;qx)$ (x=E, P or L) for the composite signal by imposing a non-uniform weighting function $w(t;q)$ in the integral or sum of the digital signal product $s(t)S_d(t+\tau)$ over a chosen time interval $t1 \leq t \leq t2$, to produce an adjusted or modified autocorrelation function. In one embodiment, the weighting function $w(t;q)$ is positive (or negative) in signal bit value transition regions ($t \approx t1$ and $t \approx t2 = t1 + \Delta\tau_{chip}$) and tends monotonically toward zero as $\tau$ approaches an intermediate time t3 (t1<t3<t2) from either side; this type of non-uniform weighting function is referred to as a "notch" function. The chip half-width $\Delta\tau_{chip}/2 = (t2-t1)/2$ might be chosen to be the inverse of twice the carrier frequency, $(2 f_{carrier})^{-1}$, associated with the reference digital signal $S_d(t)$. The contributions of different portions of the "contribution interval", t1<t<t2, are weighted non-uniformly to reduce the effects of a multipath signal in a central region surrounding a tracking point, as discussed above. In another embodiment, the weighting function $w(t;q)$ is chosen to be an "anti-notch" function, which is defined as a constant minus a notch function. In another embodiment, the weighting function $w(t;q)$ is unrestricted and may have positive, zero and negative values anywhere in the interval t1<t<t2.

One embodiment of the invention disclosed and claimed in this patent application improves the analysis of the autocorrelation functions $AC(\tau;x;qx)$ (x=E, P or L) and of the autocorrelation difference function $\Delta AC(\tau;q)$ by providing at least two distinct weighting functions W1(t;q) and W1#(t;q), at least one of which is non-uniform, and by selecting which weighting function will be used at a given time to compute $AC(\tau;x;qx)$ and $\Delta AC(\tau;q)$ based upon characteristics of two, three or more consecutive incoming digital signal bit values, $b_{n-2}$, $b_{n-1}$ and $b_n$. In a first embodiment, if no bit transition occurs between bit value $b_{n-1}$ and bit value $b_n$, the contribution to the autocorrelation function $AC(\tau;x;qx)$ of the time interval $t \approx t_n$ (corresponding to the bit region where $b_{n-1}$ changes to $b_n$) is ignored or drastically suppressed, by use of a different weighting function than the weighting function used if $b_{n-1} \neq b_n$. In a second embodiment, if (1) no bit value transition occurred between bit value $b_{n-2}$ and bit value $b_{n-1}$ ($b_{n-2} = b_{n-1}$) and (2) a bit value transition occurs between bit value $b_{n-1}$ and bit value $b_n$ ($b_{n-1} \neq b_n$), a first weighting function w1(t;q) is used to compute the autocorrelation functions $AC(\tau;x;qx)$ (x=E, L) and the autocorrelation difference function $\Delta AC(\tau)$. If either or both of these two conditions is not both met, a second weighting function w1´(t;q) (which may be identically zero)

is used to compute the autocorrelation functions AC(τ;x;qx) and the autocorrelation difference function ΔAC(τ;q). One result of this approach is that the contribution of any multipath signal that may be present in a composite signal (direct plus multipath) is further suppressed.

Another embodiment of the invention provides a method for decoding a signal to reduce signal distortion, using the steps of: (1) receiving a signal having at least two consecutive bits, with each bit having a value that is represented in the received signal over a time interval; (2) generating a reference signal having at least two consecutive bits, for matching the received signal; (3) generating a weighting signal, having an amplitude that varies over time, that conforms to (a) a first sequence of weighting values when each bit of a consecutive bit sequence of the reference signal is part of a predetermined bit sequence and (b) a second sequence of weighting values when at least one bit of a consecutive bit sequence of the reference signal is not part of a predetermined bit sequence; and (4) mixing the received signal, the reference signal and the weighting signal to determine a timing relationship between the received signal and the reference signal.

In addition, the first and second sequences of weighting values can be represented in the weighting signal over a selected time interval having a length that is less than the length of the time interval (one chip) for representing one of the bit values, and the selected time interval can be begun a selected time increment before the beginning of a respective time interval for each reference signal bit.

In one version, a reference signal bit sequence having two consecutive bits is examined. The first sequence of weighting values is used when the two consecutive bits have different bit values, and the second sequence of weighting values is used when the two consecutive bits have the same bit value.

In another version, a reference signal bit sequence having three consecutive bits is examined. The first sequence of weighting values is used when (i) the first and second consecutive bits of a three-bit sequence have the same bit value and (ii) the third consecutive bit in the three-bit sequence has a different bit value. The second sequence of weighting values is used when at least one of the conditions (i) and (ii) for use of the first sequence of weighting values is not satisfied.

BRIEF DESCRIPTION OF THE DRAWINGS

FIGS. 22A–22E and 24A–24L are timing diagrams for signals produced by the apparati in FIGS. 21 and 23, respectively.

DESCRIPTION OF BEST MODES OF THE INVENTION

Figure 1A:
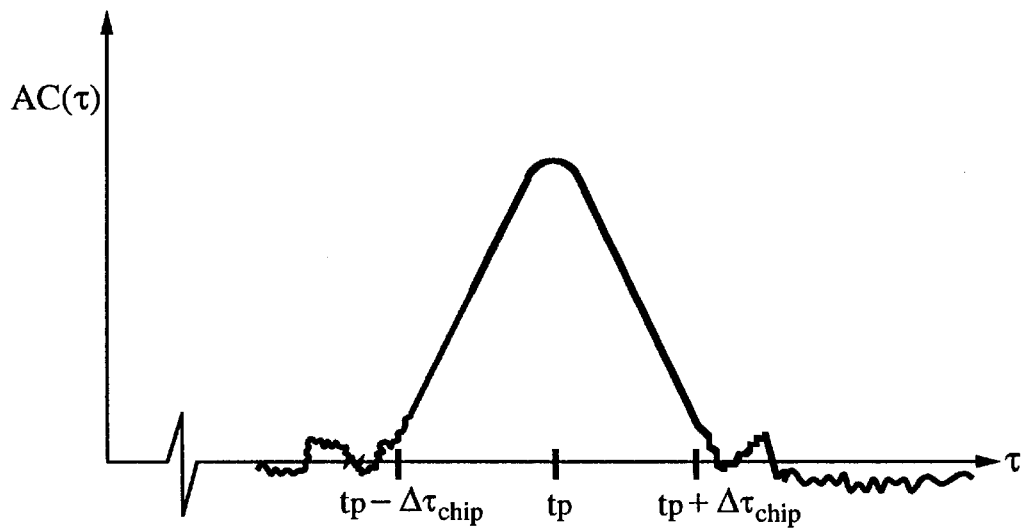
FIGS. 1A and 1B are graphical views of a representative autocorrelation function AC(τ;x) (x=P, E, L).
Figure 1B:
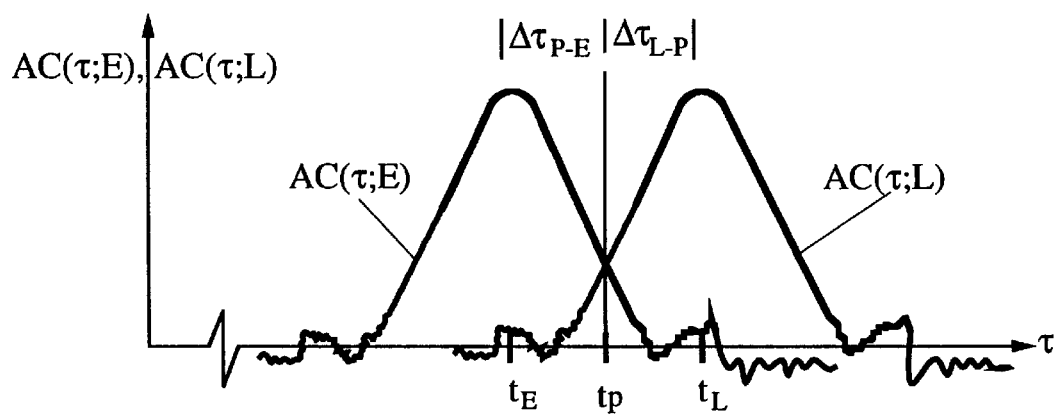
Figure 1C:
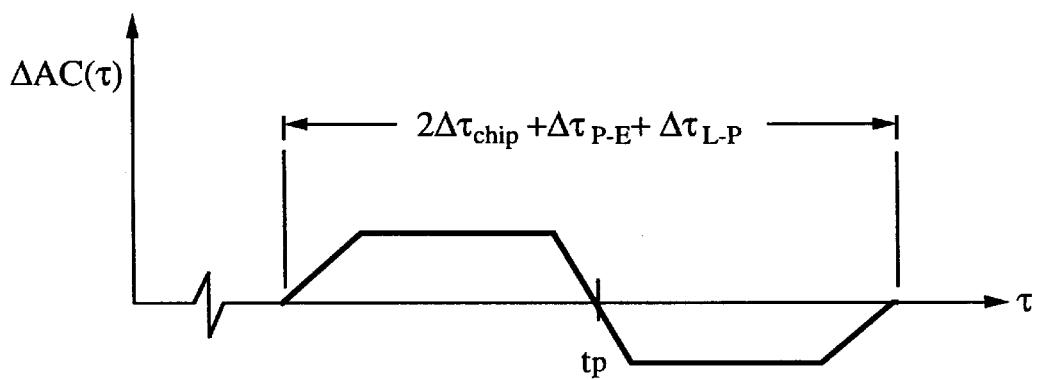
FIG. 1C is a graphical view of an early-minus-late autocorrelation function difference signal ΔAC(τ)=AC(τ;E)−AC(τ;L) formed from the autocorrelation functions shown in FIG. 1B. In all early-minus-late autocorrelation difference functions shown herein, unless otherwise stated, the early-minus-late spacing $\Delta t_{L-E} = t_L - t_E$ is 15 percent of the chip width $\Delta \tau_{chip}$ for definiteness. Other values for $\Delta t_{L-E}$ can be used here.
Figure 4A:
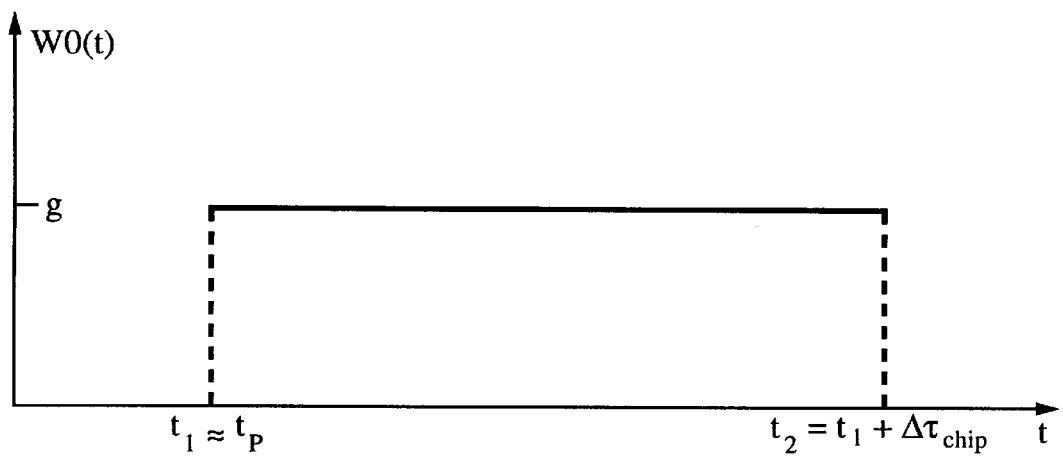
FIG. 4A illustrates a uniform weighting function w0=1.
Figure 4B:
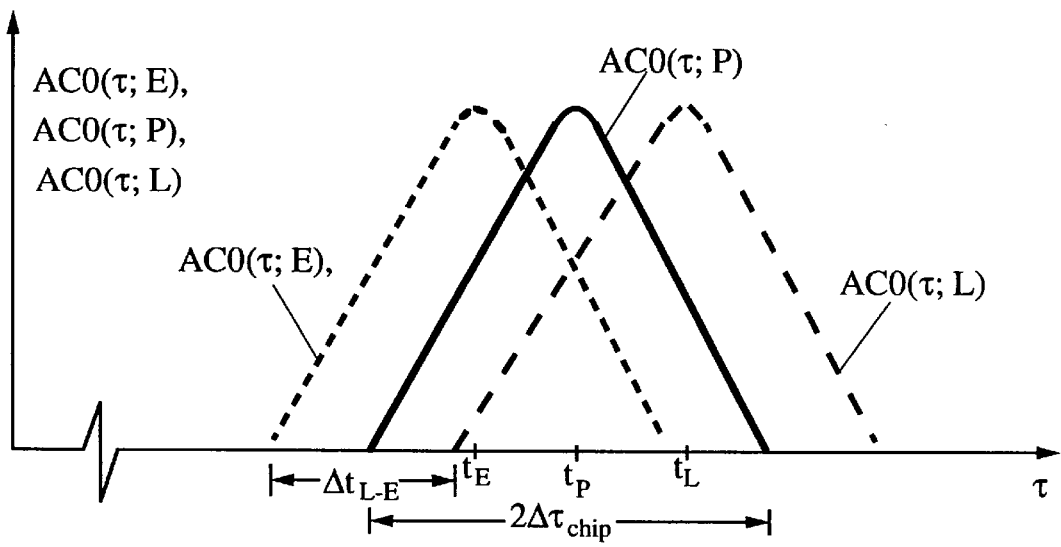
FIGS. 4B and 4C are graphical views of punctual (P), early (E) and late (L) autocorrelation functions AC0(τ;x) and of an early-late autocorrelation difference function ΔAC0(τ), computed conventionally.

In a conventional approach, no variable weighting is used in computing the autocorrelation function. Equivalently, the weighting function applied to the integrand or summand is constant: w0(t)=g (constant)>0, with g=1 preferred, across the contribution interval, for example, $t_P-\Delta\tau_{chip}/2 \leq t \leq t_P + \Delta\tau_{chip}/2$, as illustrated in FIG. 4A. The quantity $\Delta\tau_{chip}$ is the temporal length of one bit in the incoming digital signal of interest. An autocorrelation function AC0(τ), computed without a variable weighting function, has small or vanishing values outside the interval $t_P-\Delta\tau_{chip} \leq t \leq t_P+\Delta\tau_{chip}$, due to the properties of pseudorandom sequences that are used for the direct signal. As the autocorrelation displacement variable τ increases from $\tau=t_P-\Delta\tau_{chip}$ to $\tau=t_P+\Delta\tau_{chip}$, the autocorrelation function increases approximately linearly to a maximum value at a tracking point $\tau \approx t_P$, then decreases approximately linearly beyond the tracking point (FIG. 1A). This conventional approach is equivalent to using the uniform weighting function w0(t), shown in FIG. 4A, in computing a conventional autocorrelation function AC0(τ;x) (x=E, P or L), shown in FIG. 4B, and in computing a conventional early-minus-late autocorrelation difference function ΔAC0(τ), illustrated in FIG. 4C. The time shift values $\tau=t_E$ and $\tau=t_L$ chosen for the approximate peak values of the replica autocorrelation functions AC0(τ;x) (x=E or L) satisfy the constraints $t_P-\Delta\tau_{chip}<t_E<t_P<t_L<t_P+\Delta\tau_{chip}$, where $\tau=t_P$ is the time shift value for the actual peak in the measured autocorrelation function. The time shift values $\tau=t_E$ and $\tau=t_L$ may be, but need not be, chosen symmetrically about time shift value $\tau=t_P$.

Assume that a multipath signal $S_m(t;\Delta t_m)$ is present, with a time delay $\Delta t_m$ and reduced in magnitude relative to the direct signal $S_d(t)$, in the incoming digital composite signal $s(t)=S_d(t)+S_m(t;\Delta t_m)$. The time-delayed and reduced-amplitude multipath signal $S_m(t;\Delta t_m) \approx \chi S_d(t-t_P-\Delta t_m)$ ($|\chi|<1$) is also summed across the contribution time interval in formation of the autocorrelation signal AC(τ;x) (x=E, P or L). Because of linear superposition, the multipath signal $S_m(t;\Delta t_m)$ contributes a proportional amount (reduced in amplitude and delayed in time as indicated) to the early and late autocorrelation functions AC(τ;E) and AC(τ;L) and to the difference function ΔAC(τ)=AC(τ;E)−AC(τ;L) for the incoming digital composite signal s(t). Typical multipath signal contributions to AC(τ;x) (x=E, L) are illustrated in FIGS. 2A, 2B, 2C and 2D.

Figure 2A:
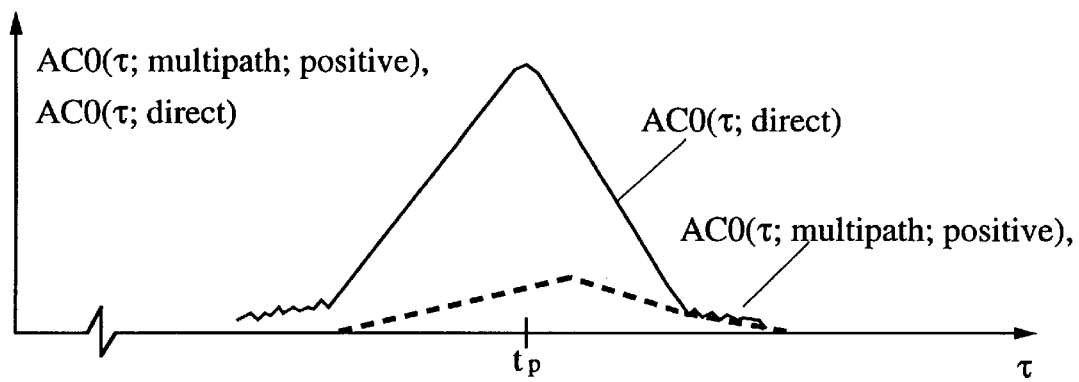
FIGS. 2A and 2B compare an autocorrelation function AC(τ;direct), formed using only a direct signal, with an autocorrelation function AC(τ;multipath) and AC(τ;composite), respectively, where the multipath signal included in the composite signal has positive polarity relative to the direct signal.
Figure 2B:
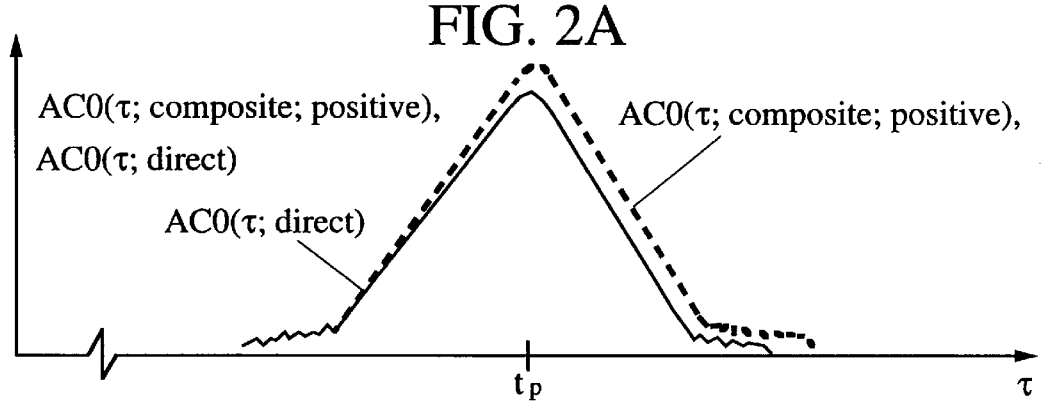
Figure 2C:
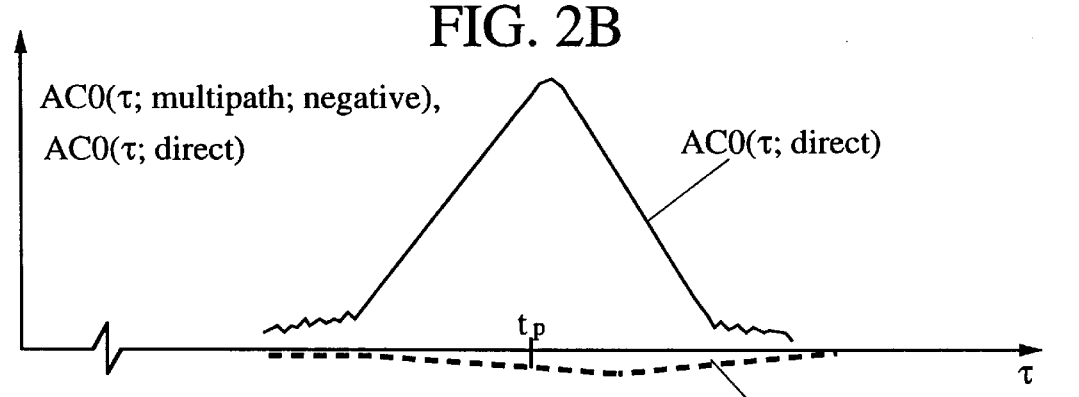
FIGS. 2C and 2D compare an autocorrelation function AC(τ;direct), formed using only a direct signal, with an autocorrelation function AC(τ;multipath) and AC(τ;composite), respectively, where the multipath signal included in the composite signal has negative polarity relative to the direct signal.
Figure 2D:
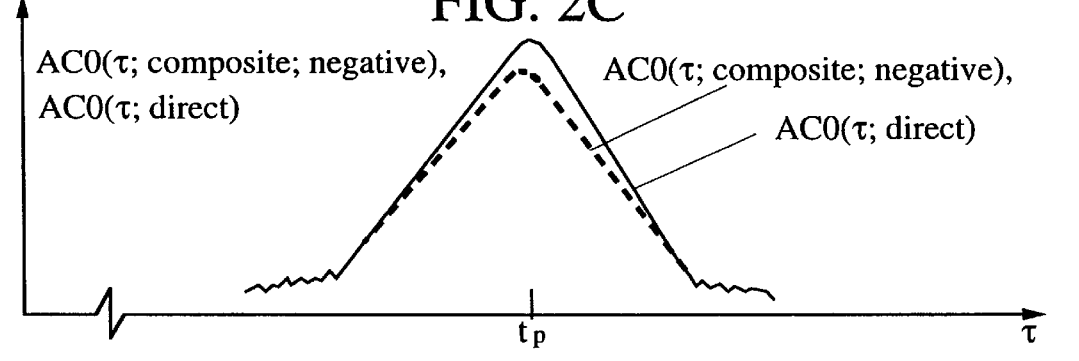

The polarity of a multipath signal $S_m(t\Delta t_m)$ that is part of an incoming digital composite signal may be positive or negative relative to the desired digital direct signal $S_d(t)$. A multipath signal with positive relative polarity will add to the direct signal contribution to the autocorrelation function for a composite signal. FIGS. 2A and 2C compare the autocorrelation function AC(τ;x;direct) with the multipath-only functions AC(τ;x;multipath;positive) and AC(τ;x;multipath;negative) for a "bare" multipath signal having positive and negative multipath relative polarity, respectively. A multipath signal with positive (negative) multipath relative polarity will add to (subtract from) the direct signal contribution in the autocorrelation function AC(τ;x;composite). FIGS. 2B and 2D compare the autocorrelation function ΔAC(τ;x;direct) with the respective composite signal functions AC(τ;x;composite;positive) and ΔAC(τ;x;composite;negative).

Because the effects of presence of a multipath signal are additive, one can analyze the autocorrelation difference functions by using the sum ΔAC(τ;direct)+ΔAC(τ;multipath) or by forming the sum composite signal=direct signal+multipath signal before the autocorrelation difference function ΔAC(τ;composite) is computed.

Figure 3A:
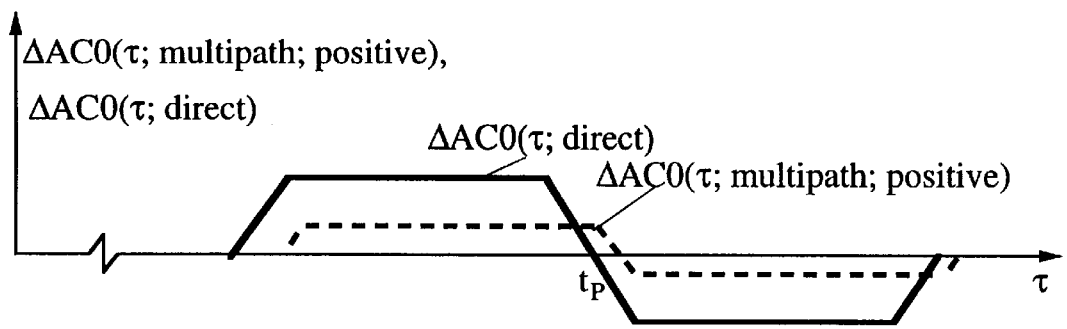
FIGS. 3A and 3B compare an autocorrelation difference function ΔAC(τ;direct), formed using only a direct signal, with an autocorrelation difference function ΔAC(τ;multipath) and ΔAC(τ;composite), respectively, where the multipath signal in the composite signal has positive polarity relative to the direct signal.
Figure 3B:
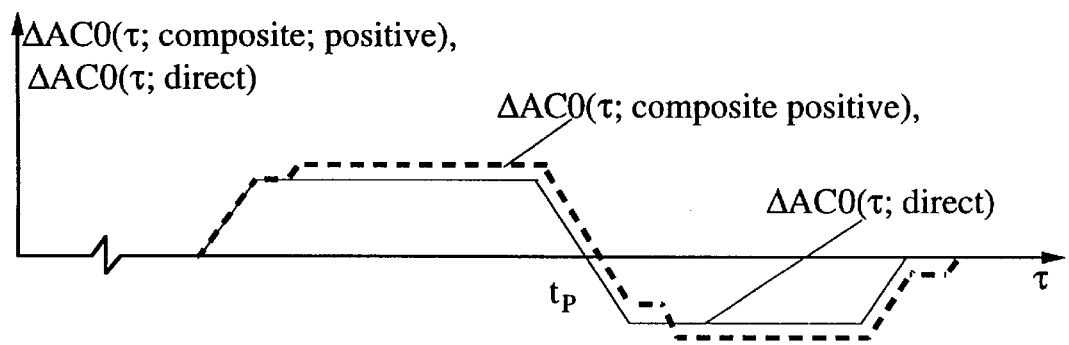
Figure 3C:
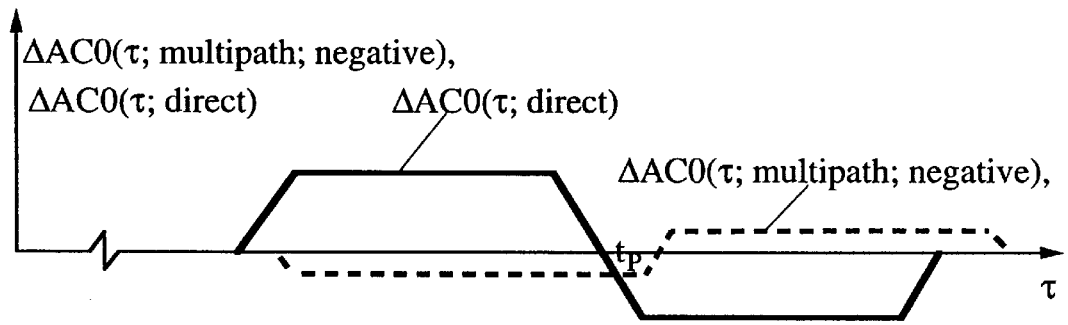
FIGS. 3C and 3D compare an autocorrelation difference function ΔAC(τ;direct), formed using only a direct signal, with an autocorrelation difference function ΔAC(τ;multipath) and ΔAC(τ;composite), respectively, where the multipath signal in the composite signal has negative polarity relative to the direct signal.
Figure 3D:
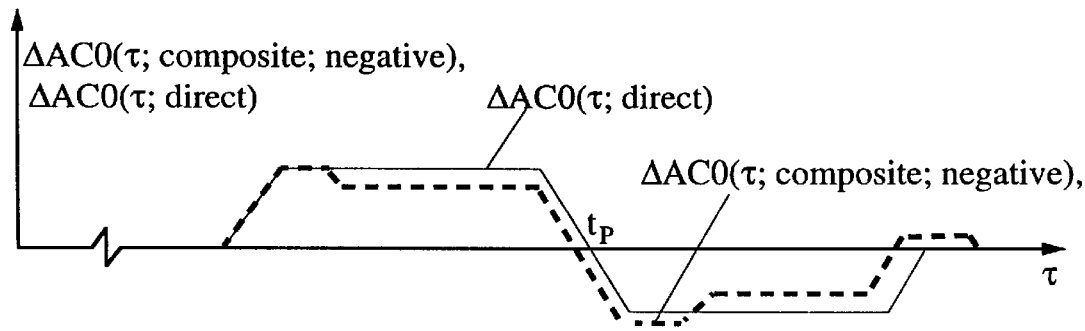

FIGS. 3A and 3C graphically illustrate the autocorrelation difference functions ΔAC(τ;direct) (solid curve) and ΔAC(τ;multipath) (broken line curve) for two representative situations, using the constant weighting function w0(t)=1 in FIG. 4A, where the multipath signal has positive and negative relative polarity, respectively. FIGS. 3B and 3D graphically compare ΔAC(τ;direct) and ΔAC(τ;composite) for positive and negative relative multipath polarity, respectively. Note that the apparent tracking or zero crossing point, where ΔAC(τ;composite) for the composite signal is shifted to the right ($t_{P+}$) or to the left ($t_{P-}$) relative to the desired tracking point $\tau=t_P$ for the direct signal, depending in part on the relative multipath polarity.

Figure 5A:
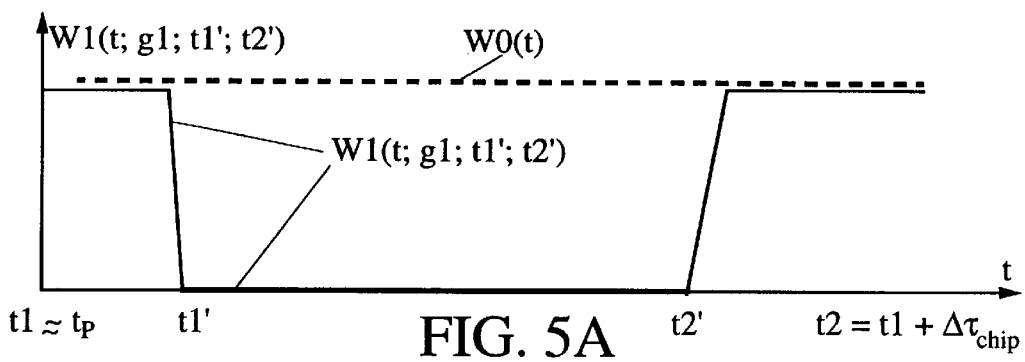
FIGS. 5B and 5C are graphical views comparing an autocorrelation function AC1(τ;x;qx) (x=E, P or L) and an early-late autocorrelation difference function ΔAC1(τ;q), computed using a non-uniform weighting function (two-value step function) w1 shown in FIG. 5A, with AC0(τ;x) and ΔAC0(τ;x).
FIG. 5D illustrates a multi-interval weighting function.
Figure 5B:
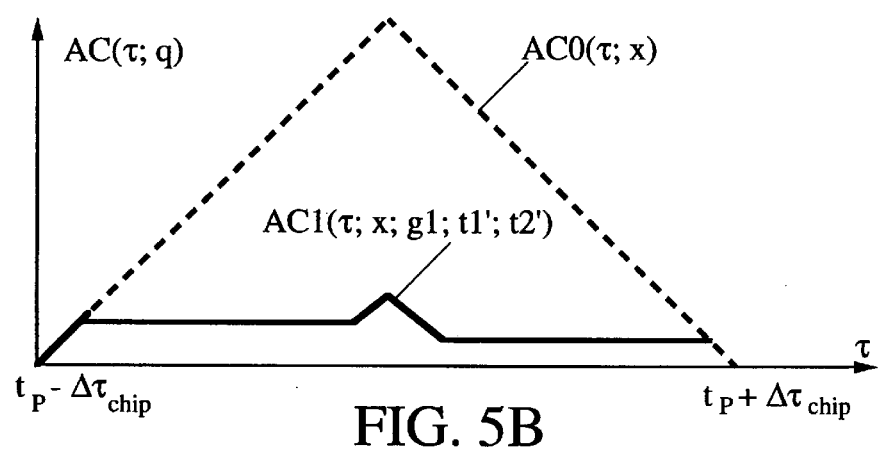
Figure 5C:
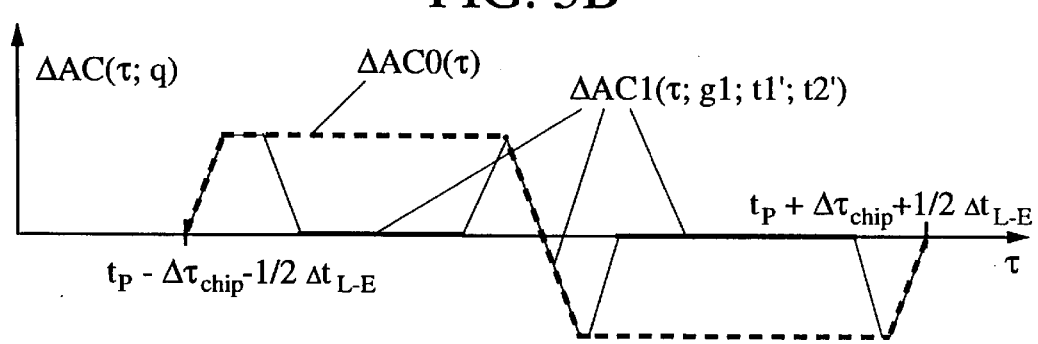

In one embodiment of the invention, illustrated in FIGS. 5A, 5B and 5C, a non-uniform weighting function w1(t;g1;t1';t2') is used that may be continuous or discontinuous and is not necessarily symmetric. The endpoints t1 and t2 of the time interval used for definition of the weighting function, such as w1(t;g1;t1';t2'), satisfy the constraints $$t1 \approx t_P, \quad (2A)$$

$$t2 = t1+\Delta\tau_{chip} \quad (2B)$$

For notational convenience herein, a set of weighting function parameters, such as g1, t1' and t2' for a non-uniform weighting function, such as w1, will often be denoted by a symbol "q". With this notation adopted, this weighting function becomes w1(t;q). In FIG. 5A, the weighting function w1(t;q) is a two-value step function that is non-zero only in regions near $t=t_P$, and near $t=t_P+\Delta\tau_{chip}$. In a center region, away from the tracking points $\tau=t_P$ and $\tau=t_P+\Delta\tau_{chip}$, where no signal bit transition can occur, little or no new qualitative information is presented, and use of a non-uniform weighting function w1(t;q) suppresses or de-emphasizes this largely redundant information, as discussed above.

A weighting function, such as w1(t;q), is preferably extended periodically, using a prescription such as $$w1(t;q)=w1(t+n\,\Delta\tau_{chip};q)\ (n=0,\pm1,\pm2,\ldots). \quad (3)$$

Where non-uniform weighting is used, an autocorrelation function is formed according to one of the prescriptions $$AC(\tau;q) = \int_0^T w(t'+\tau;q)s(t')S_d(t'+\tau)dt', \quad (4A)$$

$$AC(\tau;q) = \sum_{k=1}^K w(t_k+\tau;q)s(t_k)S_d(t_k+\tau), \quad (4B)$$

depending upon whether integration or summation of sampled values over a suitable contribution time interval is used to compute the composite autocorrelation function. The length T of the time interval used to compute the weighted autocorrelation function in Eq. (4A) or (4B) is often chosen to be N times the chip length $\Delta\tau_{chip}$, where N is a large positive integer.

FIG. 5B compares the approximate forms of the conventional punctual autocorrelation function AC0(τ;P), which uses a constant weighting function (w0(t)=1), with an adjusted punctual autocorrelation function AC1(τ;x;q) (x=P), which uses the non-uniform weighting function w1(t;q). The early and late autocorrelation functions AC1(τ;E;q) and AC1(τ;L;q) are formed in a similar manner and have the same shape as the punctual autocorrelation function AC1(τ;P;q).

Figure 4C:
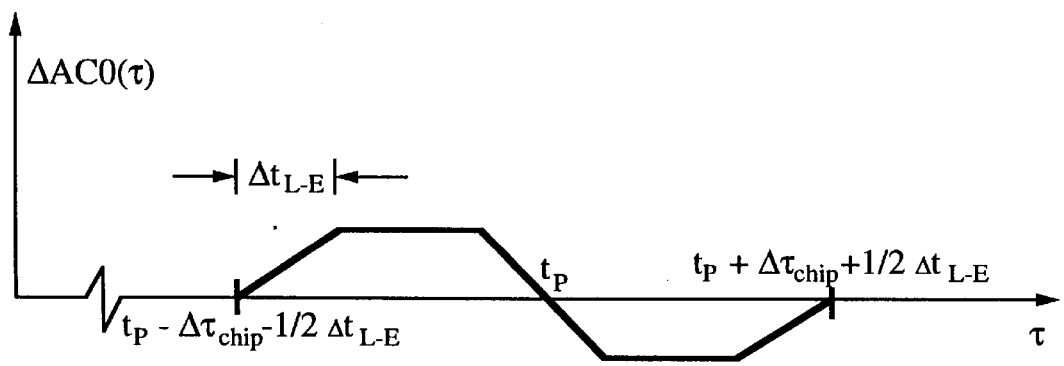

FIG. 5C illustrates the approximate form of the autocorrelation difference function $\Delta AC1(\tau;q)=AC1(\tau;E;q)-AC1(\tau;L;q)$, which should be compared with the corresponding autocorrelation function difference $\Delta AC0(\tau)$, shown in FIG. 4C and repeated as a dashed line curve in FIG. 5C, that uses a uniform weighting function $w0(t)=1$. The spacing intervals $\Delta t_{P-E}=t_P-t_E$ and $\Delta t_{L-P}=t_L-t_P$ are selected to be equal in each of FIGS. 4C and 5C. If the time shift variable $\tau$ for the autocorrelation difference function $\Delta AC1(\tau;q)$ lies a small amount to the left (to the right) of the peak correlation location $\tau=t_P$ or zero crossing value, the tracking system uses the presence of positive (negative) values of $\Delta AC1(\tau;q)$ near this peak correlation location to increase (decrease) the value of the shift variable $\tau$ and drive the autocorrelation function $AC1(\tau;x;q)$ toward its peak correlation value, where $\Delta AC1(\tau;q)=0$.

Figure 5D:
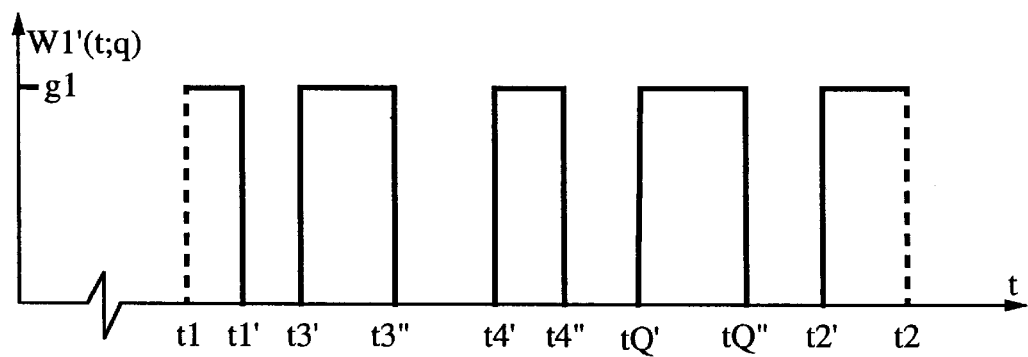

More generally, a non-uniform weighting function $w1'(t;g1;t1';t2';t2''; \ldots ;tn';tn'';t(n+1)')$ that has a sequence of steps of equal amplitude $(=g1)$ in the time intervals $t1<t<t1'$, $tk'<t<tk''$ $(k=3, \ldots Q; Q \geq 3)$ and $t2'<t<t2$, illustrated in FIG. 5D, can be used here.

Where the non-zero amplitudes of the steps are equal, as in FIG. 5A or 5D, use of a non-uniform weighting function, such as $w1(t;q)$ or $w1'(t;q)$, is equivalent to use of non-uniform sampling density in forming the autocorrelation function $AC(\tau;q)$ in Eq. (4A) or (4B). In this non-uniform sampling approach, samples of incoming digital signal values in the regions $t1<t<t1'$, $tk'<t<tk''$ and $t2'<t<t2$ are given a uniform, non-zero weight g, and samples in all other regions are assigned a weight of zero. Alternatively, non-uniform weighting and non-uniform sampling may be combined to compute an autocorrelation function.

Figure 6:
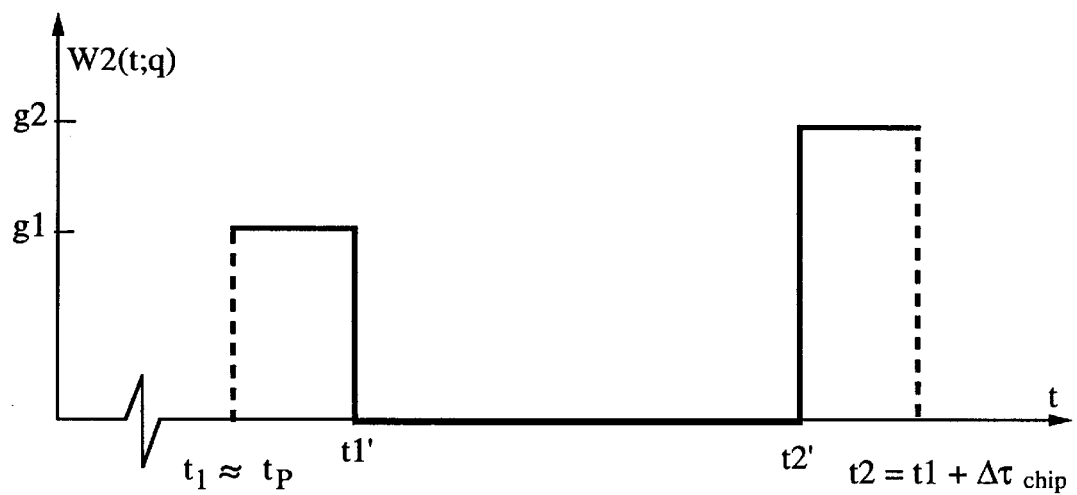
FIGS. 6–16 illustrate other non-uniform weighting functions that can be used with the invention to suppress or to emphasize multipath effects.
Figure 7:
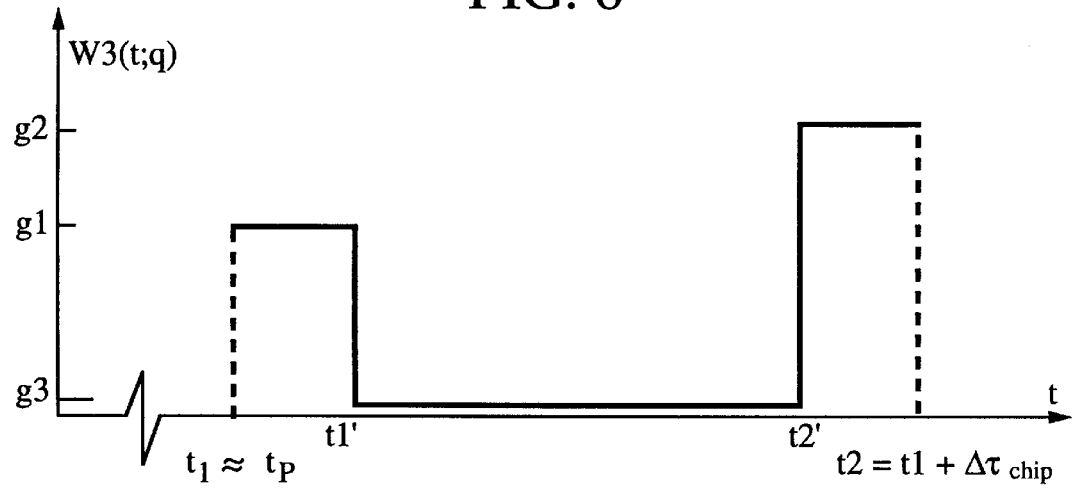
Figure 8:
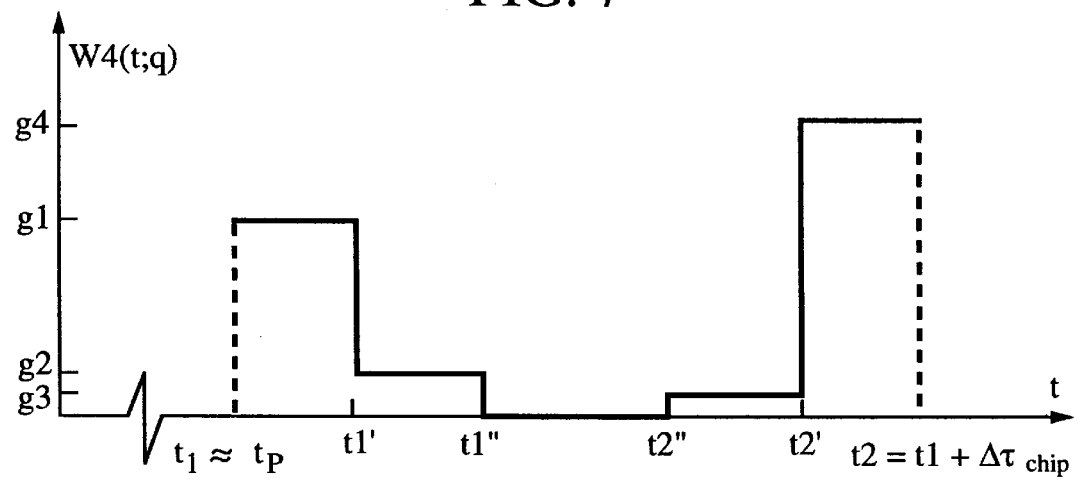
Figure 9:
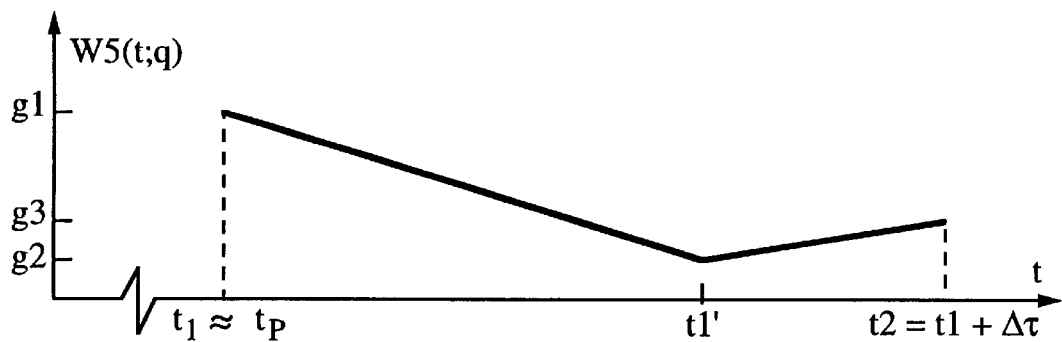
Figure 10:
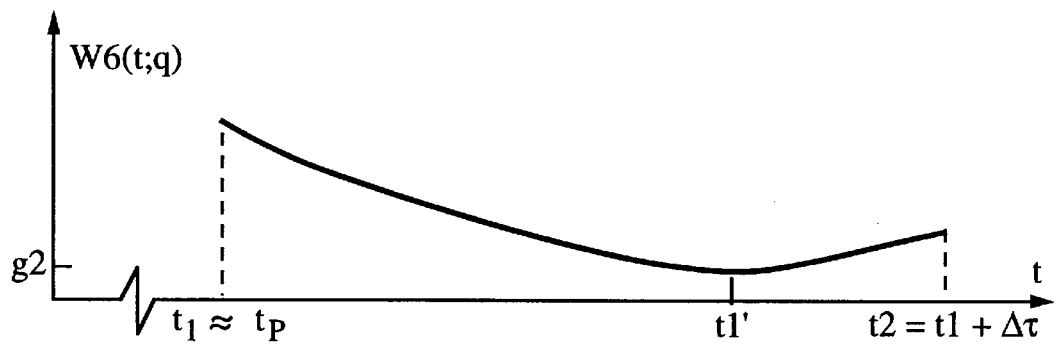
Figure 11:
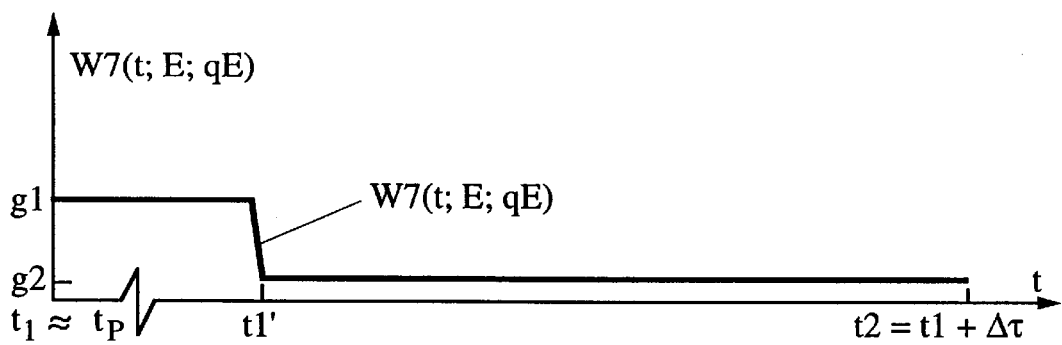
Figure 12:
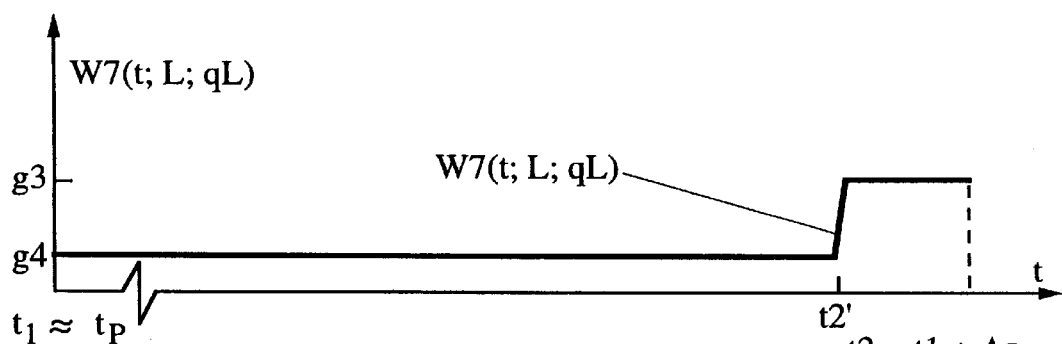

Other suitable non-uniform weighting functions $w(t;q)$, each having one or more parameters q to define the function, are illustrated in FIGS. 6–16. Each of the weighting functions $w2(t;q)$ and $w3(t;q)$ in FIGS. 6 and 7 is a three-step weighting function, with amplitudes g1, g2 and g3, with one of these amplitudes being zero in FIG. 6. FIG. 8 illustrates a five-step weighting function $w4(t;q)$. FIGS. 9 and 10 illustrate a triangular weighting function $w5(t;q)$ and a power law weighting function $w6(t;q)$, respectively. FIGS. 11 and 12 illustrate a first situation in which the weighting functions $w7(t;E;q)$ and $w7(t;L;q)$, used to form the autocorrelation functions $AC(\tau;E)$ and $AC(\tau;L)$, are chosen independently. FIGS. 5–12 illustrate non-uniform weighting functions $wm(t;q)$ $(m=1, 2, \ldots , 7)$ that are "notch" functions. A "notch" function has positive values $w(t1;q)$ and $w(t2;q)$ at the two ends of the defining interval $t1 \leq t \leq t2$ and decreases monotonically toward zero as the time variable t approaches some intermediate value t3 $(t1 \leq t3 \leq t2)$ from either direction within the defining time interval.

Figure 13:
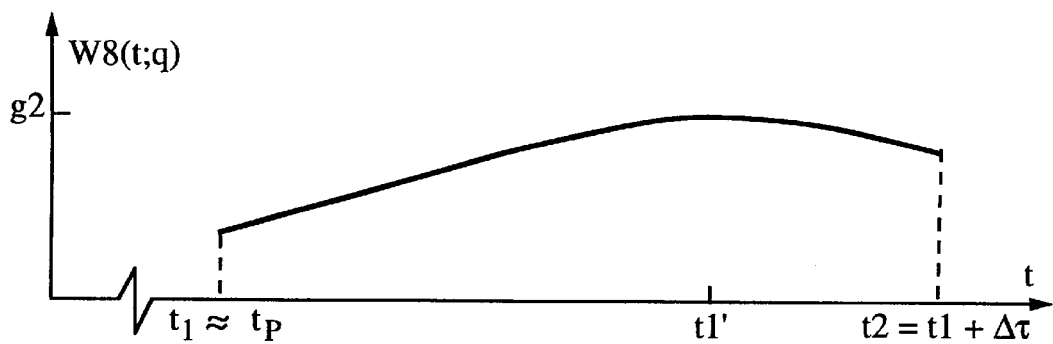
Figure 14:
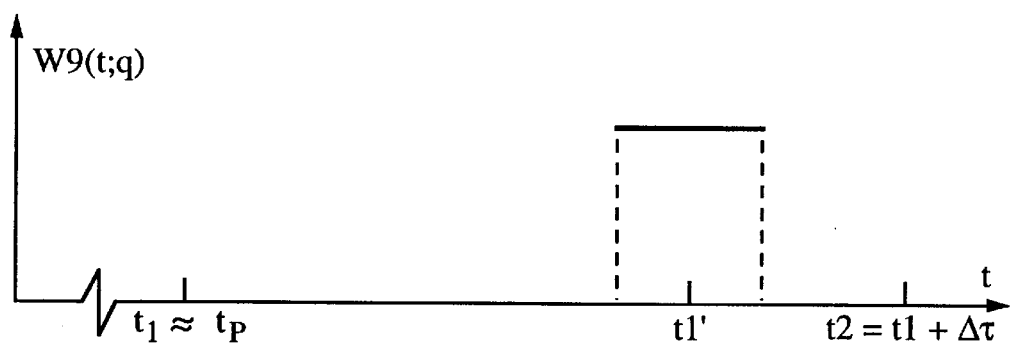

Each of FIGS. 13 and 14 illustrates a non-uniform weighting function, $w8(t;q)$ and $w9(t;q)$, that is an "anti-notch" function, having the form $w(t;q)=g0-w(t;q;notch)$, where g0 is a constant and $w(t;q;notch)$ is a notch function. An anti-notch function can be used to emphasize, rather than suppress, multipath effects in some situations.

Figure 15:
Figure 16:
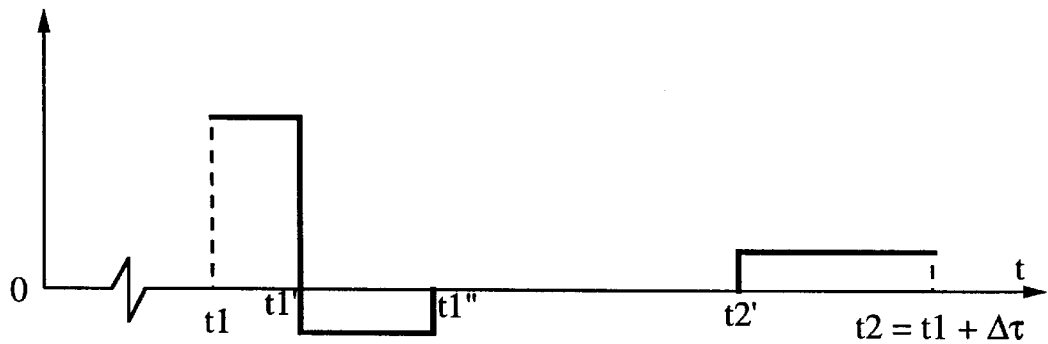

FIG. 15 illustrates another suitable non-uniform weighting function $w10(t;q)$ that is neither a notch function nor an anti-notch function. The non-uniform weighting function $w(t;q)$ need not be non-negative everywhere on the defining interval $t1 \leq t \leq t2$. FIG. 16 illustrates a suitable non-uniform weighting function $w11(t;q)$ that is positive in some regions and negative in some other regions of the defining interval.

In the preceding analysis, the correlator spacings $\Delta t_{P-E}=t_P-t_E$ and $\Delta t_{L-P}=t_L-t_P$ have been chosen to be equal, for definiteness, but this is not required. It is generally required here that $0<\Delta t_{L-E}=\Delta t_{P-E}+\Delta t_{L-P}<2\Delta\tau_{chip}$.

Figure 17A:
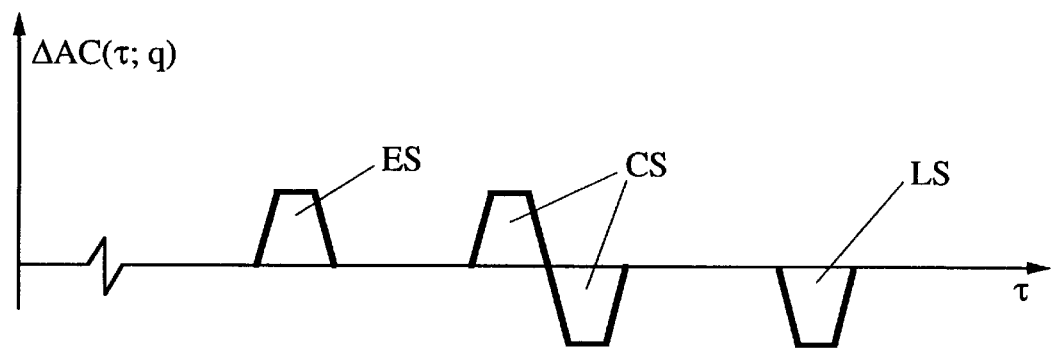
FIGS. 17A and 17B show representative autocorrelation difference functions, before and after application of the invention, respectively.

A multipath signal $S_m(t;\Delta t_m)$, if it is present in an incoming digital composite signal s(t), usually arrives "late," that is, after the direct signal $S_d(t)$ has begun to arrive. FIG. 17A shows an autocorrelation difference function $\Delta AC(\tau;q)$, using the weighting function $w1(t;q)$ shown in FIG. 5A, before application of the invention. Ideally, after application of the invention $\Delta AC(\tau;q)$ appears as in FIG. 17B, where the "early spike" ES has been removed, and only the "late spike" LS (which is irrelevant and thus ignored) and the "central spike" CS remain. This is accomplished in the invention by dynamically changing the weighting function used to compute the autocorrelation functions $AC(\tau;x;qx)$, depending upon the characteristics of a portion of the incoming digital signal that is presently arriving.

Figure 18A:
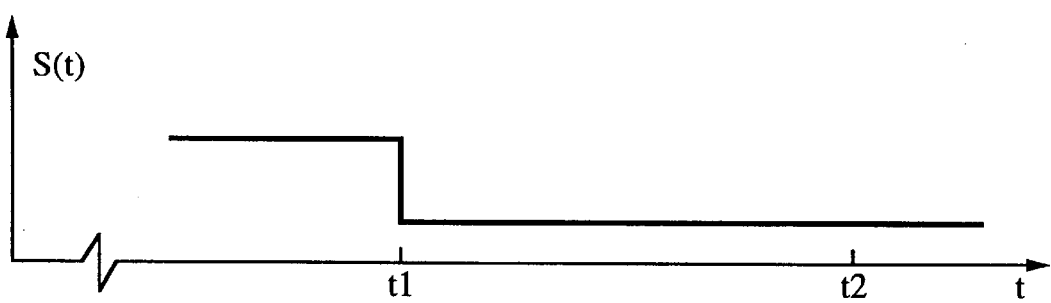
FIGS. 18A, 18B, 18C, 18D and 18E illustrate a weighting function for noise reduction according to the invention.
Figure 18B:
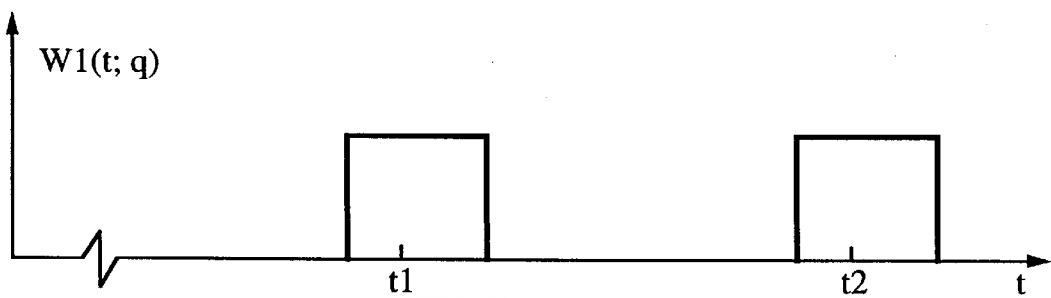
Figure 18C:
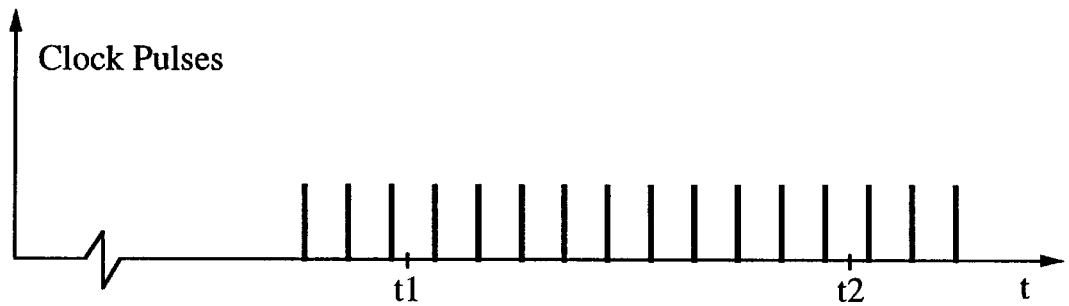
Figure 18D:
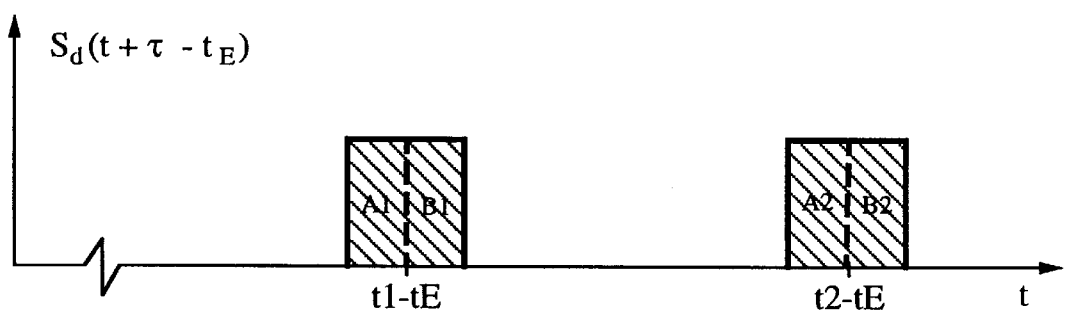
Figure 18E:
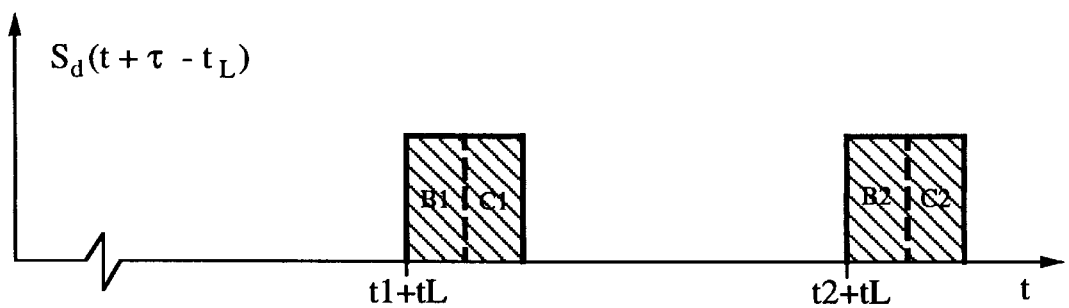

Comparison of consecutive incoming digital signal bit values is useful in reducing the noise associated with computation of the autocorrelation function and the autocorrelation difference function. Where two consecutive incoming digital signal bit values, such as $b_{n-1}$ and $b_n$, differ from each other, a bit value transition has occurred, and useful information is present that is needed to maintain tracking of the incoming digital signal: the signal bit values near $t=t_P$ for both bits should be sampled. Where two consecutive signal bit values coincide, no transition has occurred and no additional useful information is present. Sampling the bit signal values near $t=t_P$ for both bits in this situation will merely introduce additional noise into the computations. A digital direct signal $S_d(t)$, such as the one shown in FIG. 18A, represents the baseband incoming digital direct signal. In FIG. 18A, a bit value transition for $S_d(t)$ occurs near $t=t1$ but does not occur near $t=t2$. The non-zero step, of amplitude g1, for the non-uniform weighting function $w1(t;q)$ is two clock pulses wide and overlaps the time interval endpoints $t=t1$ and $t=t2=t1+\Delta t_{chip}$, as shown in FIG. 18B. A sequence of clock pulses with pulse-to-pulse separation $\Delta t(clock)$ (usually $<\Delta\tau_{chip}$) is shown in FIG. 18C. The weighting function $w1(t;q)$ is superimposed on each of an early replica and a late replica of the digital direct signal $S_d(t+\tau)$ in FIGS. 18D and 18E, where the correlator spacings satisfy $\Delta t_{P-E}=\Delta t_{L-P} \leq \Delta t(clock)/2$.

The weighting function $w1(t;q)$ overlaps the early replica signal domain in the time intervals A1 and B1 and overlaps the late replica signal domain in the time intervals B1 and C1, where a bit value transition occurs in the bit sequence for the incoming digital direct signal $S_d(t)$. The periodic extension of the weighting function $w1(t;q)$ overlaps the early replica signal domain in the time intervals A2 and B2 and overlaps the late replica signal domain in the time intervals B2 and C2, where no bit value transition occurs in the bit sequence for the incoming digital direct signal $S_d(t)$. Let EA and EB (A=A1, A2; B=B1, B2) denote the sampled value of the early replica signal $S_d(t+\tau-t_E)$ in the time intervals A and B, and let LB and LC (B=B1, B2; C=C1, C2) denote the sampled value of the late replica signal $S_d(t+\tau-t_L)$ in the time intervals B and C. Let IA, IB and IC denote the bit values of the incoming digital direct signal $S_d(t)$ in the time intervals A, B and C, respectively.

The contributions to the autocorrelation difference function $\Delta AC1(\tau;q)$ of the early and late replica signals in the regions A1, B1 and C1 are $$\Delta s = g1\ EA1\ IA1 + g1\ EB1\ IB1 - g1\ LB1\ IB1 - g1\ LC1\ IC1. \quad (5)$$

If noise is absent, the value of $\Delta s$ is zero if the system is tracking perfectly. However, if the system is not tracking perfectly, the value of $\Delta s$ will be positive or negative. The net result from the difference function formed in Eq. (5) is a positive or negative contribution to $\Delta AC1(\tau;q)$ from the time intervals A1, B1 and C1 and will indicate whether the value of the tracking variable $\tau$ should be increased or decreased to drive the value $\Delta s=\Delta s(\tau)$ toward zero.

The contributions to the autocorrelation difference function $\Delta AC1(\tau;q)$ of the early and late replica signals in the regions A2, B2 and C2 are $$\Delta s = g1\ EA2\ IA2 + g1\ EB2\ IB2 - g1\ LB2\ IB2 - g1\ LC2\ IC2 = 0, \quad (6)$$

because no bit value transition occurs in the incoming digital direct signal $S_d(t)$, and thus in the early and late replica signals, in any of the time intervals A2, B2 and C2. The net result from the difference $\Delta s$ formed in Eq. (6) is zero contribution to $\Delta AC1(\tau;q)$ from the time intervals A2, B2 and C2. However, noise will contribute to each of the differences formed in Eqs. (5) and (6). For these reasons, if tracking is not perfect, the non-zero contribution of the difference in Eq. (5) to $\Delta AC1(\tau;q)$, where a bit value transition occurs in the incoming digital direct signal $S_d(t)$, should be included in the computation, but the net zero contribution of the difference in Eq. (6) should not be included. Thus, for narrow correlator spacings, if the contribution of noise to a modified autocorrelation difference function $\Delta AC1\#(\tau;q)$ is to be minimized, the signal product difference $$\Delta s_{E-L}(t) = w1(t+\tau-t_E;q)s(t)S_d(t+\tau-t_E) - w1(t+\tau-t_L;q)s(t)S_d(t+\tau-t_L), \quad (7)$$

which contributes to the integral or sum used to compute the autocorrelation difference function $\Delta AC1\#(\tau;q)$, should be included near a possible signal bit value transition point $t \approx t1$ or $t \approx t2$ only if the bit value transition for the incoming digital direct signal $S_d(t)$ satisfies $$\Delta b_n = 1, \quad (8)$$

for the incoming digital signal at or near that time point, where the bit value change function $\Delta b_n$ is defined by $$\Delta b_n = 1 \text{ if } b_{n-1} \neq b_n \quad (9)$$
$$= 0 \text{ if } b_{n-1} = b_n.$$

One method of insuring that the contribution of the signal product difference $\Delta s_{E-L}$ to the autocorrelation difference function $\Delta AC1\#(\tau;q)$ is included only from regions where an incoming digital direct signal bit value transition occurs, is to use the weighting function $$w(t_n;q) = w1(t_n;q) \text{ if } \Delta b_n = 1, \quad (10A)$$

$$w(t_n;q) = w1\hat{}(t_n;q) \text{ if } \Delta b_n = 0, \quad (10B)$$

where $w1\hat{}(t;q)$ is a selected weighting function that is different from $w1(t;q)$ and that suppresses the contribution of the signal product difference $\Delta s_{E-L}$ in the time interval $t_n - \Delta\tau_{chip}/2 \leq t < t_n + \Delta\tau_{chip}/2$. One suitable choice is $w1\hat{}(t;q) = 0$. This approach will minimize the noise contribution from any region that does not affect location of the zero crossing or tracking point for the autocorrelation difference function $\Delta AC1(\tau;q)$.

Figure 19:
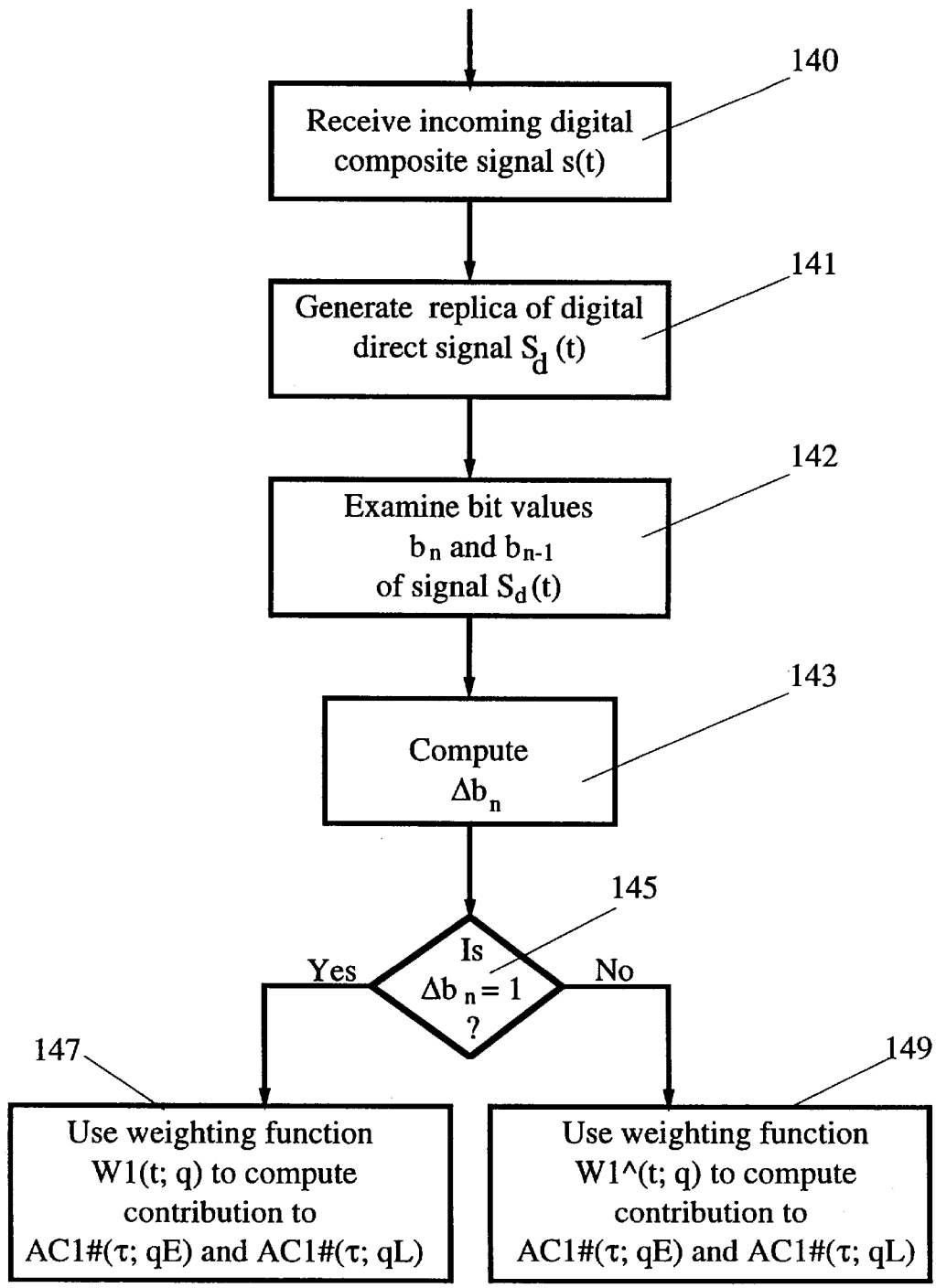
FIG. 19 is a flow chart of one embodiment of a suitable procedure according to the invention.

FIG. 19 is a flow chart illustrating suitable procedural steps that can be taken for analysis of an incoming digital signal according to one embodiment of the invention. In step 140, the incoming digital composite signal s(t) is received. In step 141, a replica of the expected bit sequence for the incoming digital direct signal $S_d(t)$ is generated. In step 142, two consecutive signal bits, with signal bit values $b_{n-1}$ and $b_n$, are received and examined for the digital direct signal $S_d(t)$. In step 143, the bit value change function $\Delta b_n$ is computed. In step 145, the system determines whether $\Delta b_n = 1$. If $\Delta b_n = 1$, a first non-uniform weighting function $W1(t;q)$ is used to compute a contribution to the autocorrelation function $AC1\#(\tau;x;qx)$ (x=E, P or L) and to an autocorrelation difference function $\Delta AC1\#(\tau;q)$, in step 147, by integration or summation of the quantities $W1(t+\tau-t_E;q)s(t)S_d(t+\tau-t_E)$ and $W1(t+\tau-t_L;q)s(t)S_d(t+\tau-t_L)$ over a time interval $I_n$, of length $\Delta\tau_{chip}$ and defined by $$I_n = \{t | t_{n-1} + \Delta < t \leq t_n + \Delta\}, \quad (11)$$

where $\Delta$ is a selected time value satisfying $0 \leq \Delta < \Delta\tau_{chip}$. If $\Delta b_n = 0$, a second weighting function $W1\hat{}(t;q)$ (not necessarily non-uniform) is used to form a contribution to the autocorrelation function $AC1\#(\tau;x;qx)$ (x=E, P or L) and the autocorrelation difference function $\Delta AC1\#(\tau;q)$, in step 149, by integration or summation of the quantities $W1\hat{}(t+\tau-t_E;q)s(t)S_d(t+\tau-t_E)$ and $W1\hat{}(t+\tau-t_L;q)s(t)S_d(t+\tau-t_L)$ over the time interval $I_n$.

Comparison of consecutive incoming digital direct signal bit values is also useful in suppressing the multipath signal contribution in computation of the autocorrelation function and the autocorrelation difference function. Where three consecutive incoming digital direct signal bit values, $b_{n-2}$, $b_{n-1}$ and $b_n$, satisfy the conditions $b_{n-2} = b_{n-1} \neq b_n$, a bit value transition ($b_{n-1 \to bn}$) has occurred, and useful information is present in maintaining tracking of the incoming digital signal: signal bit values for both bits should be sampled. Where $b_{n-1} = b_n$, no transition has occurred and no additional useful information is present. Sampling the bit signal values for both bits in this situation will merely introduce additional noise into the computations. Where $b_{n-2} \neq b_{n-1}$, a bit value transition in the multipath signal, delayed in time by approximately $\Delta\tau_{chip}$ relative to a bit value transition in the corresponding digital direct signal, will appear near the bit value transition point $t = t_n$. Sampling the bit signal values for both bits in this situation will introduce additional multipath noise into the computations. The analysis is similar to the analysis associated with FIGS. 18A–18E. Table 1 indicates the eight possibilities for three consecutive bit values, $b_{n-2}$, $b_{n-1}$ and $b_n$, for an incoming digital direct signal, where $b_n$ is the present bit value and the two consecutive preceding bits (having values $b_{n-2}$ and $b_{n-1}$) have already arrived at the signal receiver.

TABLE 1

| | | | Bit Value Transitions | | |
|---|---|---|---|---|---|
| $b_{n-2}$ | $b_{n-1}$ | $b_n$ | (n − 2)-to-(n − 1) bit transition occurs | (n − 1)-to-n bit transition occurs | Weighting used |
| 0 | 0 | 0 | No | No | w1$\hat{}$ |
| 0 | 0 | 1 | No | Yes | w1 |
| 0 | 1 | 0 | Yes | Yes | w1$\hat{}$ |
| 0 | 1 | 1 | Yes | No | w1$\hat{}$ |
| 1 | 0 | 0 | Yes | No | w1$\hat{}$ |
| 1 | 0 | 1 | Yes | Yes | w1$\hat{}$ |
| 1 | 1 | 0 | No | Yes | w1 |
| 1 | 1 | 1 | No | No | w1$\hat{}$ |

Here, $w1(t;g1;t1';t2')$ is the weighting function shown in FIG. 5A, or some other suitable non-uniform weighting function, and $w1\hat{}(t;q)$ is an alternative weighting function (e.g., $w1\hat{}(t;q) = 0$). Other choices of the weighting function $w1\hat{}(t;q)$ can be used.

One motivation for this approach is as follows. If a multipath signal $S_m(t;\Delta t_m)$, with corresponding time delay $\Delta t_m$, is present in the incoming digital composite signal s(t), this multipath signal will contribute significantly to computation of an autocorrelation difference function $\Delta AC\#(\tau;q)$ only if the multipath signal delay time satisfies $|\Delta t_m| \leq \Delta \tau_{chip} + \Delta t_{L-E}/2$, where $\Delta t_{L-E} = \Delta t_{P-E} + \Delta t_{L-P}$. If $|\Delta t_m| > \Delta \tau_{chip} + \Delta t_{L-E}/2$, this multipath signal contributes nothing to computation of an autocorrelation difference function $\Delta AC\#(\tau;q)$, because of the nature of pseudorandom sequences.

Figure 17B:
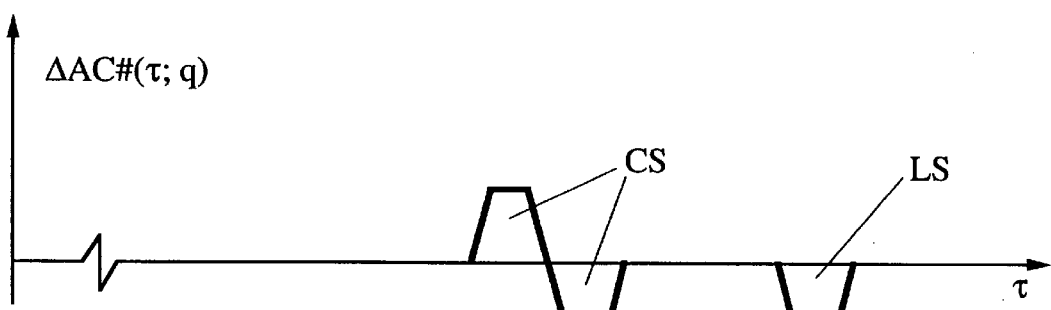

If a bit value transition has not occurred at an immediately preceding bit value transition time (i.e., $b_{n-2} = b_{n-1}$, or $\Delta b_{n-1} = 0$) and a bit value transition occurs at the present bit value transition time (i.e., $b_{n-1} \neq b_n$, or $\Delta b_n = 1$), the contribution of this time interval $I_n$ is emphasized by using the weighting function w1(t;q) to compute the autocorrelation function $AC\#(\tau;x;qx)$. If a bit value transition has occurred at the immediately preceding bit value transition time ($t=t_{n-1}$, where $\Delta b_{n-1} = 1$), a multipath signal $S_m(t;\Delta t_m)$ with an associated time delay $\Delta t_m \approx \Delta \tau_{chip}$ will arrive near the current bit value transition interval ($t \approx t_n$). In this situation, the contribution of this current bit value transition interval In to the autocorrelation function $AC\#(\tau;x;qx)$ should be de-emphasized to de-emphasize the signal information arising from the multipath signal bit value transition (with the associated time delay $\Delta t_m \approx \Delta t_{chip}$). Here, de-emphasis is achieved by using the weighting function w1^(t;q)=0. However, any other weighting function w1^(t;q) that substantially reduces the contribution of the associated time interval $I_n$ to $AC\#(\tau;x;qx)$ (x=E, L) and/or to $\Delta AC\#(\tau;q)$ can be used in place of the weighting function w 1^(t;q)=0. Representative autocorrelation difference functions, $\Delta AC(\tau;q)$ and $\Delta AC\#(\tau;q)$, which would be obtained before and after application of this process, are shown in FIGS. 17A and 17B, respectively.

A formally equivalent approach for identifying the bit value transitions of interest in Table 1 uses the bit value change function $\Delta b_n$, defined in Eq. (9), for the incoming digital signal. The weighting function used for computation of the autocorrelation function $AC\#(\tau;x;qx)$ is selected to be w1(t;q) if $$B_n = (\Delta b_{n-1})^* \cdot \Delta b_n = 1, \quad (12A)$$

and is selected to be w1^(t) if $$B_n = (\Delta b_{n-1})^* \cdot \Delta b_n = 0, \quad (12B)$$

where b* is the Boolean complement for the binary value b (=0 or 1).

The weighting function w1(t;g1;t1',t2') shown in FIG. 5A can be replaced by any other suitable non-uniform weighting function W1(t;q), such as w2(t;q), w3(t;q), w4(t;q), w5(t;q), w6(t;q), w7(t;q), w8(t;q), w9(t;q), w10(t;q), and w11(t;q) shown in FIGS. 6, 7, 8, 9, 10, 11/12, 13, 14, 15 and 16, respectively. The weighting function w1^(t;q) can be replaced by any other weighting function W1^(t;q) that de-emphasizes the corresponding contribution to the autocorrelation function.

Figure 20:
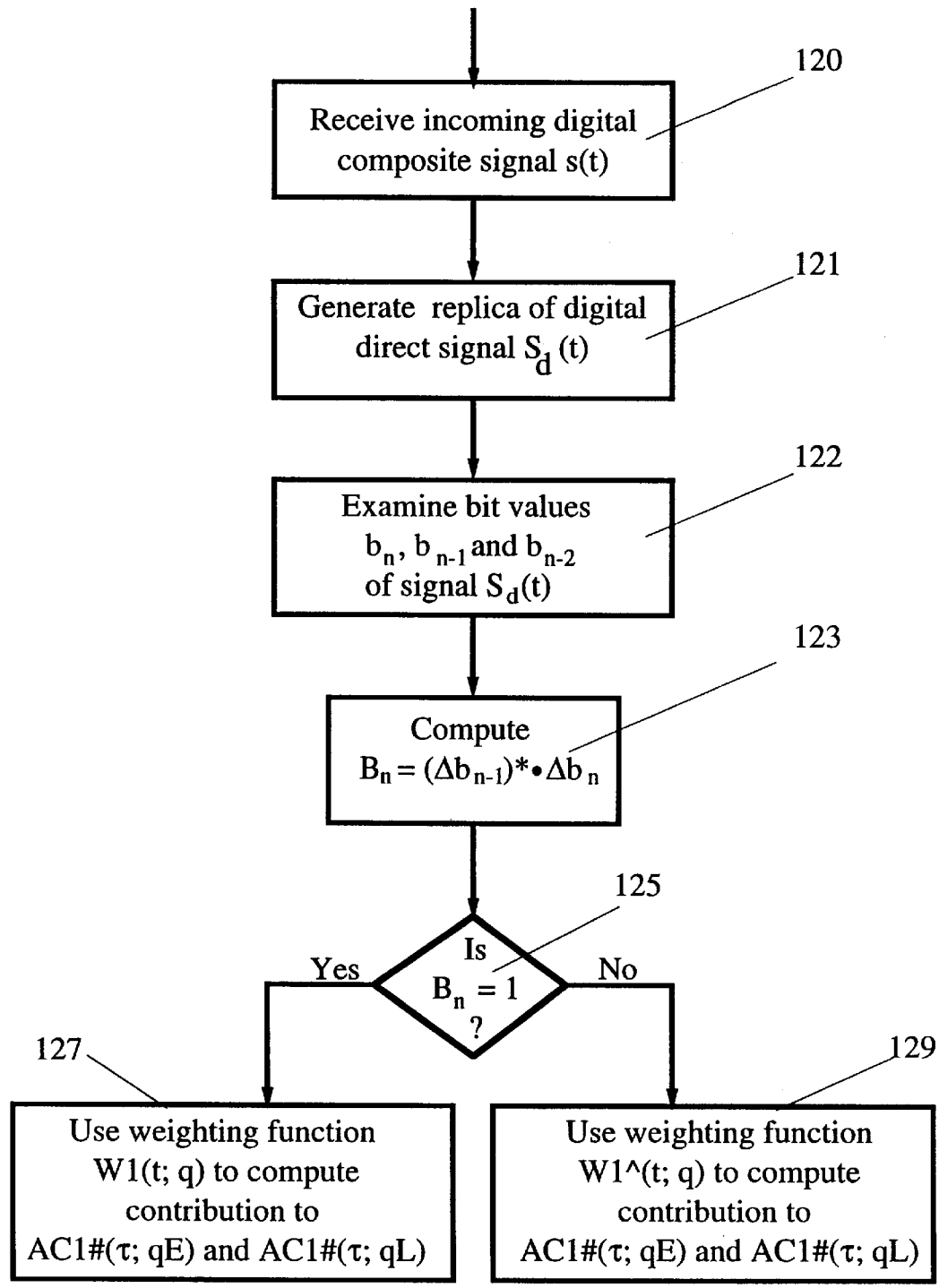
FIG. 20 is a flow chart of a second embodiment of a suitable procedure according to the invention.

FIG. 20 is a flow chart illustrating suitable procedural steps that can be taken for analysis of an incoming digital signal according to one embodiment of the invention. In step 120, the incoming digital composite signal s(t) is received. In step 121, a replica of the incoming digital direct signal $S_d(t)$ is generated. In step 122, three consecutive signal bits, with signal bit values $b_{n-2}$, $b_{n-1}$ and $b_n$, are received for the digital direct signal $S_d(t)$.

In step 123, the value of the Boolean function $B_n = (\Delta b_{n-1})^* \cdot \Delta b_n$ is determined. In step 125, the system determines whether $B_n = 1$. If $B_n = 1$, a first non-uniform weighting function W1(t;q) is used to form a contribution to the autocorrelation function $AC1\#(\tau;x;q)$ (x=E, P or L) and to the autocorrelation difference function $\Delta AC1\#(\tau;q)$, in step 127, by integration or summation of the quantities $W1(t+\tau-t_E;q)s(t)S_d(t+\tau-t_E)$ and $W1(t+\tau-t_L;q)s(t)S_d(t+\tau-t_L)$ over the time interval $I_n$. If $B_n = 0$, a second weighting function W1^(t;q) (uniform or non-uniform) is used to form a contribution to the autocorrelation function $AC1\#(\tau;x;q)$ (x=E, P or L) and the autocorrelation difference function $\Delta AC1\#(\tau;q)$, in step 129, by integration or summation of the quantities $W1^(t+\tau-t_E;q)s(t)S_d(t+\tau-t_E)$ and $W1^(t+\tau-t_L;q)s(t)S_d(t+\tau-t_L)$ over the time interval $I_n$.

As a third embodiment, an alternative or adjunct to dynamically changing the weighting function w(t;q) according to the relative bit values $b_{k-2}$, $b_{k-1}$ and $b_k$ (or $b_{k-1}$ and $b_k$) of the incoming digital signal, the periodicity $M_k$ of the weighting function W1(t;q) can be changed dynamically. This alternative is implemented as follows. For any particular time $t \approx t_k$, the periodicity of the weighting function W1(t;q) is defined by $$W1(t;q) = W1(t+n \, M_k \Delta \tau_{chip};q) \, (n=0, \pm 1, \pm 2, \ldots), \quad (13)$$

where $M_k$ is a positive or negative integer that may vary with the time interval ($t \approx t_k$) within which the time variable t is found. Where $\Delta b_k = 1$ (first embodiment) or $B_k = 1$ (second embodiment), the choice $M_k = 1$ is appropriate in Eq. (13); when $\Delta b_k = 0$ (first embodiment) or $B_k = 0$ (second embodiment), the choice $|M_k| > 1$ is appropriate. In both situations, the same weighting function, such as w1(t;q) shown in FIG. 5A, is used, but with two or more different periodicities.

Implementation

Figure 21:
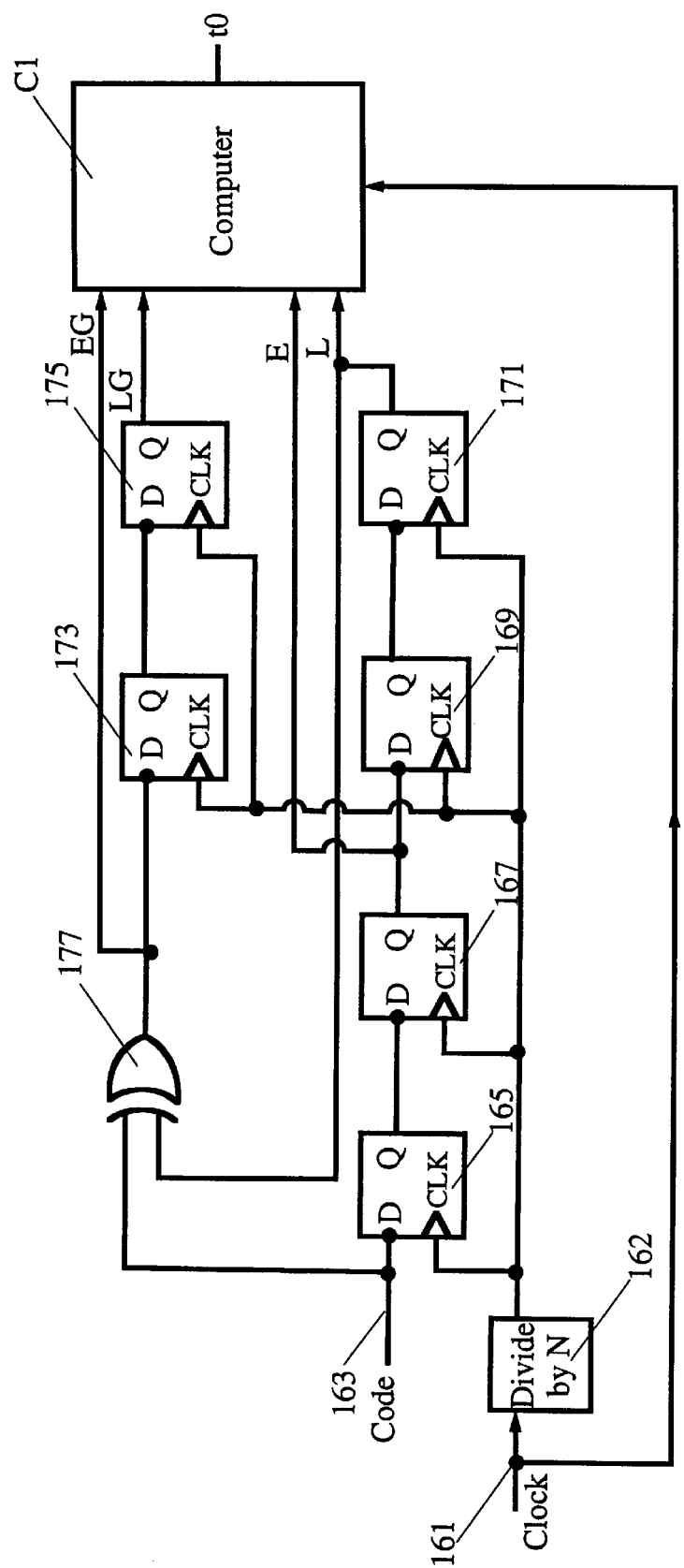
FIGS. 21 and 23 are schematic views of approaches suitable for implementing the two-consecutive-bit and the three-consecutive-bit procedures, respectively.

FIG. 21 illustrates apparatus for implementation of a first embodiment, wherein presence of a bit value transition ($b_{n-1} \neq b_n$) determines whether or not a time interval $I_n$ of length $\Delta \tau_{chip}$ and including the bit value transition time $t=t_n$, is included in the computation for the autocorrelation function $AC1\#(\tau;x;qx)$. A periodic clock pulse signal is provided on a first signal line 161, and a code signal, Code(t;$\tau$)=$S_d$(t+$\tau$), is provided on a second signal line 163. Optionally, the clock pulse signal can be passed through a divide-by-N module 162 that issues a clock pulse after the module 162 has received N consecutive clock pulses on the first signal line 161.

The clock signal is received at the clock input terminal, denoted CLK, of each of a plurality of time delay or "D" flipflops 165, 167, 169, 171, 173 and 175, with the code signal Code(t;$\tau$) being received at the D input terminal of the first flipflop 165. An output signal issues from the Q terminal of the D flipflops 165, 167 and 169 and is received at the D input terminals of the D flipflops 167, 169 and 171, respectively. The output signals from the Q output terminals of the D flipflops 167, 169 and 171 are denoted "E", "P" and "L", respectively. The code signal and the output signal from the Q output terminal of the flip flop 171 are received at two input terminals of an EXclusive OR ("XOR") gate 177. The output signal Code(t;$\tau$)$\oplus$L(t) from the XOR gate 177 is received at the D input terminal of the flipflop 173 and also serves as a gating signal, denoted "EG." The output signal from the Q output terminal of the flip flop 173 is received at the D input terminal of the flipflop 175, and the output signal from the flipflop 175 serves as a second gating signal, denoted "LG." The gating signals EG(t) and LG(t) serve as enable signals for the early and late correlation signals, respectively. That is, if the enable signal is low or "false," the correlator does not accumulate the present contribution to the autocorrelation function $AC1\#(\tau;q)$; and if the enable signal is high or "true," the correlator does accumulate the present contribution to the autocorrelation function AC1#(τ;q). The various output signals from the flipflops and the XOR gate 177 can be expressed mathematically by the relations $$E(t) = \text{Code}(t-2\Delta t;\tau), \quad (14B)$$

$$L(t) = \text{Code}(t-4\Delta t;\tau), \quad (14C)$$

$$EG(t) = XOR(t) = \text{Code}(t;\tau) \oplus L(t), \quad (14D)$$

$$LG(t) = XOR(t-2\Delta t), \quad (14E)$$

where Code(t;τ) is the instantaneous signal that appears on the code line 163 and Δt=Δt(clock) is the minimum period of the clock pulse appearing on the clock line 161. Table 2 sets forth the output signal values of the flipflops and the XOR gate for some sequences of code signals.

TABLE 2

Output Signals For Two-consecutive-bit Scheme

| Code (t; τ) | E (t) | P (t) | L (t) | XOR (t) = EG (t) | LG (t) |
|---|---|---|---|---|---|
| 0 | 0 | 0 | 0 | 0 | 0 |
| 1 | 0 | 0 | 0 | 1 | 0 |
| 1 | 0 | 0 | 0 | 1 | 0 |
| 1 | 1 | 0 | 0 | 1 | 1 |
| 1 | 1 | 1 | 0 | 1 | 1 |
| 1 | 1 | 1 | 1 | 0 | 1 |
| 1 | 1 | 1 | 1 | 0 | 1 |
| 1 | 1 | 1 | 1 | 0 | 0 |
| . . . | | | | | |
| 0 | 1 | 1 | 1 | 1 | 0 |
| 0 | 1 | 1 | 1 | 1 | 0 |
| 0 | 0 | 1 | 1 | 1 | 1 |
| 0 | 0 | 0 | 1 | 1 | 1 |
| 0 | 0 | 0 | 0 | 0 | 1 |
| 0 | 0 | 0 | 0 | 0 | 1 |
| 0 | 0 | 0 | 0 | 0 | 0 |
| . . . | | | | | |
| 1 | 0 | 0 | 0 | 1 | 0 |

The notation ". . ." indicates that the present line in Table 2 will be identical the preceding line, unless and until the code signal Code(t;τ) changes.

Returning to FIG. 21, a digital computer C1 receives the clock pulse signals on the signal line 161 and receives the signals $E(t)=S_d(t+\tau-t_E)$, $L(t)=S_d(t+\tau-t_L)$, EG(t) and LG(t). A memory for the computer C1 contains a weighting functions w(t;E;qE) and w(t;L;qL), which may be the same or may differ from each other. The computer C1 provides a sequence of two or more sampling times $t=t_k$ (k=1, 2, 3, . . .) for an incoming signal that has been frequency converted to baseband, s(t). For a given sampling time $t=t_k$, the computer C1 examines the incoming signals $EG(t_k)$ and $LG(t_k)$. If the value of $EG(t_k)$ is high, the computer computes a first signal product $w(t_k+\tau;E;qE)S_d(t_{k+\tau})s(t_k)$ and adds this to a first accumulated integral or sum that will become the early autocorrelation function AC(τ;E;qE), when fully accumulated. If the value of $EG(t_k)$ is low, the value 0 is added to the first accumulated integral or sum for the sampling time $t_k$. If the value of $LG(t_k)$ is high, the computer computes a second signal product $w(t_k+\tau;L;qL)S_d(t_k+\tau)s(t_k)$ and adds this to a second accumulated integral or sum that will become the late autocorrelation function AC(τ;L;qL), when fully accumulated. If the value of $LG(t_k)$ is low, the value 0 is added to the second accumulated integral or sum for the sampling time $t_k$. The computer C1 computes the difference ΔAC(τ;qE;qL)=AC(τ;L;qL)−AC(τ;E;qE) and determines a value τ=t0 for which ΔAC(t0;qE;qL) changes sign or passes through the value 0. The computer C1 interprets the value t0 as a time at which the desired signal $S_d(t)$, relatively free of the presence of any accompanying multipath signals, arrived at the signal antenna or receiver.

Figure 22A:
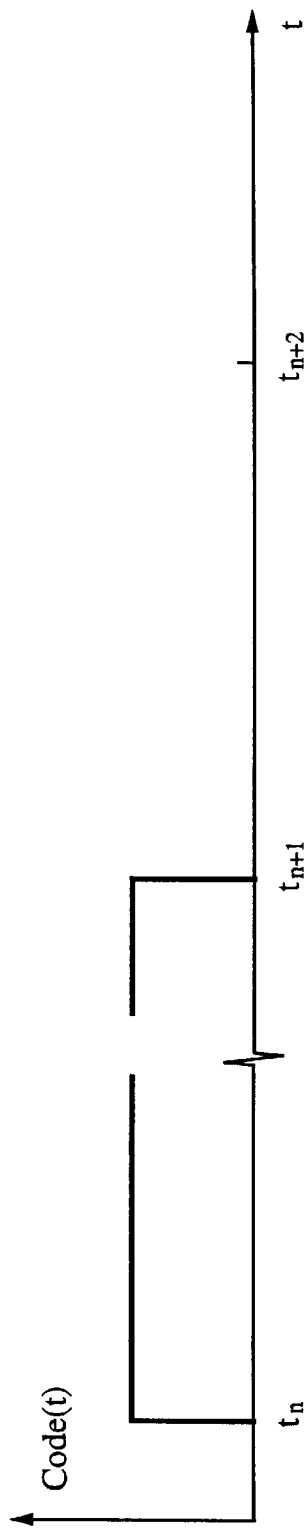
Figure 22B:
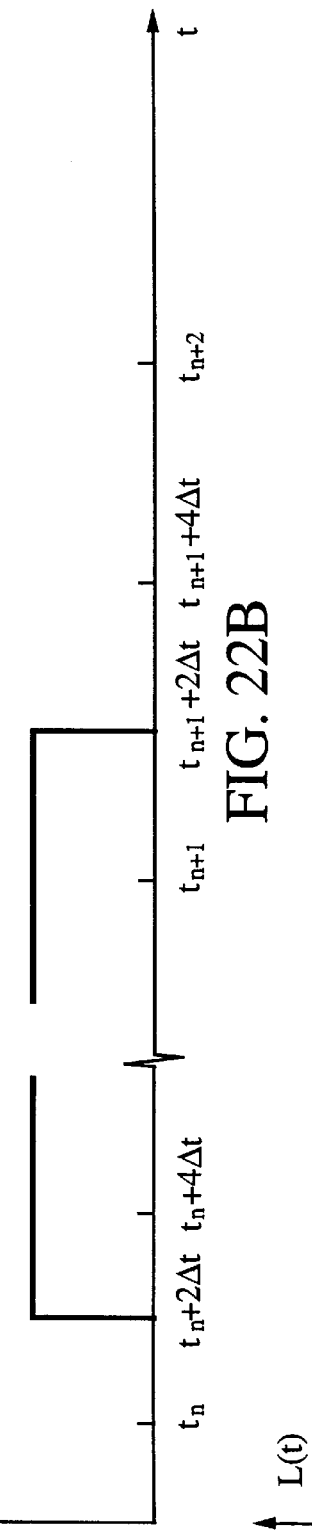
Figure 22C:
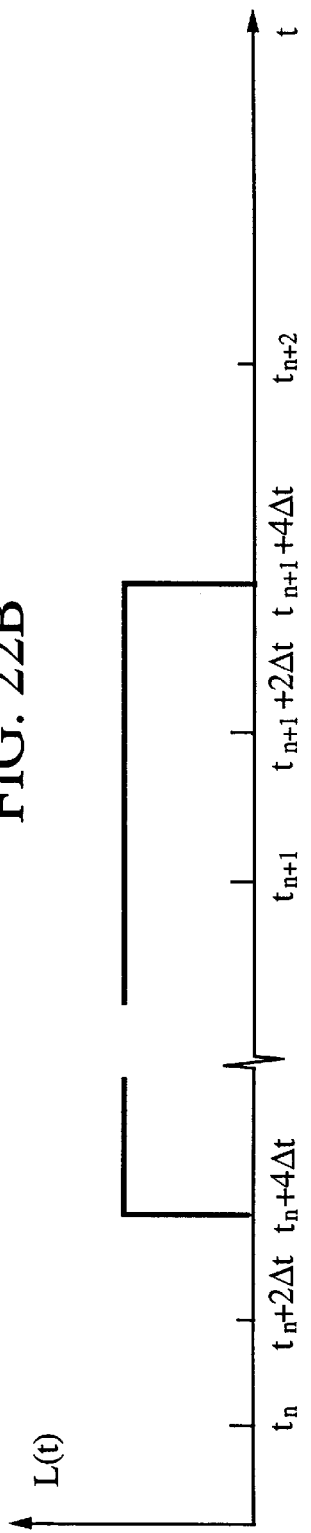

FIGS. 22A, 22B, 22C, 22D and 22E are contemporaneous timing diagrams illustrating how the apparatus shown in FIG. 21 operates where a bit value transition (0→1) occurs at a time $t=t_n$ ($b_{n-1} \neq b_n$), where a second bit value transition (1→0) occurs at a second time $t=t_{n+1}$ ($b_n \neq b_{n+1}$), and where a bit value transition does not occur at a third time $t=t_{n+2}$ ($b_{n+1}=b_{n+2}$). In FIG. 22A, a bit value transition in the code signal Code(t;τ) occurs at time $t=t_n$. An early replica signal E(t) and a late replica signal L(t), corresponding to the bit value transition at $t=t_n$, change from 0 (or low) to 1 (or high) at times $t \approx t_n + 2\Delta t$ and $t \approx t_n + 4\Delta t$, respectively, as shown in FIGS. 22B and 22C. The signal EG(t)=XOR(t) shown in FIG. 22D changes from 0 to 1 at a time $t \approx t_n$ and changes from 1 to 0 at a time $t \approx t_n + 4\Delta t$, when the signal L(t) changes from 0 to 1, assuming that the code signal Code(t;τ) has not changed in the time interval $t_n \leq t < t_n + 4\Delta t$. The early gating signal EG(t) thus acts as an enable signal for the early signal correlation and is high (EG(t)=1) only during the time interval $t_n \leq t < t_n + 4\Delta t$. In a similar manner, the late gating signal LG(t), shown in FIG. 22E, acts as an enable signal for the late signal correlation and is high only during the time interval $t_n + 2\Delta t \leq t < t_n + 6\Delta t$. For ease of illustration, it is assumed that $t_{n+1} - t_n > 4\Delta t$ here.

At a second time $t=t_{n+1}$, the code signal Code(t;τ) changes from 1 to 0, as shown in FIG. 22A. The early replica signal E(t) and the late replica signal L(t) change from 1 to 0 at the times $t=t_{n+1}+2\Delta t$ and $t=t_{n+1}+4\Delta t$, as shown in FIGS. 22B and 22C, respectively. The early gating signal EG(t) and the late gating signal LG(t), shown in FIGS. 22D and 22E, respectively, become high only during the time intervals $t_{n+1} < t \leq t_{n+1}+4\Delta t$ and $t_{n+1}+2\Delta t < t \leq t_n+1+6\Delta t$, respectively. The early gating signal EG(t) and the late gating signal LG(t) thus serve as enable signals for the early signal correlation and the late signal correlation, whenever the signal Code(t;τ) changes from 0 to 1 or from 1 to 0.

At a third time $t=t_{n+2}$, the code signal Code(t;τ) does not change, as shown in FIG. 22A, over a time interval of length, say, greater than 4Δt. During this last time interval, Code(t;τ), E(t) and L(t) have the same value (0 or 1) so that XOR(t)=Code(t;τ)⊕L(t) is 0 over this time interval, as are the gating signals EG(t) and LG(t). The early and late enable signals remain low (0) in this situation, as should occur where no bit value transition occurs.

Figure 23:
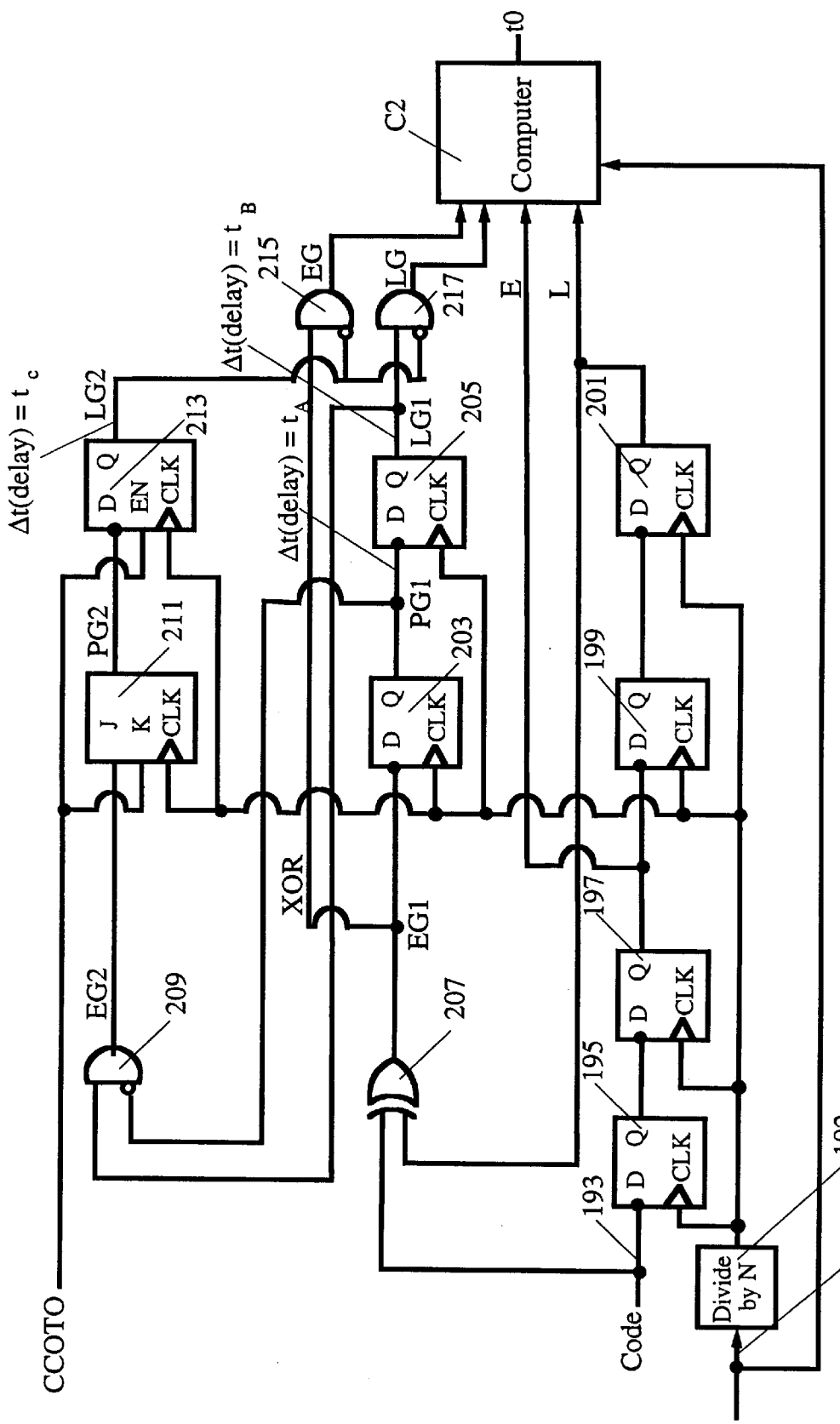

FIG. 23 illustrates apparatus for implementation of the second (three-bit transition) embodiment, wherein the value of $B_n = (\Delta b_{n-1})^* \cdot \Delta b_n$ determines whether or not the interval $I_n$ is included in the computation for the autocorrelation function AC1#(τ;x;qx). A periodic clock pulse signal is provided on a first signal line 191, and a code signal, Code(t;τ)=$S_d$(t+τ), is provided on a second signal line 193. The clock signal is received at the clock input terminal, denoted CLK, of each of a plurality of time delay or "D" flipflops 195, 197, 199, 201, 203, 205 and 213 and at a JK flipflop 211. The code signal is received at the D input terminal of the first flipflop 195. An output signal issues from the Q terminal of the D flipflops 195, 197 and 199 and is received at the D input terminals of the D flipflops 197, 199 and 201, respectively. The output signals from the Q output terminals of the D flipflops 197, 199 and 201 are denoted "E", "P" and "L", respectively. Optionally, a divide-by-N module 192 is included for the clock pulse signals.

The code signal and the output signal from the Q output terminal of the flip flop 201 are received at two input terminals of an EXclusive OR ("XOR") gate 207. The output signal Code(t;τ)⊕L(t) from the XOR gate 207 is received at the D input terminal of the flipflop 203. The output signal from the Q output terminal of the flip flop 203 is received at the D input terminal of the flipflop 205. The output signal from the flipflop 203 is also received and inverted at a first input terminal of an AND gate 209. The output signal from the flipflop 205 is received at a second input terminal of the AND gate 209. The output signal from the AND gate 209 is received at the "J" input terminal of a JK flipflop 211, and the "K" input terminal receives a CCOTO signal, which is discussed below. The output signal from the JK flipflop 211 is received at the D input terminal of a D flipflop with enable 213 (referred to here as a D/EN flipflop).

The output signal from the XOR gate 207 and the inverted output signal from the flipflop 213 are received at two input terminals of an AND gate 215, whose output signal is a first gating signal, denoted "EG." The output signal from the flipflop 205 and the inverted output signal from the flipflop 213 are received at two input terminals of an AND gate 217, whose output signal is a second gating signal, denoted "LG." A table of value assignments similar to that shown in Table 2 is easily set down for the apparatus in FIG. 23.

Figure 24A:
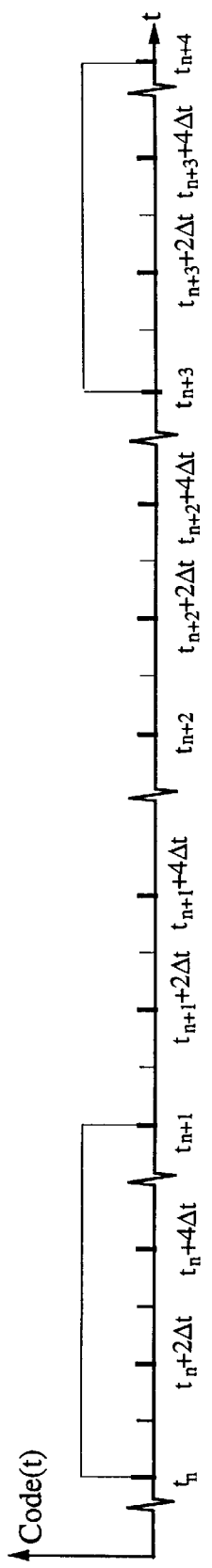
Figure 24B:
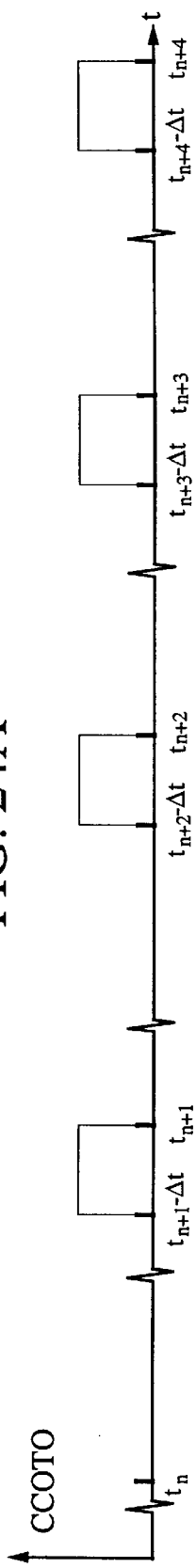
Figure 24C:
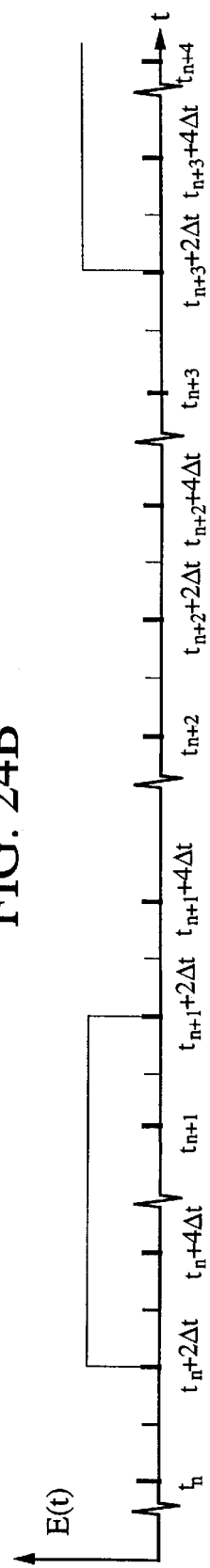
Figure 24D:
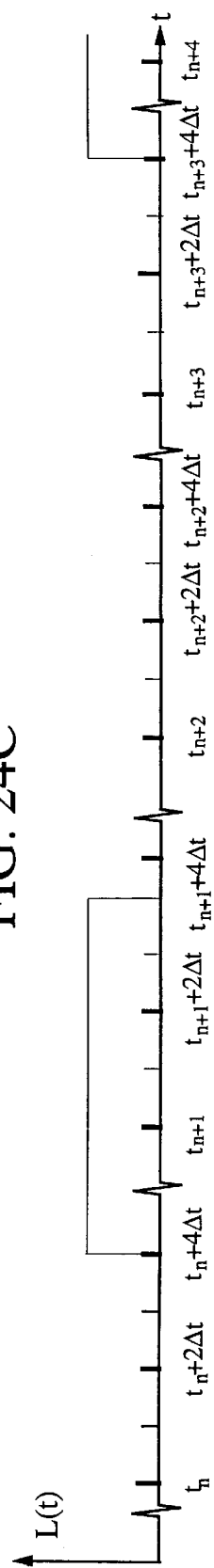
Figure 24I:
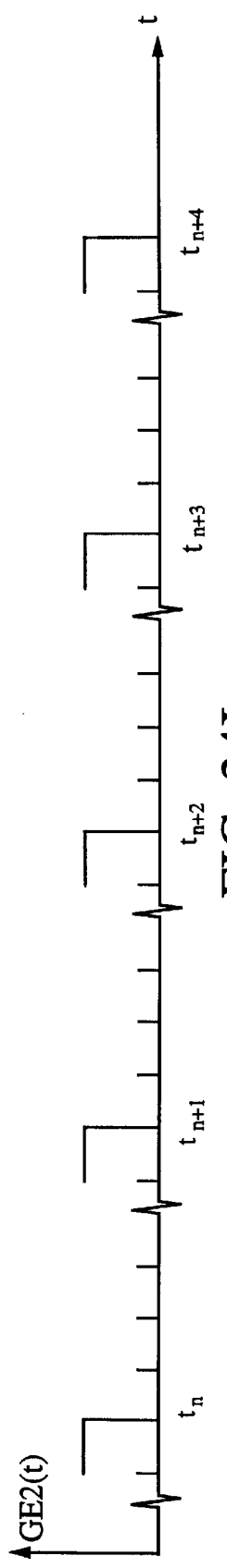
Figure 24J:
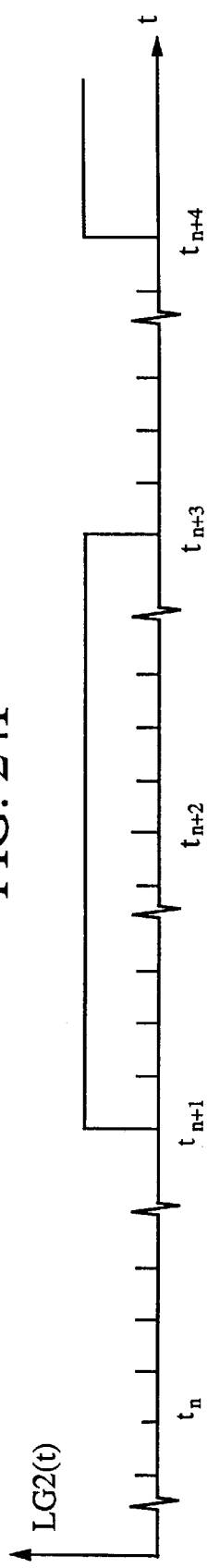
Figure 24K:
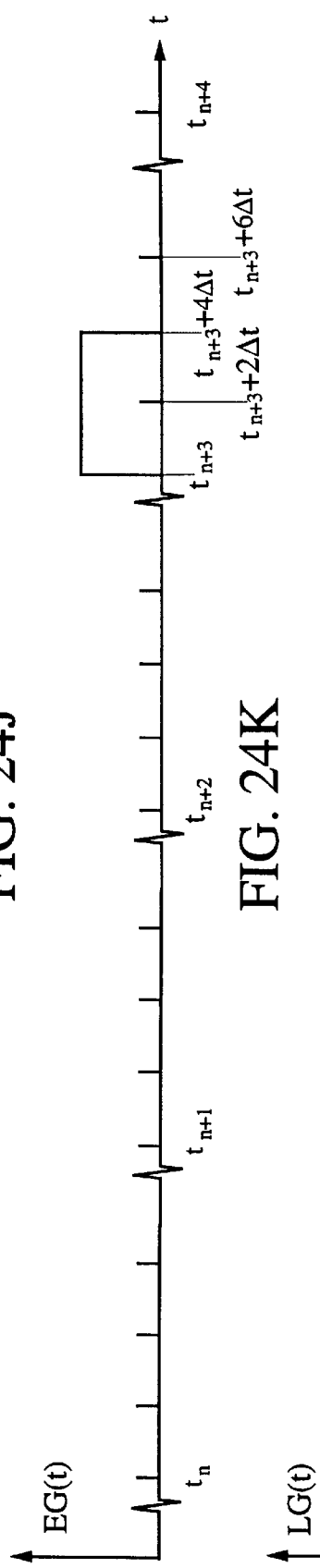
Figure 24L:
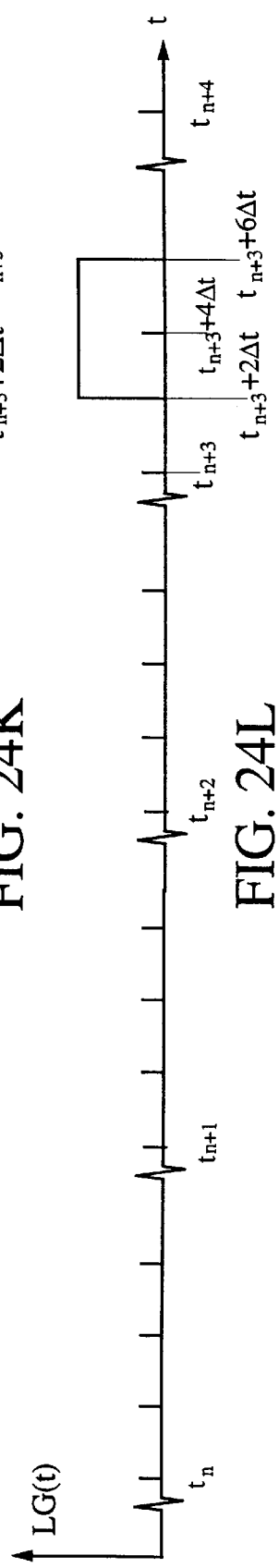

FIGS. 24A–24L are contemporaneous timing diagrams illustrating how the apparatus shown in FIG. 23 operates where a bit value transition (0→1 or 1→0) occurs in the code signal Code(t;τ) at times $t=t_n(b_{n-1} \neq b_n)$, $t=t_{n+1}(b_n \neq b_{n+1})$, $t=t_{n+3}(b_{n+2} \neq b_{n+3})$ and $t=t_{n+4}(b_{n+3} \neq b_{n+4})$, and does not occur at times $t=t_{n+2}(b_{n+1}=b_{n+2})$ and $t=t_{n+5}(b_{n+4}=b_{n+5})$, as shown in FIG. 24A. For ease of illustration, it is assumed that $t_{n+1}-t_n=\Delta t_{chip}>6\Delta t$. FIG. 24B illustrates the signal CCOTO(t), which is defined by $$CCOTO(t) = 1 \quad (t_r - \Delta t \leq t < t_r) \quad (15B)$$
$$= 0 \quad (t_r \leq t < t_{r+1} - \Delta t; r = 1, 2, \ldots)$$

The CCOTO signal goes high one clock pulse interval before each chip transition time occurs (at $t=t_r-\Delta t$), for one clock pulse interval, and is low at all other times. This particular choice is used for illustrative purposes in FIGS. 23 and 24B. Other choices of the CCOTO signal can also be used, with appropriate changes in the apparatus shown in FIG. 23. The signals $$E(t)=Code(t-2\Delta t;\tau), \quad (15C)$$
$$L(t)=Code(t-4\Delta t;\tau), \quad (15D)$$
$$EG1(t)=Code(t;\tau)\oplus L(t), \quad (15E)$$
$$PG1(t)=EG1(t-\Delta t), \quad (15F)$$
$$LG1(t)=EG1(t-2\Delta t), \quad (15G)$$
$$EG2(t)=LG1(t)\cdot PG1(t)^*, \quad (15H)$$
$$PG2(t)=F_{J,K}(EG2(t), CCOTO(t)), \quad (15I)$$
$$LG2(t)=F_{D,EN}(PG2(t), CCOTO(t)), \quad (15J)$$
$$EG(t)=EG1(t)\cdot LG2(t)^*, \quad (15K)$$
$$LG(t)=LG1(t)\cdot LG2(t)^*, \quad (15L)$$

are shown in FIGS. 24C–24L, respectively. The functions $F_{J,K}(f(t), g(t))$ and $F_{D,EN}(f(t), g(t))$ are determined by the output signals for the JK flipflop 211 and for the D/EN flipflop 213, viz.

$$F_{J,K}(f(t), g(t)) = \text{last output state} \quad (f(t)=0 \; g(t)=0) \quad (16)$$
$$= 0 \quad (f(t)=0, g(t)=1)$$
$$= 1 \quad (f(t)=1, g(t)=0)$$
$$= (\text{last output state})^* \quad (f(t)=1, g(t)=1),$$

$$F_{D,EN}(f(t), g(t)) = \text{last output state} \quad (f(t)=0 \; g(t)=0) \quad (17)$$
$$= 0 \quad (f(t)=0, g(t)=1)$$
$$= \text{last output state} \quad (f(t)=1, g(t)=0)$$
$$= 1 \quad (f(t)=1, g(t)=1),$$

The timing diagrams shown in FIGS. 24A–24L can be verified by analysis similar to that employed for FIGS. 22A–22E. The gating signal EG(t) is high, indicating enablement, only for times in the interval $t_{n+3} \leq t \leq t_{n+3}+4\Delta t$, which includes the only code signal transition point ($t=t_r$ with r=n+3) for which $B_r=(\Delta b_{r-1})^* \cdot \Delta b_r=1$ in FIG. 24A; that is, $B_n=B_{n+1}=B_{n+2}=B_{n+4}=B_{n+5}=0$ in FIG. 24A. Similarly, the gating signal LG(t) is high, indicating enablement, only for times in the interval $t_{n+3}+2\Delta t \leq t \leq t_{n+3}+6\Delta t$.

Returning to FIG. 23, a computer C2 receives the clock pulse signals on the signal line 191 and receives the signals $E(t)=S_d(t+\tau-t_E)$, $L(t)=S_d(t+\tau-t_L)$, EG(t) and LG(t). The computer C2 provides the weighting functions w(t;E;qE) and w(t;L;qL). forms the first and second signal products $w(t_k+\tau;E;qE)S_d(t_k+\tau)s(t_k)$ and $w(t_k+\tau;L;qL)S_d(t_k+\tau)s(t_k)$, computes the first and second accumulations AC(τ;E;qE) and AC(τ;L;qL), forms the accumulation difference ΔAC (τE;qE;qL), determines a time shift value τ=t0 at which the accumulation difference changes sign, and interprets the value t0 exactly as does the computer C1 in FIG. 21.

Figure 25:
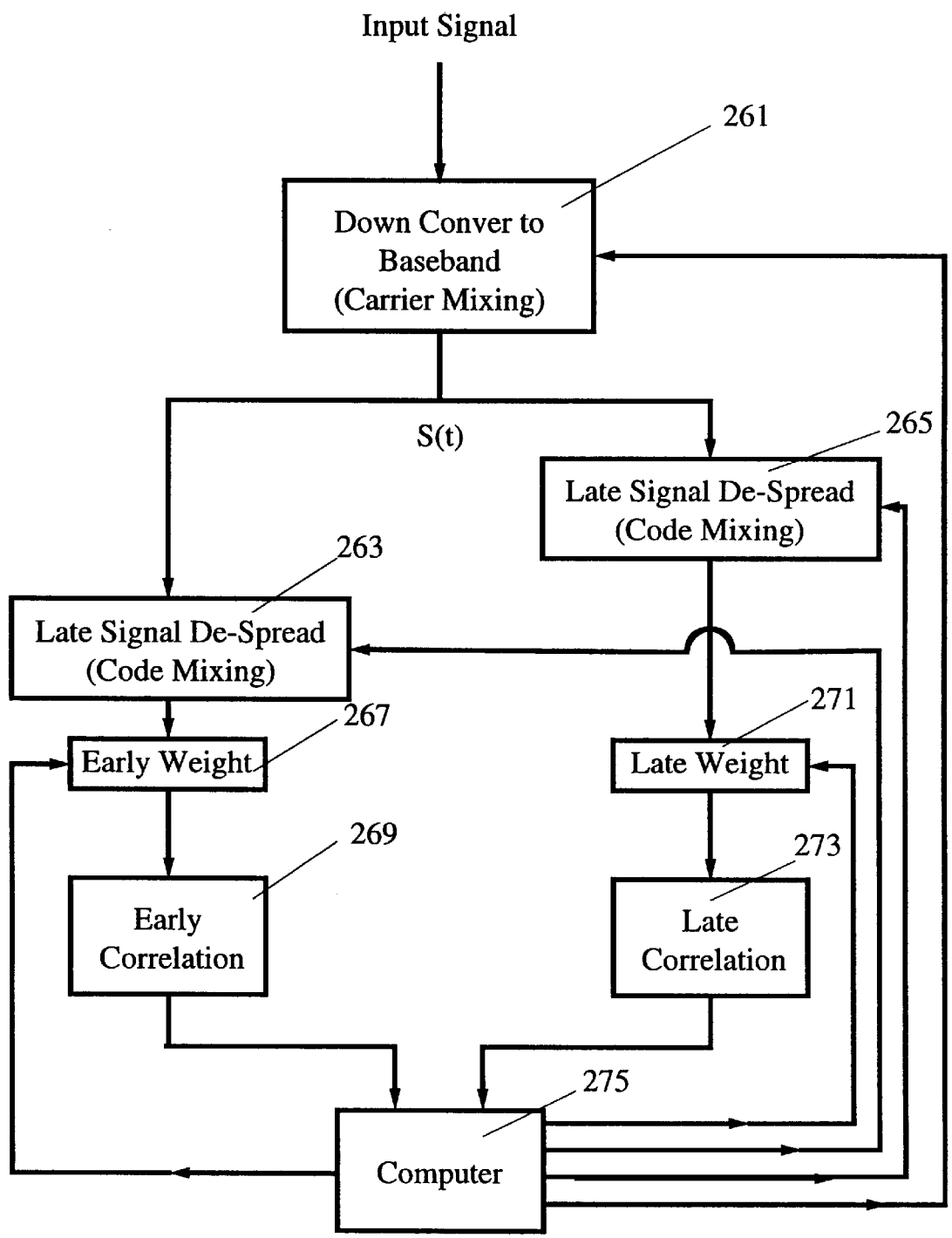
FIG. 25 is a schematic view of other apparatus for practising the invention.

FIG. 25 illustrates more general apparatus for implementation of the various embodiments of the invention. An incoming composite signal is downconverted from an intermediate frequency to a baseband signal and converted to an incoming digital composite signal s(t), using carrier signal mixing in a baseband conversion module 261, in a well known manner. The incoming digital composite signal s(t) is despread, using code phase mixing to form an early signal product $s(t)S_d(t+\tau-t_E)$ in an early signal despread module 263, and using code phase mixing to form a late signal product $s(t)S_d(t+\tau-t_L)$ in a late signal despread module 265. An early weighting function w(t;E;qE) is combined multiplicatively with the early signal product to form a weighted early signal product $w(t+\tau-t_E;E;qE)s(t)S_d(t+\tau-t_E)$ in an early weighting module 267, and an early signal correlation function is formed in an early correlator 269. A late weighting function w(t;L;qL) is combined multiplicatively with the late signal product to form a weighted late signal product $w(t+\tau-t_L;L;qL)s(t)S_d(t+\tau-t_L)$ in a late weighting module 271, and a late signal correlation function is formed in a late correlator 273. The early and late correlation signals are received by a computer 275 that determines the direction the time shift variable τ should move to drive the system toward the zero crossing or tracking point. The time shift adjustment information is fed back to the early and late signal despread modules 263 and 265 and to the early weighting and late weighting modules 267 and 271, for use in forming an adjusted early signal product and an adjusted late signal product, and is fed back to the baseband conversion module 261.

Figure 26:
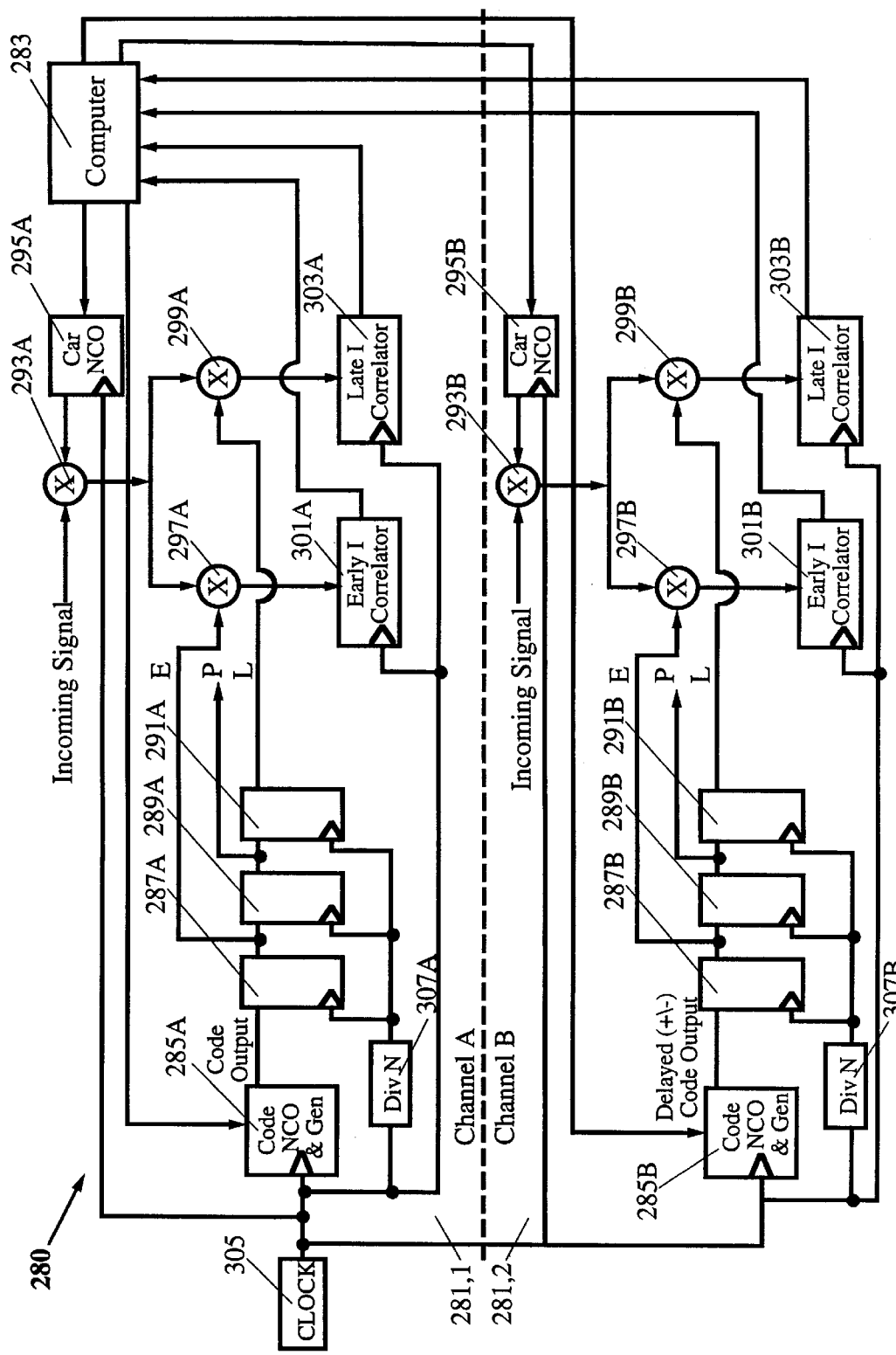
FIG. 26 illustrates an apparatus suitable for implementing a two-consecutive-bit procedure according to the invention, using readily available digital signal processor chips.

FIG. 26 illustrates another apparatus 280 for implementing the invention, where the choice of weighting function is based upon the values of two consecutive bits, $b_{n-1}$ and $b_n$, in the reference signal, using readily available digital signal processor chips. The apparatus 280 includes a first channel 281A, a second channel 281B and a computer 283 and uses weighting functions W1(t;q) such as are shown in FIGS. 5A, 6, 27D and 27E, with W1^(t;q)=0. The apparatus 280 uses early and late weighting functions W(t;E;qE) and W(t;L;qL), which may be the same or may be different, having non-zero values only near the two ends of a time interval width t1≦t<t2, with periodic extensions as discussed above. The weighting functions W(t;E;qE) and W(t;L;qL) may be chosen, for example, to be step functions as shown in FIGS. 27D and 27E, with the same or different step function widths and the same or different step function gains or amplitudes.

Each channel 281z (z=A, B) has a code phase NCO and generator 285z whose output signal is received by the first of a sequence of three D flipflops 287z, 289z and 291z, each with an associated time delay Δt(clock). An incoming signal I (t) is received by a first input terminal of a first signal multiplier 293z. A second input terminal of the signal multiplier 293z receives a carrier signal from a carrier phase NCO 295z that is controlled by signals received from the computer 283. The carrier signal mixes with the incoming signal to produce a baseband signal. The output signal from the first signal multiplier 293z is received by first input terminals of second and third signal multipliers 297z and 299z. Second input terminals of the signal multipliers 297z and 299z receive the output signals from the first and third D flipflops 287z and 291z, respectively. Output signals from the signal multipliers 297z and 299z are received by an early signal correlator module 301z and a late signal correlator module 303z, respectively. Output signals from the early signal correlator module 301z and late signal correlator module 303 are received by the computer 283 to vary the time shift variable τ that is part of the reference signal $S_d(t+\tau)$ received from the code phase NCO and generator 285z. The code phase NCO 285z, the D flipflops 287z, 289z and 291z, the carrier phase NCO 295z, the early signal correlator module 301z and the late signal correlator module 303z are all driven by a master clock 305. The D flipflop clock signals are optionally passed through a divide-by-Nz module 307z as shown, where NA and NB are independently selectable positive integers The carrier phase NCOs 295A and 295B are run identically. The clock pulse width is Δt(clock).

Figures 27A, 27B, 27C:
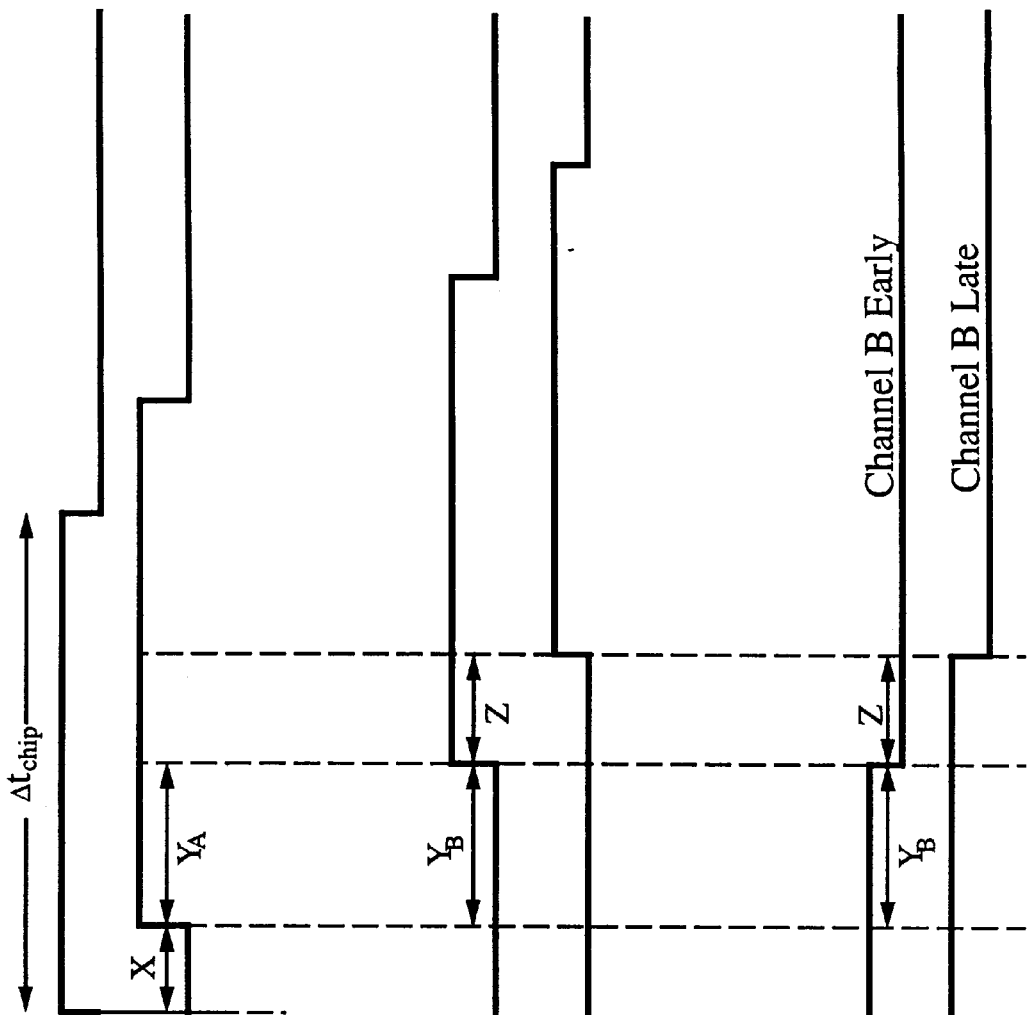
FIG. 27A is a graphical view of early and late replicas of a direct digital signal.
FIG. 27B is a graphical view of early and late replicas of a direct digital signal, time delayed relative to the signals shown in FIG. 27A.
FIG. 27C is a graphical view of early and late replicas of a direct digital signal, time advanced relative to the signals shown in FIG. 27A.
Figure 27D:
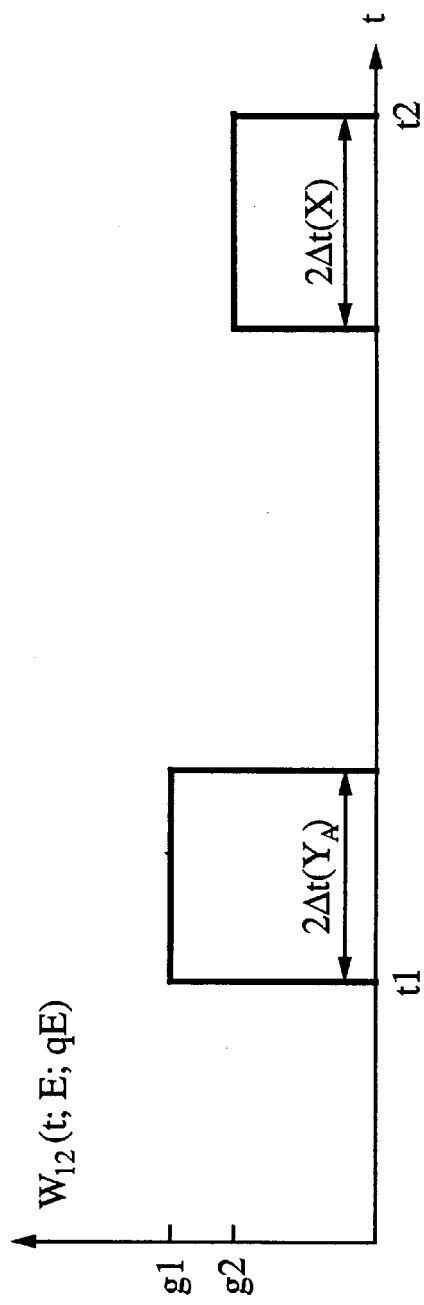
FIGS. 27D and 27E are graphical views of early and late weighting functions obtained from combining uniformly weighted correlators.
Figure 27E:
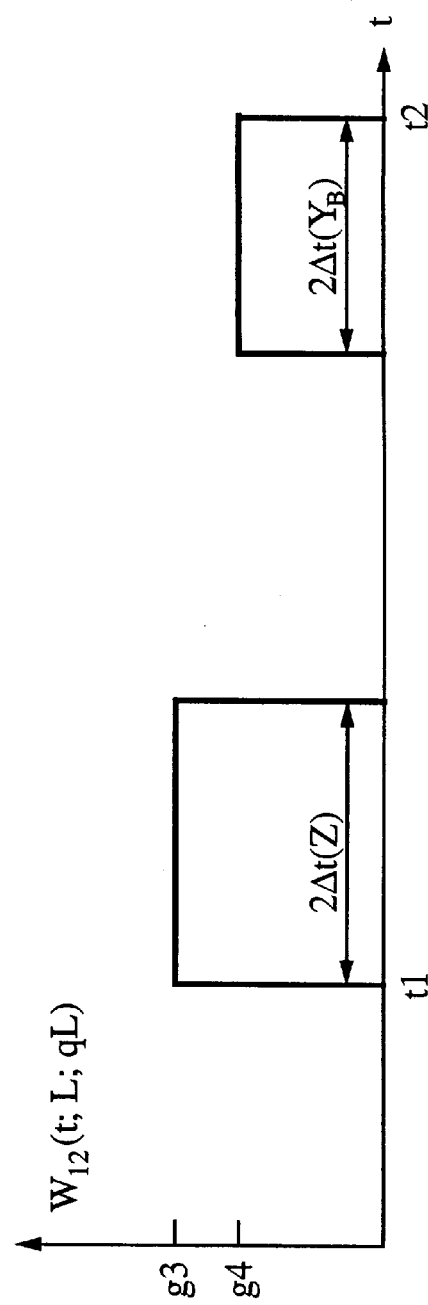

In one preferred embodiment, the code phase NCO 285B in the second channel 281B has a selected positive time delay $\Delta t(B-A)=\tau_B-\tau_A>0$ relative to the code phase NCO 285A in the first channel 281A, as indicated by a comparison of FIGS. 27A and 27B. In another preferred embodiment, the code phase NCO 285B in the second channel 281B has a selected negative time delay $\Delta t(B-A)=\tau_B-\tau_A<0$ (that is, an advancement) relative to the code phase NCO 285A in the first channel 281A, as indicated by a comparison of FIGS. 27A and 27C.

Four time regions are identified from FIGS. 27A, 27B and 27C, corresponding to the four regions for the weighting functions shown in FIGS. 27D and 27E. A first region X, of temporal width Δt(X), spans the separation between the early and late signals for the channel 281A. A second region Z, of temporal width Δt(Z), spans the separation between the early and late signals for the channel 281B. A third region YA, of temporal width Δt(YA), spans the separation between the late signal in the channel 281A and the early signal in the channel 281B. A fourth region YB, of temporal width Δt(YB)=Δt(YA), spans the separation between the early signal in the channel 281B and the late signal in the channel 281A. The temporal widths are $$\Delta t(X)=\Delta t_{L-E,A}, \quad (18)$$

$$\Delta t(Z)=\Delta t_{L-E,B}, \quad (19)$$

$$\Delta t(YA)=\Delta t(YB)=(t_{E,B}-t_{L,A}) \quad (20)$$

The weighting functions w12(t;x;qx) (x=E,L) used in the time-delayed version or time-advanced version illustrated in FIGS. 27A, 27B and 27C are constructed as follows. Define a square wave function by the relations $$SQ(t; ta; tb) = 1 \quad (ta < t < tb) \quad (21)$$

$$= 0 \quad (t1 \leq t < ta, \text{ or } tb \leq t \leq t2)$$

where t1≦ta<tb≦t2. The weighting functions w12(t;x;qx) (x=E,L) used in the time-delayed embodiment in FIGS. 27A and 27B are defined by $$w12(t;E;qE)=g1\cdot SQ(t1;t1+\Delta t(YA))+g2\cdot SQ(t2-\Delta t(X);t2), \quad (22)$$

$$w12(t;L;qL)=g3\cdot SQ(t1;t1+\Delta t(Z))+g4\cdot SQ(t2-\Delta t(YB);t2). \quad (23)$$

The autocorrelation difference function ΔAC(τ;qE;qL) is then computed, for $\tau=\tau_A$ or $\tau_B$, as the integral, or sum of sampled values, of the difference $$\Delta s_{E-L}(t)=w12(t+\tau-t_E;E;qE)S_d(t+\tau-t_E)s(t)-w12(t+\tau-t_L;L;qL)S_d(t+\tau-t_L)s(t) \quad (24)$$

over a suitable time interval 0≦t≦T that contains the time interval t1≦t≦t2, with $t2-t1=\Delta\tau_{chip}$.

The square wave functions SQ(t;ta;tb) used in Eqs. (22) and (23) are obtained from uniform weighting correlations, such as shown in FIGS. 27A and 27B, by the following linear combinations of correlation values.

$$SQ(\tau;t1;t1+\Delta t(YA))=\{AC0(\tau_A;L)-AC0(\tau_B;E)\}/2 \quad (25)$$

$$SQ(\tau;t2;t2-\Delta t(X))=\{AC0(\tau_A;L)-AC0(\tau_A;E)\}/2, \quad (26)$$

$$SQ(\tau;t1;t1+\Delta t(Z))=\{AC0(\tau_B;E)-AC0(\tau_B;L)\}/2, \quad (27)$$

$$SQ(\tau;t2;t2-\Delta t(YB))=-\{AC0(\tau_A;L)-AC0(\tau_B;E)\}/2. \quad (28)$$

Proceeding in a similar manner, the weighting functions w12(t;x;qx) (x=E,L) used in the time-advanced embodiment in FIGS. 27A and 27C are computed as set forth in Eqs. (22) and (23) for the time-delayed embodiment. The square wave functions SQ(t;ta;tb) are obtained for the time-advanced embodiment from the following linear combinations of correlation values.

$$SQ(\tau;t1;t1+\Delta t(YA))=\{AC0(\tau_A;L)+AC0(\tau_B;E)\}/2, \quad (29)$$

$$SQ(\tau;t2;t2-\Delta t(X))=\{AC0(\tau_A;L)-AC0(\tau_A;E)\}/2, \quad (30)$$

$$SQ(\tau;t1;t1+\Delta t(Z))=-\{AC0(\tau_B;E)-AC0(\tau_B;L)\}/2, \quad (31)$$

$$SQ(\tau;t2;t2-\Delta t(YB))=-\{AC0(\tau_A;L)+AC0(\tau_B;E)\}/2. \quad (32)$$

The digital reference function $S_d(t+\tau_y-t_x)$ (x=E,L; y=A,B) used to compute the autocorrelation functions AC0(τ_y;x) has a fixed offset $t_x$ and a variable offset $\tau_y$, where the difference $\Delta t(B-A)=\tau_B-\tau_A$ is selected initially. For the time-delayed embodiment, or the time-advanced embodiment, the offset $\tau_A$ and/or the offset $\tau_B$, subject to the constraint $\Delta t(B-A)=\tau_B-\tau_A$=constant, is varied to determine the value of $\tau_A$ (or $\tau_B$) for which the difference $\Delta_{SE-L}(t)$, integrated over the time interval 0≦t≦T, is zero. The value of $\tau_A$ (or $\tau_B$) thus found becomes the tracking point for the incoming signal.

In the apparatus shown in FIG. 26, the dynamic, or time varying selection of W1(t;q) and of W1^(t;q) (=0 here) is performed automatically. If two consecutive digital signal bit values satisfy $b_{n-1}=b_n$ (or $\Delta b_n=0$), Eqs. (25)–(28) and Eqs. (29)–(32) become identically zero for the time interval $I_n$, which effectively insures that $W1\hat{}(t;q)=0$. If $b_{n-1}\neq b_n$ (or $\Delta b_n =1$), Eqs. (25)–(28) and Eqs. (29)–(32) are not identically zero and do provide a non-zero weighting function $W1(t;q)$.

Figure 28:
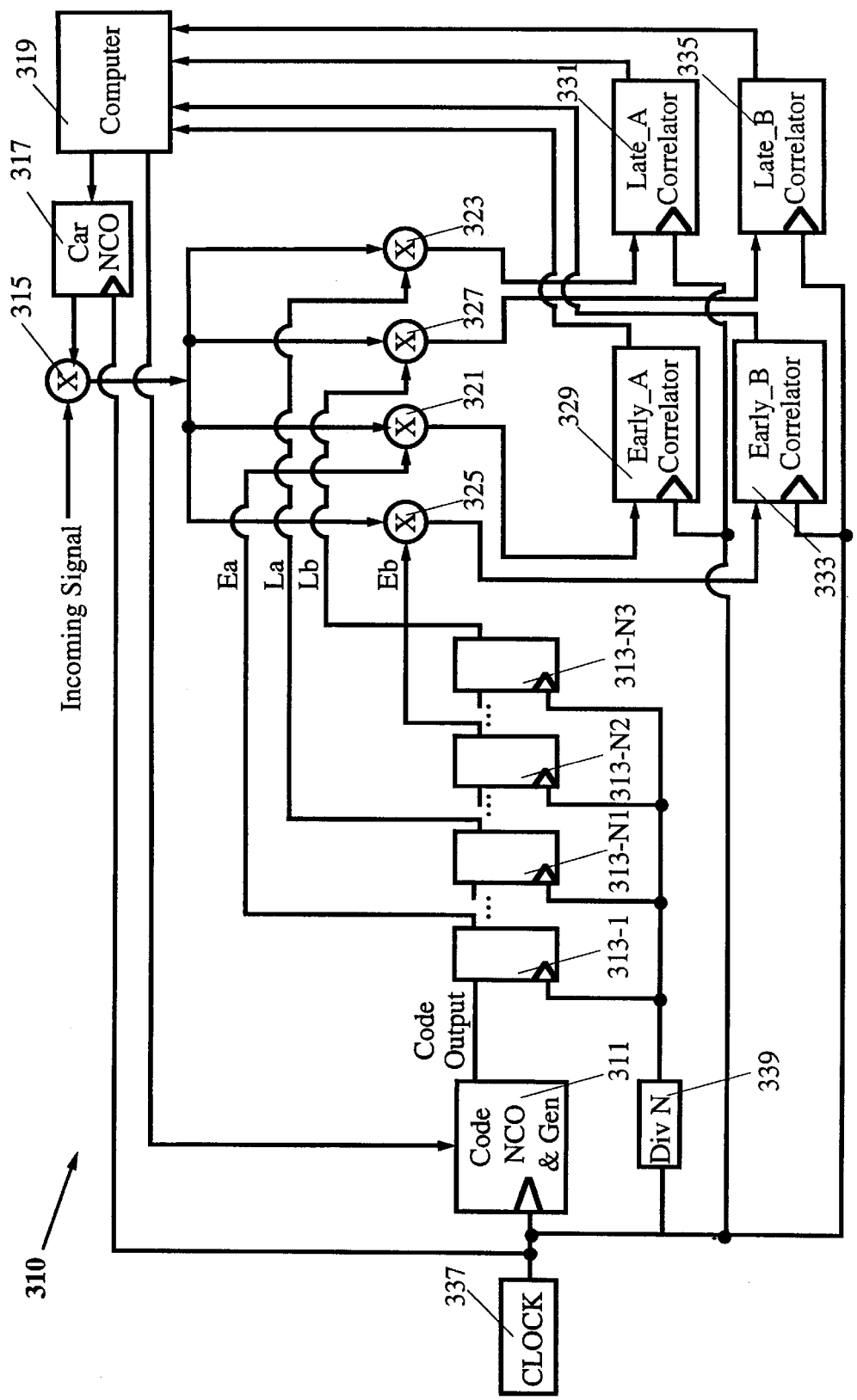
FIG. 28 illustrates another apparatus suitable for implementing a two-consecutive-bit procedure according to the invention.

FIG. 28 illustrates a single channel apparatus 310 that provide similar weighting functions $w12(t;x;qx)$ by combining uniformly weighted autocorrelation function values. This apparatus includes a code phase NCO and generator 311 whose output signal is received by the first of a sequence of D flipflops 313-1, ..., 313-N1, ..., 313-N2, ..., 313-N3, with associated time delay $\Delta t(clock)$, where the numbers N1, N2 and N3 are chosen to satisfy $$(N1-1)\Delta t(clock)=t_{L,A}-t_{E,A}, \quad (33)$$

$$(N2-1)\Delta t(clock)=t_{E,B}-t_{E,A}, \quad (34)$$

$$(N3-1)\Delta t(clock)=t_{L,B}-t_{E,A}, \quad (35)$$

with N1>1 and N3>N2, where the subscripts A and B refer to the desired different desired times for an equivalent "A" channel and an equivalent "B" channel. Here, N2 may be less than, equal to or greater than N1. An incoming signal I(t) is received by a first input terminal of a first signal multiplier 315. A second input terminal of the first signal multiplier 315 receives a carrier signal from a carrier phase NCO 317 that is controlled by signals received from a computer 319. The carrier signal mixes with the incoming signal to produce a baseband signal. The output signal from the first signal multiplier 315 is received by first input terminals of second, third, fourth and fifth signal multipliers 321, 323, 325 and 327. Second input terminals of the signal multipliers 321, 323, 325 and 327 receive the output signals from the D flipflops 313-1, 313-N1, 313-N2 and 313-N3, respectively. Output signals from the signal multipliers 321, 323, 325 and 327 are received by a first early signal correlator module 329, a first late signal correlator module 331, a second early signal correlator module 333 and a second late signal correlator module 335, respectively. Output signals from the four early signal and late signal correlator modules 329, 331, 333 and 335 are received by the computer 319 to vary the time shift variable $\tau$ that is part of the reference signal $S_d(t+\tau)$ that is produced by the code phase NCO and generator 311. The code phase NCO 311, the D flipflops 331-y (y=1, ..., N1, ..., N2, ..., N3), the carrier phase NCO 317, and the early signal and late signal correlator modules 329, 331, 333 and 335 are all driven by a master clock 337, with the D flipflop clock signals being optionally passed through a divide-by-N module 339 as shown. The clock pulse width is $\Delta t(clock)$.

Computation of the selected reference signals $S_d(t+\tau_y-t_x)$ (x=E,L; y=A,B), of the autocorrelation functions $AC0(\tau_y;x)$, and of the tracking point for $\tau_A$ (or $\tau_B$) proceeds as in the earlier development for FIG. 26.

The approach developed here is applicable to analysis of any incoming digital signal that has been transmitted using a code division multiple access (CDMA) format, in which the underlying incoming digital signal is a known pseudo-random code and the time of arrival of the direct signal (with multipath signals absent) is unknown. The source of the incoming digital signal may be satellite based or be ground based, with fixed location or variable location relative to the observer. By variably suppressing the contribution of a particular time interval $I_n$ to the autocorrelation difference function $\Delta AC\#(\tau,q)$, depending upon the transitions in bit values at $t=t_n$, at $t=t_{n-1}$, and/or at $t=t_{n-2}$, the contribution of noise and/or multipath signals to a modified autocorrelation difference function $\Delta AC\#(\tau;q)$ can be suppressed.

The phrase "autocorrelation function" is used herein to refer to a sum or integral over a collection of time values of a digital signal product $w(t+\tau;q)s(t)S_d(t+\tau)$, where the digital composite signal $s(t)$ includes the digital direct signal $S_d(t)$ and, possibly, one or more multipath signals $S_m(t;\Delta t_m)$.

We claim:

1. A method for use in decoding a composite signal having a signal-distorting component, the method comprising the steps of:

receiving a digital composite signal that can vary with time t and that has a digital signal bit period with a selected length $\Delta\tau_{chip}$;

generating a selected digital reference signal;

generating a first weighting signal that is not constant in time and that, when mixed with the reference signal and the composite signal, reduces the effect of presence of a signal-distorting component in the composite signal;

generating a second weighting signal that is not constant in time and that, when mixed with the reference signal and the composite signal, reduces the effect of presence of a signal-distorting component in the composite signal;

examining a bit value $b_n$ of the incoming signal for a time interval defined by $n\Delta\tau_{chip}\leq t<(n+1)\Delta\tau_{chip}$, and the immediately preceding digital bit value $b_{n-1}$ of the reference signal;

when $b_{n-1}\neq b_n$, mixing the first weighting signal with the reference signal and the composite signal over a time interval $I_n=\{t'|t_{n-1}+\Delta<t'\leq t_n+\Delta\}$, where $\Delta$ is a selected time value satisfying $0\leq\Delta<\Delta\tau_{chip}$, to produce a contribution to a first correlation function that represents a timing relationship between the composite signal and the reference signal; and when $b_{n-1}=b_n$, mixing the second weighting signal with the reference signal and the composite signal over the time interval $I_n$, to produce a contribution to the first correlation function that represents a timing relationship between the composite signal and the reference signal.

2. The method of claim 1, further comprising the step of selecting at least one of said first and second weighting functions to be a notch function.

3. The method of claim 1, further comprising the step of selecting at least one of said first and second weighting functions to be an anti-notch function.

4. The method of claim 1, further comprising the step of selecting said second weighting function to be substantially zero everywhere.

5. The method of claim 1, further comprising the step of selecting at least one of said digital composite signal and said digital reference signal to be a digital spread spectrum signal.

6. The method of claim 1, further comprising the step of selecting said digital composite signal to be a digitized version of a signal received from a transmitter drawn from a class of satellite-based transmitters consisting of a GPS transmitter and/or a GLONASS transmitter.

7. The method of claim 1, further comprising the steps of:

generating a third weighting signal that is not constant in time and that, when mixed with the reference signal and the composite signal, reduces the effect of presence of a signal-distorting component in the composite signal;

generating a fourth weighting signal that is not constant in time and that, when mixed with the reference signal and the composite signal, reduces the effect of presence of a signal-distorting component in the composite signal;

when said bit values $b_{n-1}$ and $b_n$ satisfy the relation $b_{n-1} \neq b_n$, mixing the third weighting signal with the reference signal and the composite signal over a time interval $I_n = \{t' | t_{n-1} + \Delta < t' \leq t_n + \Delta\}$, where $\Delta$ is a selected time value satisfying $0 \leq \Delta < \Delta\tau_{chip}$, to produce a contribution to a second correlation function that represents a timing relationship between the composite signal and the reference signal; and when said bit values $b_{n-1}$ and $b_n$ satisfy the relation $b_{n-1} = b_n$, mixing the fourth weighting signal with the reference signal and the composite signal over the time interval $I_n$, to produce a contribution to the second correlation function that represents a timing relationship between the composite signal and the reference signal.

8. The method of claim 7, further comprising the step of forming a correlation difference function $\Delta AC(\tau)$ that is the difference between said first correlation function and said second correlation function, where $\tau$ is a time shift variable that allows variation of at least one of said first timing relationship and said second timing relationship.

9. The method of claim 8, further comprising the step of forming said first correlation function and said second correlation function so that said first correlation function attains a maximum amplitude at a first value $t_E$ of said time shift variable $\tau$ that is different from a value $t_L$ of said time shift variable $\tau$ at which said second correlation function reaches a maximum amplitude.

10. The method of claim 9, further comprising the step of forming said first correlation function and said second correlation function so that said values $t_E$ and $t_L$ of said time shift variable $\tau$ satisfy the relation $0 < t_L - t_E \leq 0.3 \Delta\tau_{chip}$.

11. The method of claim 9, further comprising the step of forming said first correlation function and said second correlation function so that said values $t_E$ and $t_L$ of said time shift variable $\tau$ satisfy the relation $0 < t_L - t_E < 2 \Delta\tau_{chip}$.

12. A method for use in decoding a composite signal having a signal-distorting component, the method comprising the steps of:

receiving a digital composite signal that can vary with time t and that has a digital signal bit period with a selected length $\Delta\tau_{chip}$;

generating a selected digital reference signal;

generating a first weighting signal that is not constant in time and that, when mixed with the reference signal and the composite signal, reduces the effect of presence of a signal-distorting component in the composite signal;

generating a second weighting signal that is not constant in time and that, when mixed with the reference signal and the composite signal, reduces the effect of presence of a signal-distorting component in the composite signal;

examining a bit value $b_n$ of the incoming signal for a time interval defined by $n\Delta\tau_{chip} \leq t < (n+1)\Delta\tau_{chip}$, and the two immediately preceding digital bit values $b_{n-1}$ and $b_{n-2}$ of the reference signal;

when $b_{n-2} = b_{n-1}$ and $b_{n-1} \neq b_n$, mixing the first weighting signal with the reference signal and the composite signal over a time interval $I_n = \{t' | t_{n-1} + \Delta < t' \leq t_n + \Delta\}$, where $\Delta$ is a selected time value satisfying $0 \leq \Delta < \Delta\tau_{chip}$, to produce a contribution to a first correlation function that represents a timing relationship between the composite signal and the reference signal; and when $b_{n-2} \neq b_{n-1}$, or $b_{n-1} = b_n$, or both, of these conditions are satisfied, mixing the second weighting signal with the reference signal and the composite signal over the time interval $I_n$, to produce a contribution to the first correlation function that represents a timing relationship between the composite signal and the reference signal.

13. The method of claim 12, further comprising the step of selecting at least one of said first and second weighting functions to be a notch function.

14. The method of claim 12, further comprising the step of selecting at least one of said first and second weighting functions to be an anti-notch function.

15. The method of claim 12, further comprising the step of selecting said second weighting function to be substantially zero everywhere.

16. The method of claim 12, further comprising the step of selecting at least one of said digital composite signal and said digital reference signal to be a digital spread spectrum signal.

17. The method of claim 12, further comprising the step of selecting said digital composite signal to be a digitized version of a signal received from a transmitter drawn from a class of satellite-based transmitters consisting of a GPS transmitter and/or a GLONASS transmitter.

18. The method of claim 12, further comprising the steps of:

generating a third weighting signal that is not constant in time and that, when mixed with the reference signal and the composite signal, reduces the effect of presence of a signal-distorting component in the composite signal;

generating a fourth weighting signal that is not constant in time and that, when mixed with the reference signal and the composite signal, reduces the effect of presence of a signal-distorting component in the composite signal;

when said bit values $b_{n-2}$, $b_{n-1}$ and $b_n$ satisfy the relations $b_{n-2} = b_{n-1}$ and $b_{n-1} \neq b_n$, mixing the third weighting signal with the reference signal and the composite signal over a time interval $I_n = \{t' | t_{n-1} + \Delta < t' \leq t_n + \Delta\}$, where $\Delta$ is a selected time value satisfying $0 \leq \Delta < \Delta\tau_{chip}$, to produce a contribution to a second correlation function that represents a timing relationship between the composite signal and the reference signal; and when said bit values $b_{n-2}$, $b_{n-1}$ and $b_n$ satisfy the relation $b_{n-2} \neq b_{n-1}$, or $b_{n-1} = b_n$, or both, mixing the fourth weighting signal with the reference signal and the composite signal over the time interval $I_n$, to produce a contribution to the second correlation function that represents a timing relationship between the composite signal and the reference signal.

19. The method of claim 18, further comprising the step of forming a correlation difference function $\Delta AC(\tau)$ that is the difference between said first correlation function and said second correlation function, where $\tau$ is a time shift variable that allows variation of at least one of said first timing relationship and said second timing relationship.

20. The method of claim 19, further comprising the step of forming said first correlation function and said second correlation function so that said first correlation function attains a maximum amplitude at a first value $t_E$ of said time shift variable $\tau$ that is different from a value $t_L$ of said time shift variable $\tau$ at which said second correlation function reaches a maximum amplitude.

21. The method of claim 20, further comprising the step of forming said first correlation function and said second correlation function so that said values $t_E$ and $t_L$ of said time shift variable $\tau$ satisfy the relation $0 < t_L - t_E \leq 0.3 \Delta\tau_{chip}$.

22. The method of claim 20, further comprising the step of forming said first correlation function and said second correlation function so that said values $t_E$ and $t_L$ of said time shift variable $\tau$ satisfy the relation $0 < t_L - t_E < 2\ \Delta\tau_{chip}$.

23. Apparatus for use in decoding a composite signal having a signal-distorting component, the apparatus comprising:
a signal antenna that receives an incoming composite signal that can vary with time t;
a signal receiver/processor, including a computer, that receives the incoming signal from the signal antenna, that forms a digital composite signal, having a digital signal bit period with a selected length $\Delta\tau_{chip}$, from the incoming composite signal, where the computer is programmed to:
generate a selected digital reference signal;
generate a first weighting signal that is not constant in time and that, when mixed with the reference signal and the composite signal, reduces the effect of presence of a signal-distorting component in the composite signal;
generate a second weighting signal that is not constant in time and that, when mixed with the reference signal and the composite signal, reduces the effect of presence of a signal-distorting component in the composite signal;
examine a bit value $b_n$ of the incoming signal for a time interval defined by $n\Delta\tau_{chip} \leq t < (n+1)\Delta\tau_{chip}$, and the immediately preceding digital bit value $b_{n-1}$ of the reference signal;
when $b_{n-1} \neq b_n$, mix the first weighting signal with the reference signal and the composite signal over a time interval $I_n = \{t' | t_{n-1} + \Delta < t' \leq t_n + \Delta\}$, where $\Delta$ is a selected time value satisfying $0 \leq \Delta < \Delta\tau_{chip}$, to produce a contribution to a first correlation function that represents a timing relationship between the composite signal and the reference signal; and
when $b_{n-1} = b_n$, or both of these conditions are satisfied, mix the second weighting signal with the reference signal and the composite signal over the time interval $I_n$, to produce a contribution to the first correlation function that represents a timing relationship between the composite signal and the reference signal.

24. The apparatus of claim 23, wherein said first weighting function is selected to be a notch function.

25. The apparatus of claim 23, wherein said first weighting function is selected to be an anti-notch function.

26. The apparatus of claim 23, wherein said second weighting function is selected to be substantially zero everywhere.

27. The apparatus of claim 23, wherein at least one of said digital composite signal and said digital reference signal is selected to be a digital spread spectrum signal.

28. The apparatus of claim 23, wherein said incoming composite signal is a signal received from a transmitter drawn from a class of satellite-based transmitters consisting of a GPS transmitter and/or a GLONASS transmitter.

29. The apparatus of claim 23, wherein said computer is further programmed to:
generate a third weighting signal that is not constant in time and that, when mixed with the reference signal and the composite signal, reduces the effect of presence of a signal-distorting component in the composite signal;
generate a fourth weighting signal that is not constant in time and that, when mixed with the reference signal and the composite signal, reduces the effect of presence of a signal-distorting component in the composite signal;
when said bit values $b_{n-1}$ and $b_n$ satisfy the relation $b_{n-1} \neq b_n$, mix the third weighting signal with the reference signal and the composite signal over a time interval $I_n = \{t' | t_{n-1} + \Delta < t' \leq t_n + \Delta\}$, where $\Delta$ is a selected time value satisfying $0 \leq \Delta < \Delta\tau_{chip}$, to produce a contribution to a second correlation function that represents a timing relationship between the composite signal and the reference signal; and
when said bit values $b_{n-1}$ and $b_n$ satisfy the relation $b_{n-1} = b_n$, mix the fourth weighting signal with the reference signal and the composite signal over the time interval $I_n$, to produce a contribution to the second correlation function that represents a timing relationship between the composite signal and the reference signal.

30. The apparatus of claim 29, wherein said computer is further programmed to form a correlation difference function $\Delta AC(\tau)$ that is the difference between said first correlation function and said second correlation function, where $\tau$ is a time shift variable that allows variation of at least one of said first timing relationship and said second timing relationship.

31. The apparatus of claim 30, wherein said computer is further programmed to form said first correlation function and said second correlation function so that said first correlation function attains a maximum amplitude at a first value $t_E$ of said time shift variable $\tau$ that is different from a value $t_L$ of said time shift variable $\tau$ at which said second correlation function reaches a maximum amplitude.

32. The apparatus of claim 31, wherein said computer is further programmed to form said first correlation function and said second correlation function so that said values $t_E$ and $t_L$ of said time shift variable $\tau$ satisfy the relation $0 < t_L - t_E \leq 0.3\ \Delta\tau_{chip}$.

33. The apparatus of claim 31, wherein said computer is further programmed to form said first correlation function and said second correlation function so that said values $t_E$ and $t_L$ of said time shift variable $\tau$ satisfy the relation $0 < t_L - t_E < 2\ \Delta\tau_{chip}$.

34. Apparatus for use in decoding a composite signal having a signal-distorting component, the apparatus comprising:
a signal antenna that receives an incoming composite signal that can vary with time t;
a signal receiver/processor, including a computer, that receives the incoming signal from the signal antenna, that forms a digital composite signal, having a digital signal bit period with a selected length $\Delta\tau_{chip}$, from the incoming composite signal, where the computer is programmed to:
generate a selected digital reference signal;
generate a first weighting signal that is not constant in time and that, when mixed with the reference signal and the composite signal, reduces the effect of presence of a signal-distorting component in the composite signal;
generate a second weighting signal that is not constant in time and that, when mixed with the reference signal and the composite signal, reduces the effect of presence of a signal-distorting component in the composite signal;
examine a bit value $b_n$ of the incoming signal for a time interval defined by $n\Delta\tau_{chip} \leq t < (n+1)\Delta\tau_{chip}$, and the two immediately preceding digital bit values $b_{n-1}$ and $b_{n-2}$ of the reference signal;
when $b_{n-2} = b_{n-1}$ and $b_{n-1} \neq b_n$, mix the first weighting signal with the reference signal and the composite signal over a time interval $I_n = \{t' | t_{n-1} + \Delta < t' \leq t_n + \Delta\}$, where $\Delta$ is a selected time value satisfying $0 \leq \Delta < \Delta\tau_{chip}$, to produce a contribution to a first correlation function that represents a timing relationship between the composite signal and the reference signal; and when $b_{n-2} \neq b_{n-1}$, or $b_{n-1} = b_n$, or both of these conditions are satisfied, mix the second weighting signal with the reference signal and the composite signal over the time interval $I_n$, to produce a contribution to the first correlation function that represents a timing relationship between the composite signal and the reference signal.

35. The apparatus of claim 34, wherein said first weighting function is selected to be a notch function.

36. The apparatus of claim 34, wherein said first weighting function is selected to be an anti-notch function.

37. The apparatus of claim 34, wherein said second weighting function is selected to be substantially zero everywhere.

38. The apparatus of claim 34, wherein at least one of said digital composite signal and said digital reference signal is selected to be a digital spread spectrum signal.

39. The apparatus of claim 34, wherein said incoming composite signal is a signal received from a transmitter drawn from a class of satellite-based transmitters consisting of a GPS transmitter and/or a GLONASS transmitter.

40. The apparatus of claim 34, wherein said computer is further programmed to:

generate a third weighting signal that is not constant in time and that, when mixed with the reference signal and the composite signal, reduces the effect of presence of a signal-distorting component in the composite signal;

generate a fourth weighting signal that is not constant in time and that, when mixed with the reference signal and the composite signal, reduces the effect of presence of a signal-distorting component in the composite signal;

when said bit values $b_{n-2}$, $b_{n-1}$ and $b_n$ satisfy the relations $b_{n-2} = b_{n-1}$ and $b_{n-1} \neq b_n$, mix the third weighting signal with the reference signal and the composite signal over a time interval $I_n = \{t' | t_{n-1} + \Delta t' \leq t_n + \Delta\}$, where $\Delta$ is a selected time value satisfying $0 \leq \Delta < \Delta\tau_{chip}$, to produce a contribution to a second correlation function that represents a timing relationship between the composite signal and the reference signal; and when said bit values $b_{n-2}$, $b_{n-1}$ and $b_n$ satisfy the relations $b_{n-2} \neq b_{n-1}$, or $b_{n-1} = b_n$, or both, mix the fourth weighting signal with the reference signal and the composite signal over the time interval $I_n$, to produce a contribution to the second correlation function that represents a timing relationship between the composite signal and the reference signal.

41. The apparatus of claim 40, wherein said computer is further programmed to form a correlation difference function $\Delta AC(\tau)$ that is the difference between said first correlation function and said second correlation function, where $\tau$ is a time shift variable that allows variation of at least one of said first timing relationship and said second timing relationship.

42. The apparatus of claim 41, wherein said computer is further programmed to form said first correlation function and said second correlation function so that said first correlation function attains a maximum amplitude at a first value $t_E$ of said time shift variable $\tau$ that is different from a value $t_L$ of said time shift variable $\tau$ at which said second correlation function reaches a maximum amplitude.

43. The apparatus of claim 42, wherein said computer is further programmed to form said first correlation function and said second correlation function so that said values $t_E$ and $t_L$ of said time shift variable $\tau$ satisfy the relation $0 < t_L - t_E \leq 0.3\ \Delta\tau_{chip}$.

44. The apparatus of claim 42, wherein said computer is further programmed to form said first correlation function and said second correlation function so that said values $t_E$ and $t_L$ of said time shift variable $\tau$ satisfy the relation $0 < t_L - t_E < 2\ \Delta\tau_{chip}$.

45. A method for decoding a received signal to reduce signal distortion, the method comprising the steps of:

receiving a signal having at least two consecutive bits, with each bit having a value that is represented in the received signal over a time interval;

generating a reference signal having at least two consecutive bits, for matching the received signal;

generating a weighting signal, having an amplitude that varies over time, that conforms to (a) a first sequence of weighting values when each bit of a consecutive bit sequence of the reference signal is part of a predetermined bit sequence and (b) a second sequence of weighting values when at least one bit of a consecutive bit sequence of the reference signal is not part of a predetermined bit sequence; and mixing the received signal, the reference signal and the weighting signal to determine a timing relationship between the received signal and the reference signal.

46. The method of claim 45, further comprising the step of representing said first sequence and said second sequence of weighting values in said weighting signal over a selected time interval whose length is less than the length of a time interval used to represent one of the bits in said reference signal.

47. The method of claim 46, further comprising the step of beginning said selected time interval a selected time increment before the beginning of said time interval used to represent one of said bits in said reference signal.

48. The method of claim 45, further comprising the steps of:

using said first sequence of weighting values when a first bit and a second bit in a sequence of two consecutive bits in said reference signal have different bit values; and using said second sequence of weighting values when a first bit and a second bit in a sequence of two consecutive bits in said reference signal have the same bit value.

49. The method of claim 45, further comprising the steps of:

generating a reference signal having at least three consecutive bits;

using said first sequence of weighting values when (i) a first bit and a second bit in a sequence of three consecutive bits in said reference signal have the same bit value and (ii) a third bit in the sequence of three consecutive bits has a bit value that is different from the bit value of the first and second bits; and using said second sequence of weighting values when at least one of the conditions (i) and (ii) is not satisfied.

50. Apparatus for use in decoding a composite signal having a signal-distorting component, the apparatus comprising:

a timing source that issues a sequence of uniformly spaced timing pulses;

a digital computer that receives the timing pulses and receives a plurality of correlation signals, analyzes these signals and issues (1) a carrier phase NCO signal and (2) a selected value for a time shift variable $\tau$;

a first signal multiplier that receives and mixes an incoming composite signal and the carrier phase NCO signal to produce a modified composite signal s(t);

a first signal processing channel comprising:

a first code phase NCO and generator module that receives the timing pulses and a first value τ1 of the time shift variable τ, processes this information, and issues a selected digital reference signal $S_d(t+\tau)$ that varies with time t, where the reference signal has a digital bit transition time interval of a selected length $\Delta\tau_{chip}$;

a first time shift module that receives the timing pulses and the reference signal and that produces and issues a first time-shifted reference signal $S_d(t+\tau 1-t_{E1})$ and a second time-shifted reference signal $S_d(t+\tau 1-t_{L1})$, where $t_{E1}$ and $t_{L1}$ ($>t_{E1}$) are selected time shift values, with $t_{L1}-t_{E1}<2\ \Delta\tau_{chip}$;

a second signal multiplier that receives and mixes the modified composite signal s(t) and the first time-shifted reference signal to produce a first signal product $s(t)S_d(t+\tau 1-t_{E1})$;

a third signal multiplier that receives and mixes the modified composite signal s(t) and the second time-shifted reference signal to produce a second signal product $s(t)S_d(t+\tau 1-t_{L1})$;

a first early correlator module that receives and processes the timing pulses and the first signal product and issues a first early correlation value that is received by the computer; and a first late correlator module that receives and processes the timing pulses and the second signal product and issues a first late correlation value that is received by the computer;

a second signal processing channel comprising:

a second code phase NCO and generator module that receives the timing pulses and a second value τ2 of the time shift variable τ, processes this information, and issues the digital reference signal $S_d(t+\tau 2)$, where the time shift difference τ2–τ1 has a selected value;

a second time shift module that receives the timing pulses and the reference signal and that produces and issues a third time-shifted reference signal $S_d(t+\tau 2-t_{E2})$ and a fourth time-shifted reference signal $S_d(t+\tau 2-t_{L2})$, where $t_{E2}$ and $t_{L2}$ ($>t_{E2}$) are selected time shift values, with $t_{L2}-t_{E2}<2\ \Delta\tau_{chip}$;

a fourth signal multiplier that receives and mixes the modified composite signal s(t) and the third time-shifted reference signal to produce a third signal product $s(t)S_d(t+\tau 2-t_{E2})$;

a fifth signal multiplier that receives and mixes the modified composite signal s(t) and the fourth time-shifted reference signal to produce a fourth signal product $s(t)S_d(t+\tau 2-t_{L2})$;

a second early correlator module that receives and processes the timing pulses and the third signal product and issues a second early correlation value that is received by the computer; and a second late correlator module that receives and processes the timing pulses and the fourth signal product and issues a second late correlation value that is received by the computer, where the computer forms a linear combination of at least two of the first early correlation value, the first late correlation value, the second early correlation value, and the second late correlation value and selects the value of at least one of the time shift values τ1 and τ2 that the linear combination of correlation values has the value zero.

51. The apparatus of claim 50, further comprising a first time division module, located between said timing source and said first time shift module, and a second time division module, located between said timing source and said second time shift module, where the first and second time division modules receive said timing pulses from said timing source, where, for every N1 consecutive timing pulses received from said timing source, the first time division module delivers a single timing pulse to said first time shift module, where, for every N2 consecutive timing pulses received from said timing source, the second time division module delivers a single timing pulse to said second time shift module, and where N1 and N2 are selected positive integers.

52. Apparatus for use in decoding a composite signal having a signal-distorting component, the apparatus comprising:

a timing source that issues a sequence of uniformly spaced timing pulses;

a digital computer that receives the timing pulses and receives a plurality of correlation signals, analyzes these signals and issues (1) a carrier phase NCO signal and (2) a selected value for a time shift variable τ;

a first signal multiplier that receives and mixes an incoming composite signal and the carrier phase NCO signal to produce a modified composite signal s(t);

a code phase NCO and generator module that receives the timing pulses and the value of the time shift variable τ, processes this information, and issues a selected digital reference signal $S_d(t+\tau)$ that varies with time t, where the reference signal has a digital bit transition time interval of a selected length $\Delta\tau_{chip}$;

a time shift module that receives the timing pulses and the reference signal and that produces and issues a first time-shifted reference signal $S_d(t+\tau-t_{E1})$, a second time-shifted reference signal $S_d(t+\tau-t_{L1})$, a third time-shifted reference signal $S_d(t+\tau-t_{E2})$ and a fourth time-shifted reference signal $S_d(t+\tau-t_{L2})$, where $t_{E1}$, $t_L$, $t_{E2}$ and $t_{L2}$ are selected time shift values, with $0<t_{L1}-t_{E1}<2\ \Delta\tau_{chip}$, and $0<t_{L2}-t_{E2}<2\ \Delta\tau_{chip}$;

a second signal multiplier that receives and mixes the modified composite signal s(t) and the first time-shifted reference signal to produce a first signal product s(t) $S_d(t+\tau-t_{E1})$;

a third signal multiplier that receives and mixes the modified composite signal s(t) and the second time-shifted reference signal to produce a second signal product $s(t)S_d(t+\tau-t_{L1})$;

a fourth signal multiplier that receives and mixes the modified composite signal s(t) and the third time-shifted reference signal to produce a third signal product $s(t)S_d(t+\tau-t_{E2})$;

a fifth signal multiplier that receives and mixes the modified composite signal s(t) and the fourth time-shifted reference signal to produce a fourth signal product $s(t)S_d(t+\tau-t_{L2})$;

a first early correlator module that receives and processes the timing pulses and the first signal product and issues a first early correlation value that is received by the computer; and a first late correlator module that receives and processes the timing pulses and the second signal product and issues a first late correlation value that is received by the computer;

a second early correlator module that receives and processes the timing pulses and the third signal product and issues a second early correlation value that is received by the computer; and a second late correlator module that receives and processes the timing pulses and the fourth signal product and issues a second late correlation value that is received by the computer, where the computer forms a linear combination of at least two of the first early correlation value, the first late correlation value, the second early correlation value, and the second late correlation value and selects the value of at least one of the time shift values $\tau 1$ and $\tau 2$ so that the linear combination of correlation values has the value zero.

53. The apparatus of claim 52, further comprising a time division module, located between said timing source and said time shift module and receiving said timing pulses from said timing source, where, for every N1 consecutive timing pulses received from said timing source, the time division module delivers a single timing pulse to said time shift module, where N1 is a selected positive integer.

54. Apparatus for use in decoding a composite signal having a signal-distorting component, the apparatus comprising:

a timing source that issues a sequence of uniformly spaced timing pulses;

a code phase NCO and generator module that receives the timing pulses and a value of a time shift variable $\tau$, processes this information, and issues a selected digital reference signal $S_d(t+\tau)$ that varies with time t, where the reference signal has a digital bit transition time interval of a selected length $\Delta\tau_{chip}$;

a first time shift module that receives the timing pulses and the reference signal and that produces and issues a first time-shifted reference signal $S_d(t+\tau-t_E)$ and a second time-shifted reference signal $S_d(t+\tau-t_L)$, where $t_E$ and $t_L$ are selected time shift values, with $0<t_L-t_E<2\Delta\tau_{chip}$;

a signal comparison module that receives the signals $S_d(t+\tau)$ and $S_d(t+\tau-t_L)$ and issues a comparison signal $S_c(t+\tau)$, having a first selected value if the signals $S_d(t+\tau)$ and $S_d(t+\tau-t_L)$ have the same value and having a second selected value if the signals $S_d(t+\tau)$ and $S_d(t+\tau-t_L)$ do not have the same value;

a second time shift module that receives the timing pulses and the comparison signal and that produces and issues a first time-shifted comparison signal $S_c(t+\tau-t_E)$ and a second time-shifted comparison signal $S_c(t+\tau-t_L)$; and a digital computer that:

(1) receives the timing pulses, the first and second time-shifted reference signals $S_d(t+\tau-t_E)$ and $S_d(t+\tau-t_L)$, the first and second time-shifted comparison signals $S_c(t+\tau-t_E)$ and $S_c(t+\tau-t_L)$, and the time shift values $t_E$ and $t_L$;

(2) receives an incoming signal and frequency converts the incoming signal to a baseband signal s(t);

(3) forms a first selected weighting function $w(t+\tau-t_E)$ and a second weighting function $w(t+\tau-t_L)$;

(4) for a sequence of at least two distinct time values $t=t_k$ (k=1, 2, 3, . . . ), (4a) computes a first signal product value $w(t_k+\tau-t_E)S_d(t_k+\tau-t_E)s(t_k)$ and accumulates this first signal product value for the time $t=t_k$ if the comparison signal $S_c(t_k+\tau-t_E)$ has the first comparison signal value, (4b) accumulates the value 0 for the time $t=t_k$ if the comparison signal $S_c(t_k+\tau-t_E)$ has the second comparison signal value, to form a first accumulation;

(5) for the sequence of time values $t=t_k$, (5a) computes a second signal product value $w(t_k+\tau-t_L)S_d(t_k+\tau-t_L)$ s($t_k$) and accumulates this second signal product value for the time $t=t_k$ if the comparison signal $S_c(t_k+\tau-t_L)$ has the first comparison signal value, (5b) accumulates the value 0 for the time $t=t_k$ if the comparison signal $S_c(t_k+\tau-t_L)$ has the second comparison signal value, to form a second accumulation;

(6) subtracts the first accumulation from the second accumulation to form an accumulation difference;

(7) determines at least one value $t_0$ of the time shift variable $\tau$ for which the accumulation difference changes sign; and (8) interprets the time value $t=t_0$ as an estimate of the time at which a signal, which is substantially free of the presence of a multipath signal and which was contained in the incoming signal, was received.

55. Apparatus for use in decoding a composite signal having a signal-distorting component, the apparatus comprising:

a timing source that issues a sequence of uniformly spaced timing pulses;

a code phase NCO and generator module that receives the timing pulses and a value of a time shift variable $\tau$, processes this information, and issues a selected digital reference signal $S_d(t+\tau)$ that varies with time t, where the reference signal has a digital bit transition time interval of a selected length $\Delta\tau_{chip}$;

a first time shift module that receives the timing pulses and the reference signal and that produces and issues a first time-shifted reference signal $S_d(t+\tau-t_E)$ and a second time-shifted reference signal $S_d(t+\tau-t_L)$, where $t_E$ and $t_L$ are selected time shift values, with $0<t_L-t_E<2\Delta\tau_{chip}$;

a first signal comparison module that receives the signals $S_d(t+\tau)$ and $S_d(t+\tau-t_L)$ and issues a first comparison signal $S_{c1}(t+\tau)$, having a first selected value if the signals $S_d(t+\tau)$ and $S_d(t+\tau-t_L)$ have the same value and having a second selected value if the signals $S_d(t+\tau)$ and $S_d(t+\tau-t_L)$ do not have the same value;

a second time shift module that receives the timing pulses and the comparison signal and that produces and issues a first time-shifted first comparison signal $S_{c1}(t+\tau-t_E)$, a second time-shifted first comparison signal $S_{c1}(t+\tau-t_P)$; and a third time-shifted first comparison signal $S_{c1}(t+\tau-t_L)$, where $t_P$ is a selected time shift value satisfying $t_E<t_P<t_L$;

a second signal comparison module that receives the signals $S_{c1}(t+\tau-t_P)$ and $S_{c1}(t+\tau-t_L)$ and issues a second comparison signal $S_{c2}(t+\tau)$, where the second comparison signal has a first selected value if the signal $S_{c1}(t+\tau-t_P)$ has a first selected comparison value and the signal $S_{c1}(t+\tau-t_L)$ has a second selected comparison value, and the second comparison signal has a second selected value if at least one of the signals $S_{c2}(t+\tau-t_P)$ and $S_{c2}(t+\tau-t_L)$ does not have the first selected comparison value and the second selected comparison value, respectively;

a third signal comparison module that receives the first comparison signal $S_c(t+\tau-t_E)$ and the second comparison signal $S_{c2}(t+\tau-t_L)$ and issues a third comparison signal $S_{c3}(t+\tau)$, where the third comparison signal has a first selected value if the signal $S_{c1}(t+\tau-t_E)$ has a third selected comparison value and the signal $S_{c2}(t+\tau-t_L)$ has a fourth selected comparison value, and the third comparison signal has a second selected value if at least one of the signals $S_{c1}(t+\tau-t_E)$ and $S_{c2}(t+\tau-t_L)$ does not have the third selected comparison value and the fourth selected comparison value, respectively;

a fourth signal comparison module that receives the first comparison signal $S_{c1}(t+\tau-t_L)$ and the second comparison signal $S_{c2}(t+\tau-t_L)$ and issues a fourth comparison signal $S_{c4}(t+\tau)$, where the fourth comparison signal has a first selected value if the signal $S_{c1}(t+\tau-t_L)$ has a fifth selected comparison value and the signal $S_{c2}(t+\tau-t_L)$ has a sixth selected comparison value, and the fourth comparison signal has a second selected value if at least one of the signals $S_{c1}(t+\tau-t_L)$ and $S_{c2}(t+\tau-t_L)$ does not have the fifth selected comparison value and the sixth selected comparison value, respectively;

a digital computer that:
(1) receives the timing pulses, the first and second time-shifted reference signals $S_d(t+\tau-t_E)$ and $S_d(t+\tau-t_L)$, the third and fourth comparison signals $S_{c3}(t+\tau)$ and $S_{c4}(t+\tau)$, and the time shift values $t_E$ and $t_L$;
(2) receives an incoming signal and frequency converts the incoming signal to a baseband signal $s(t)$;
(3) forms a first selected weighting function $w(t+\tau-t_E)$ and a second weighting function $w(t+\tau-t_L)$;
(4) for a sequence of at least two distinct time values $t=t_k$ (k=1, 2, 3, . . . ), (4a) computes a first signal product value $w(t_k+\tau-t_E)S_d(t_k+\tau-t_E)s(t_k)$ and accumulates this first signal product value for the time $t=t_k$ if the third comparison signal $S_{c3}(t+\tau)$ has the first selected third comparison value, (4b) accumulates the value 0 for the time $t=t_k$ if the comparison signal $S_c(t_k+\tau-t_E)$ has the second selected third comparison value, to form a first accumulation;
(5) for the sequence of time values $t=t_k$, (5a) computes a second signal product value $w(t_k+\tau-t_L)S_d(t_k+\tau-t_L)s(t_k)$ and accumulates this second signal product value for the time $t=t_k$ if the fourth comparison signal $S_{c4}(t+\tau)$ has the first selected fourth comparison value, (5b) accumulates the value 0 for the time $t=t_k$ if the fourth comparison signal $S_{c4}(t+\tau)$ has the second selected fourth comparison value, to form a second accumulation;
(6) subtracts the first accumulation from the second accumulation to form an accumulation difference;
(7) determines at least one value $t_0$ of the time shift variable $\tau$ for which the accumulation difference changes sign; and
(8) interprets the time value $t=t_0$ as an estimate of the time at which a signal, which is substantially free of the presence of a multipath signal and which was contained in the incoming signal, was received.

* * * * *